(12) United States Patent
Ghassabian

(10) Patent No.: US 10,866,720 B2
(45) Date of Patent: Dec. 15, 2020

(54) DATA ENTRY SYSTEMS

(71) Applicant: KEYLESS SYSTEMS LTD., Jerusalem (IL)

(72) Inventor: Benjamin Firooz Ghassabian, Jerusalem (IL)

( * ) Notice: Subject to any disclaimer, the term of this patent is extended or adjusted under 35 U.S.C. 154(b) by 0 days.

(21) Appl. No.: 15/121,042

(22) PCT Filed: Feb. 26, 2015

(86) PCT No.: PCT/US2015/017638
§ 371 (c)(1),
(2) Date: Aug. 24, 2016

(87) PCT Pub. No.: WO2015/130875
PCT Pub. Date: Sep. 3, 2015

(65) Prior Publication Data
US 2017/0068448 A1    Mar. 9, 2017

Related U.S. Application Data

(60) Provisional application No. 61/945,293, filed on Feb. 27, 2014, provisional application No. 61/980,609, filed on Apr. 17, 2014, provisional application No. 61/988,244, filed on May 4, 2014, provisional application No. 62/001,762, filed on May 22, 2014, provisional application No. 62/003,132, filed on May
(Continued)

(51) Int. Cl.
G06F 3/0486    (2013.01)
G06F 3/0488    (2013.01)
G06F 3/0481    (2013.01)

(52) U.S. Cl.
CPC ........ *G06F 3/0486* (2013.01); *G06F 3/04812* (2013.01); *G06F 3/04883* (2013.01); *G06F 3/04886* (2013.01)

(58) Field of Classification Search
CPC .............. G06F 3/04886; G06F 3/0482; G06F 3/04883; G06F 17/276; G06F 3/0486; G06F 3/04812; G06F 3/0236; H04L 51/32; H04N 7/142
See application file for complete search history.

(56) References Cited

U.S. PATENT DOCUMENTS 6,308,199 B1 *  10/2001  Katsurabayashi .... G06F 3/0481
                                                    709/203
7,227,976 B1 *   6/2007  Jung ................... G06K 9/00228
                                                    345/419
(Continued)

FOREIGN PATENT DOCUMENTS

WO    WO-2004015897 A2 *  2/2004  ............. G06Q 10/10

OTHER PUBLICATIONS

Steven Tweedie, Everyone Can Use Snapchat's New Geofilters Starting Today, Business Insider, https://www.businessinsider.com/how-to-use-snapchat-geofilters-2014-12 (Year: 2014).*
(Continued)

*Primary Examiner* — Justin R. Blaufeld

(57) ABSTRACT

A system of controlling a content comprising a content, a number of controlling conditions and/or a number of controlling means, wherein the visibility of at least portion of said content is defined and controlled by using at least one of said controlling conditions and/or controlling means.

13 Claims, 32 Drawing Sheets

Related U.S. Application Data 27, 2014, provisional application No. 62/006,328, filed on Jun. 2, 2014, provisional application No. 62/012,383, filed on Jun. 15, 2014, provisional application No. 62/027,875, filed on Jul. 23, 2014, provisional application No. 62/028,416, filed on Jul. 24, 2014, provisional application No. 62/032,585, filed on Aug. 3, 2014, provisional application No. 62/050,288, filed on Sep. 15, 2014, provisional application No. 62/062,156, filed on Oct. 10, 2014, provisional application No. 62/095,130, filed on Dec. 22, 2014, provisional application No. 62/102,141, filed on Jan. 12, 2015, provisional application No. 62/104,769, filed on Jan. 18, 2015, provisional application No. 62/107,427, filed on Jan. 25, 2015.

(56) References Cited

U.S. PATENT DOCUMENTS

| | | | |
|---|---|---|---|
| 7,362,349 B2* | 4/2008 | Nelson | H04N 7/147 348/14.08 |
| 8,117,560 B1* | 2/2012 | Lu | G06F 3/0481 715/781 |
| 2002/0026478 A1* | 2/2002 | Rodgers | G06F 8/65 709/205 |
| 2002/0165922 A1* | 11/2002 | Wei | G09B 5/06 709/205 |
| 2005/0223068 A1* | 10/2005 | Shohfi | H04L 51/046 709/206 |
| 2006/0161622 A1* | 7/2006 | Montgomery | G06F 3/1454 709/204 |
| 2007/0150340 A1* | 6/2007 | Cartmell | G06Q 30/0267 705/14.55 |
| 2007/0156908 A1* | 7/2007 | Szomolanyi | H04L 12/1822 709/227 |
| 2007/0200925 A1* | 8/2007 | Kim | G06T 11/00 348/14.08 |
| 2008/0091778 A1* | 4/2008 | Ivashin | G06Q 10/10 709/204 |
| 2008/0126953 A1* | 5/2008 | Davidson | G06Q 10/10 715/753 |
| 2008/0212499 A1* | 9/2008 | Maes | H04M 3/567 370/265 |
| 2008/0294992 A1* | 11/2008 | Liang | G06F 3/0481 715/733 |
| 2009/0202114 A1* | 8/2009 | Morin | A63F 13/12 382/118 |
| 2010/0090958 A1 | 4/2010 | Perez | |
| 2010/0131868 A1* | 5/2010 | Chawla | G06F 3/044 715/759 |
| 2010/0150406 A1* | 6/2010 | Xiao | G06K 9/00261 382/118 |
| 2010/0259559 A1* | 10/2010 | Schneider | H04N 7/147 345/629 |
| 2010/0262925 A1* | 10/2010 | Liu | G06Q 10/10 715/759 |
| 2011/0047485 A1* | 2/2011 | Takakura | G06F 21/6209 715/753 |
| 2011/0149811 A1* | 6/2011 | Narayanaswamy | H04L 12/1818 370/261 |
| 2011/0225542 A1* | 9/2011 | Schmieder | G06F 3/0481 715/794 |
| 2012/0002002 A1* | 1/2012 | Shaffer | H04N 7/147 348/14.09 |
| 2012/0005588 A1* | 1/2012 | Bastide | G06Q 10/10 715/741 |
| 2012/0011451 A1* | 1/2012 | Bansal | H04N 7/15 715/753 |
| 2012/0110196 A1* | 5/2012 | Balasaygun | H04L 12/1818 709/228 |
| 2013/0147905 A1* | 6/2013 | Vivekanandan | H04N 7/155 348/14.08 |
| 2013/0169827 A1* | 7/2013 | Santos | H04N 5/23229 348/207.1 |
| 2013/0283144 A1* | 10/2013 | Roh | H04M 1/72547 715/230 |
| 2013/0307781 A1 | 11/2013 | Ghassabian | |
| 2014/0006971 A1* | 1/2014 | Bell | H04L 65/403 715/753 |
| 2014/0007249 A1* | 1/2014 | Altaf | G06F 21/6245 726/26 |
| 2015/0007351 A1* | 1/2015 | Janajri | H04L 63/04 726/30 |
| 2015/0128163 A1* | 5/2015 | Cormican | H04N 21/23424 725/23 |
| 2015/0131872 A1* | 5/2015 | Ganong | G06K 9/00677 382/118 |
| 2015/0172599 A1* | 6/2015 | Caldwell | G06T 13/40 348/14.03 |
| 2015/0302207 A1* | 10/2015 | Sprenger | G06F 11/30 726/26 |
| 2015/0346959 A1* | 12/2015 | Ruben | G06F 3/0488 715/738 |
| 2016/0065864 A1* | 3/2016 | Guissin | G06T 5/008 348/239 |

OTHER PUBLICATIONS

MacKenzie, I. Scott, Abigail Sellen, and William AS Buxton. "A comparison of input devices in element pointing and dragging tasks." Proceedings of the SIGCHI conference on Human factors in computing systems (Year: 1991).*

European Search Opinion of EPO Application No. 15755662.2 (Year: 2017).*

PCT Written Opinion, PCT/US2015/017638, dated Jul. 27, 2015.

* cited by examiner

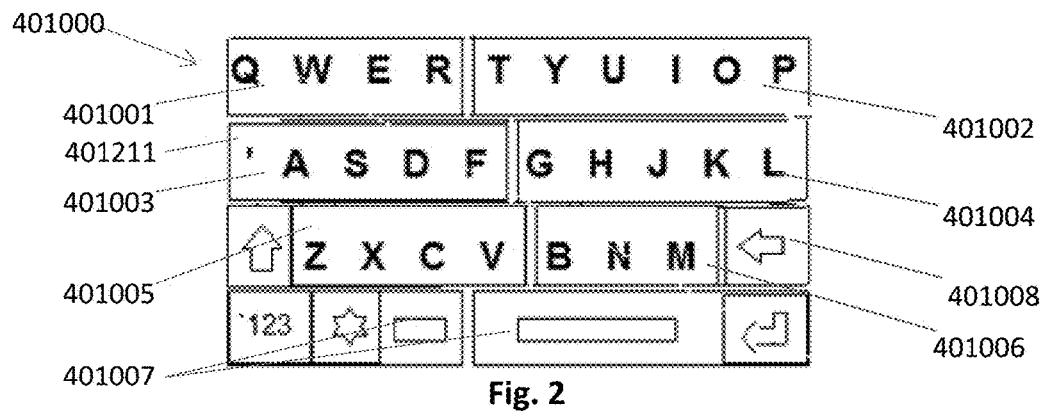
Fig. 2
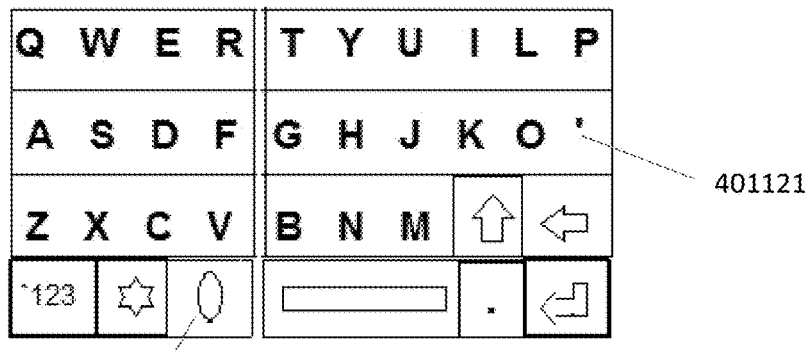
Fig. 2A
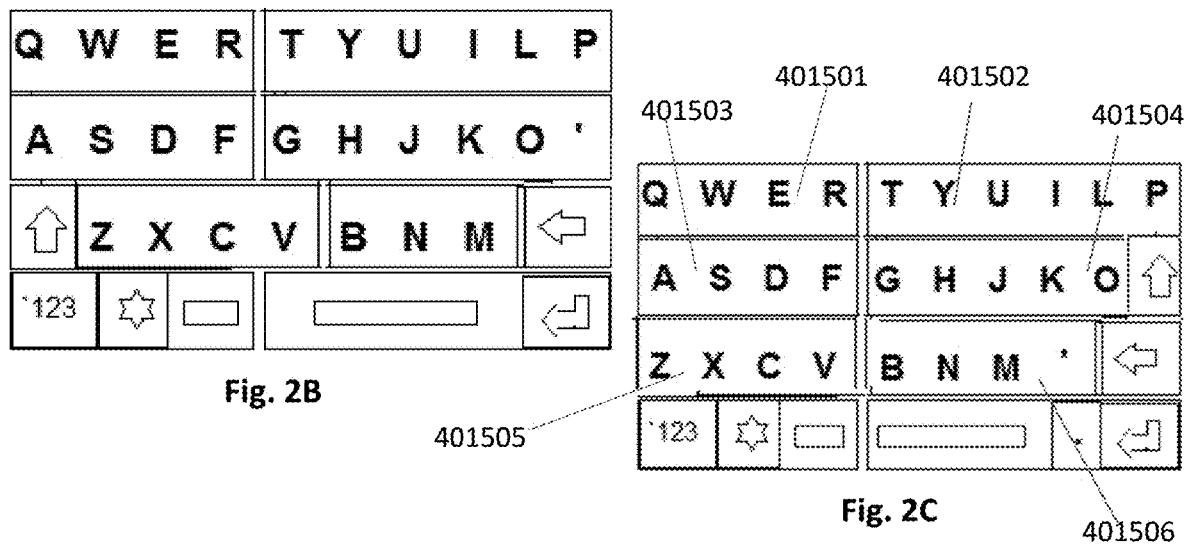
Fig. 2B
Fig. 2C

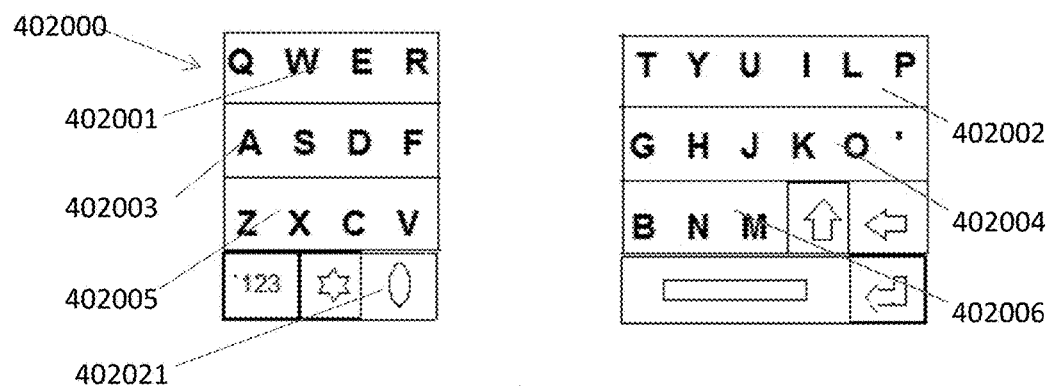
Fig. 3
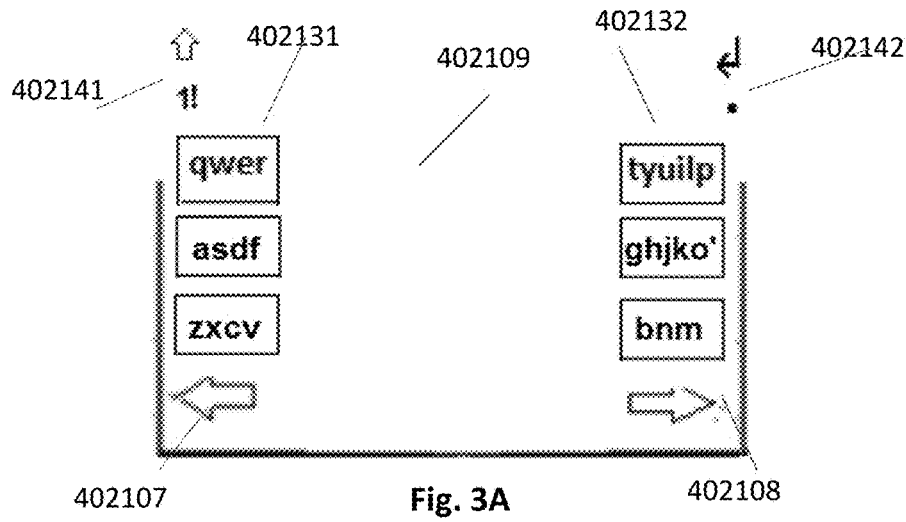
Fig. 3A
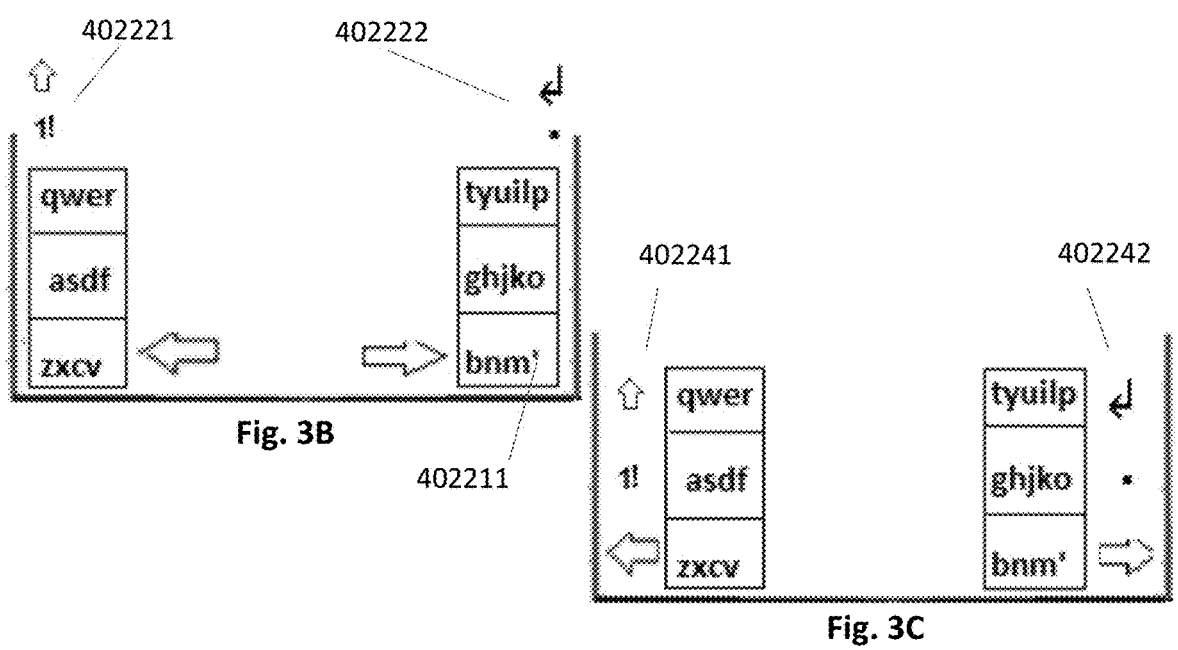
Fig. 3B
Fig. 3C

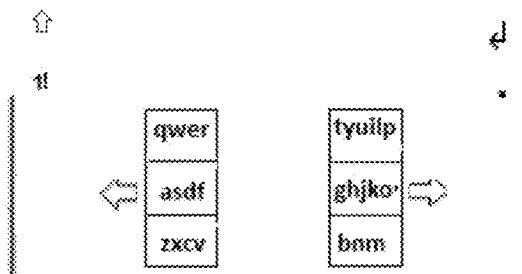
Fig. 3D
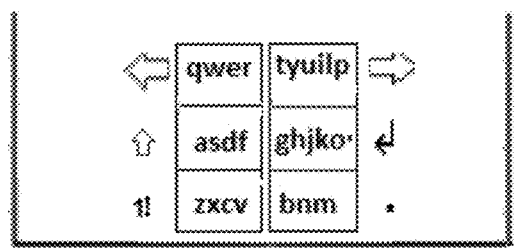
Fig. 3E
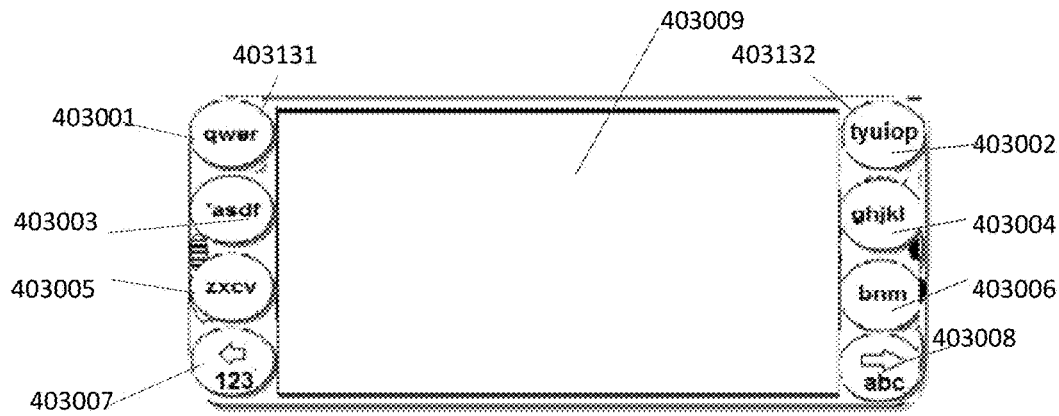
Fig. 4A
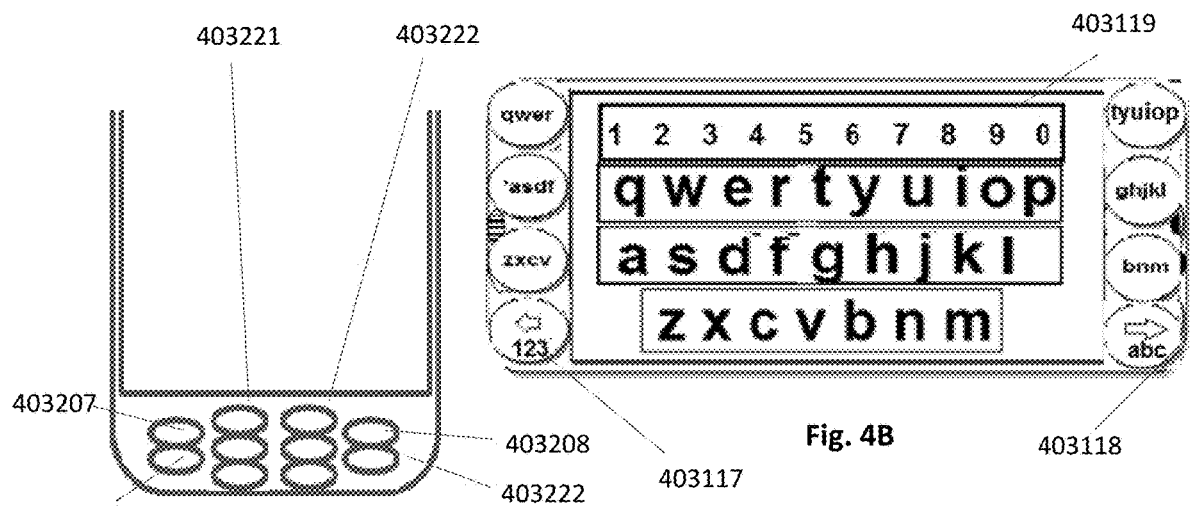
Fig. 4C
Fig. 4B

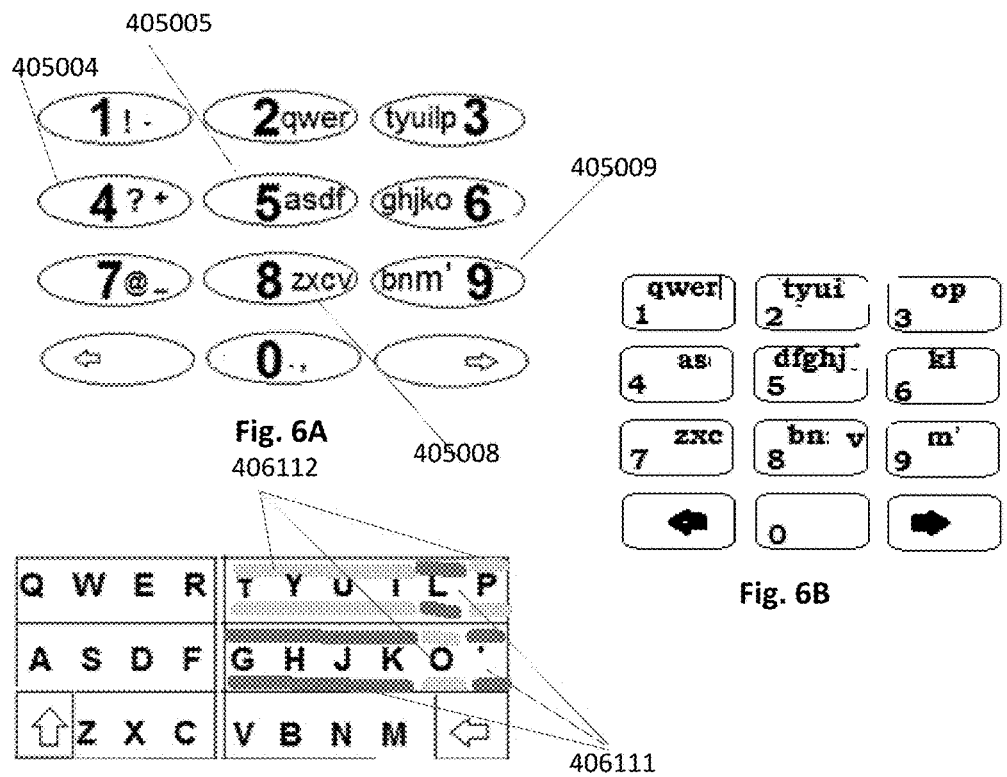
Fig. 6A
Fig. 6B
Fig. 7A
Fig. 8
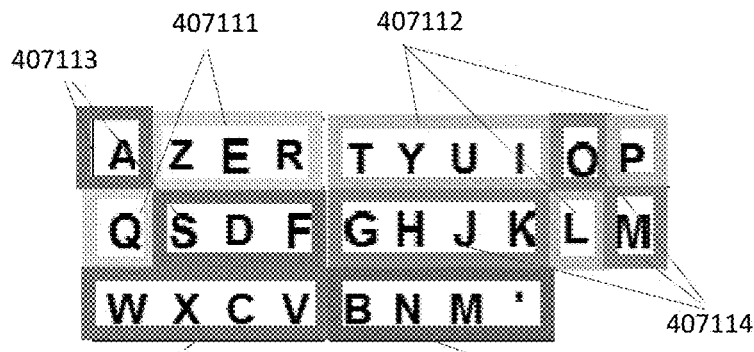
Fig. 7B

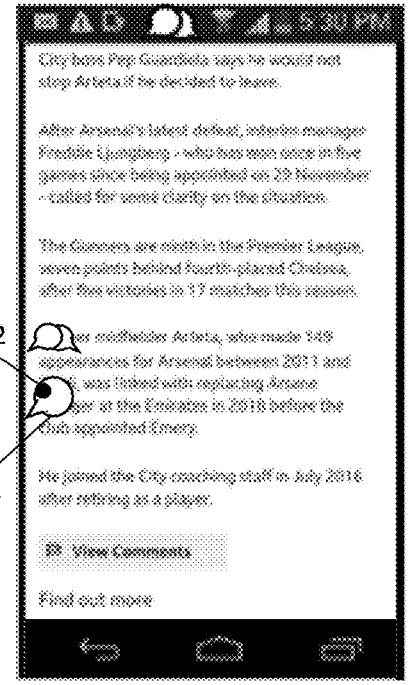
Fig. 12E     Fig. 12F
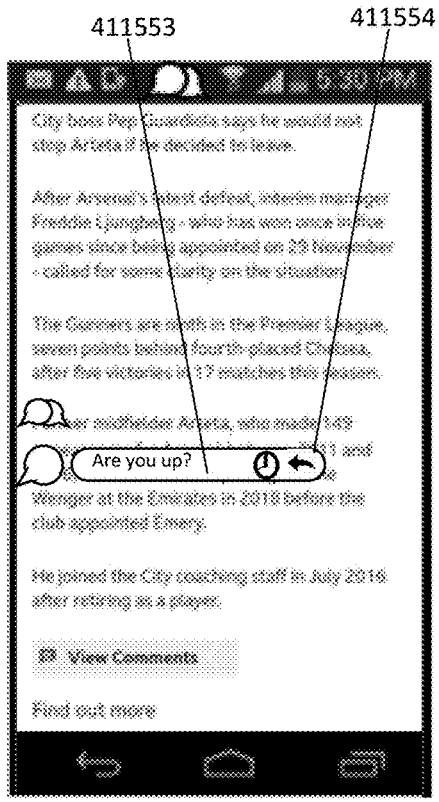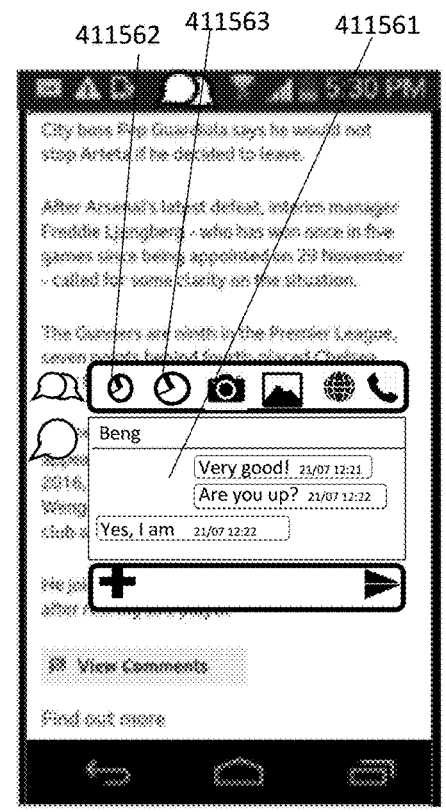
Fig. 12G     Fig. 12H

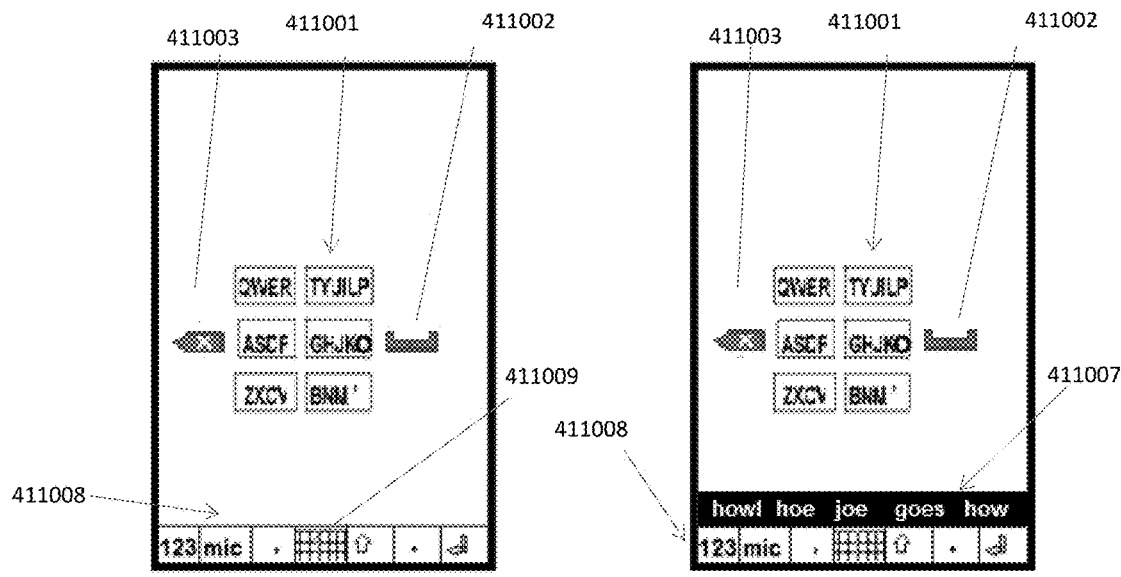
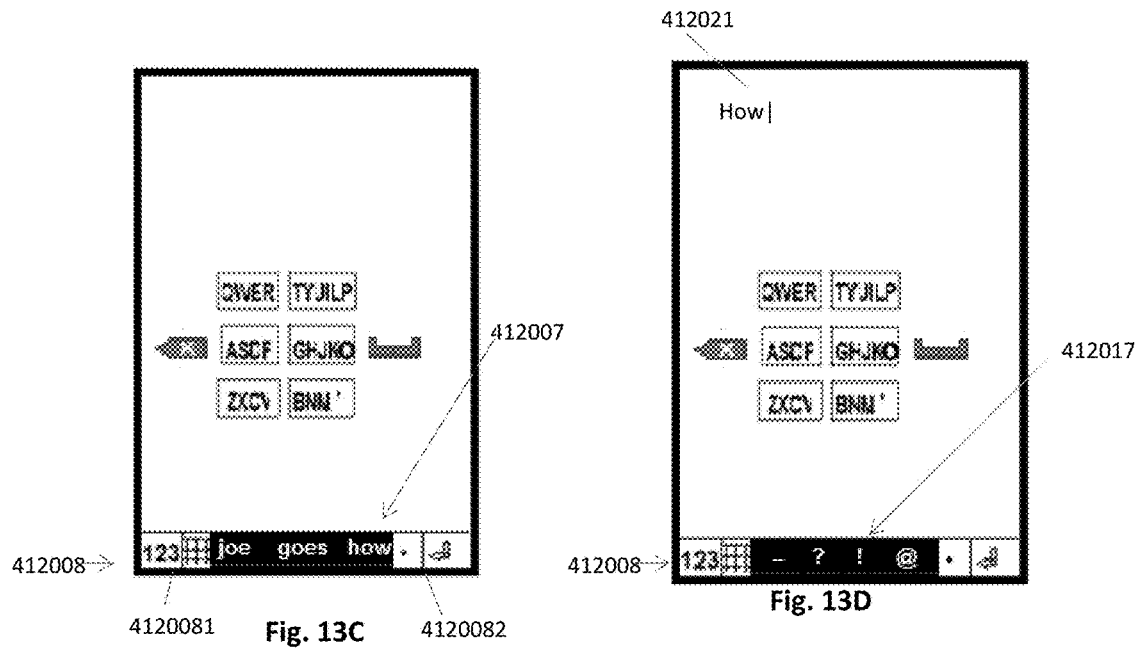
Fig. 13A  Fig. 13B  Fig. 13C  Fig. 13D  Fig. 13E

|   | 1 | 2 | 3 | 4 | 5 | 6 | 7 |   |
|---|---|---|---|---|---|---|---|---|
|   | you_ | _were | 1111 | 1111 | 42925 | 0000 | ●●●●● |
|   | you_ | _wear | 1111 | 1131 | 980 | 0021 | ●●●● |
|   | you_ | _read | 1111 | 1133 | 3582 | 0020 | ●●●● |
|   | you_ | _ever | 1111 | 1511 | 10291 | 0210 | |
|   | you_ | _dear | 1111 | 3131 | 1859 | 0121 | |
|   | you_ | _draw | 1111 | 3131 | 485 | 0121 | |
|   | you_ | _dare | 1111 | 3311 | 378 | 0010 | |
|   | you_ | _save | 1111 | 3351 | 487 | 0021 | |
|   | you_ | _face | 1111 | 3351 | 339 | 0021 | |
|   | you_ | _care | 1111 | 5311 | 1369 | 0110 | |

| you_ | _rate | 1121 | 1321 | 158 | 0210 |
| you_ | _wake | 1121 | 1341 | 580 | 0201 |
| you_ | _send | 1121 | 3163 | 808 | 0121 |
| you_ | _said | 1121 | 3323 | 1085 | 0012 |
| you_ | _came | 1121 | 5361 | 2663 | 0121 |

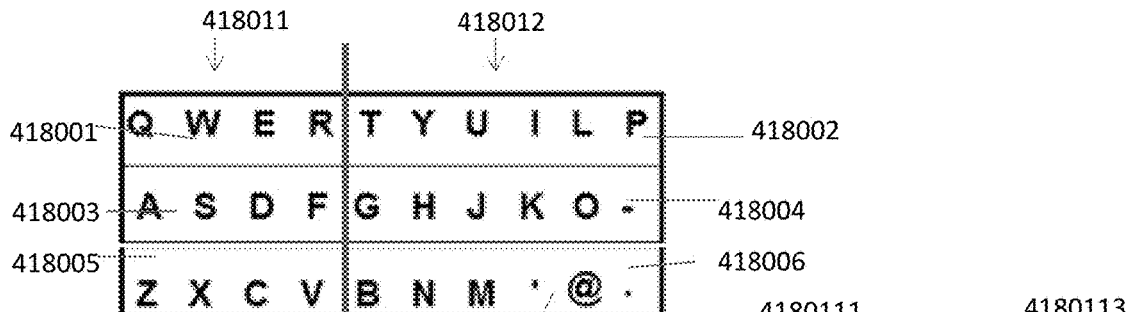
Fig. 19A
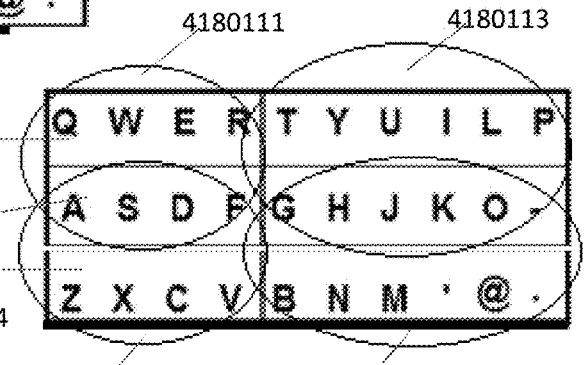
Fig. 19C
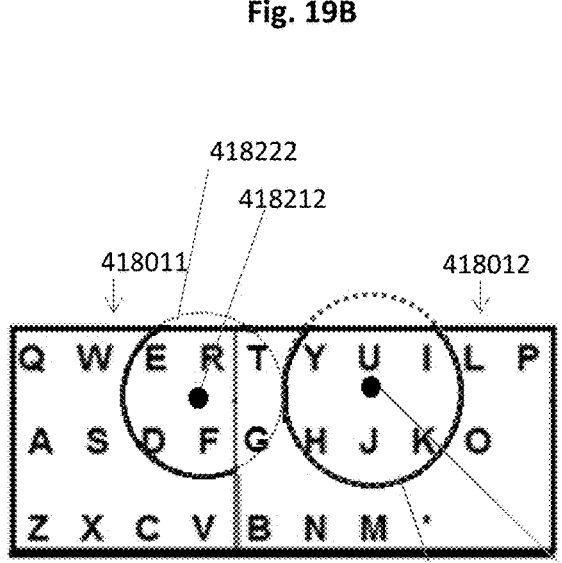
Fig. 19B
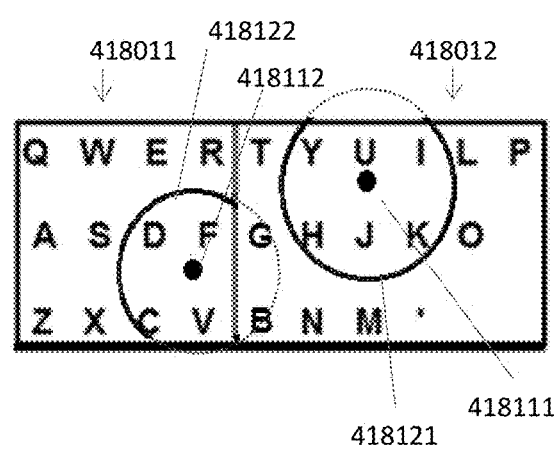
Fig. 19D
Fig. 19E

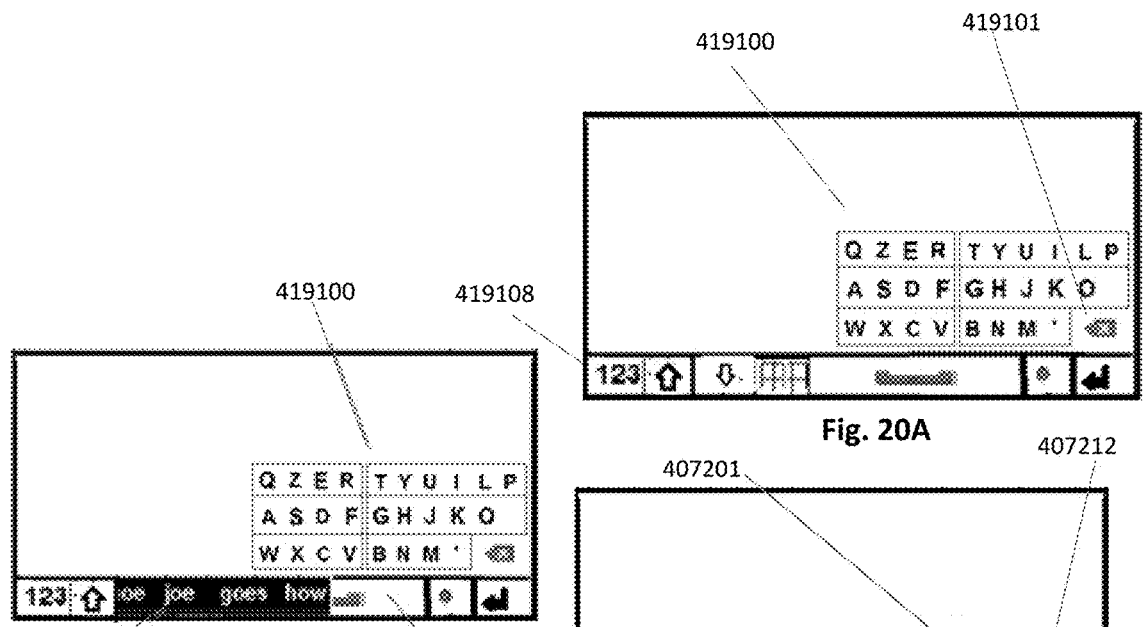
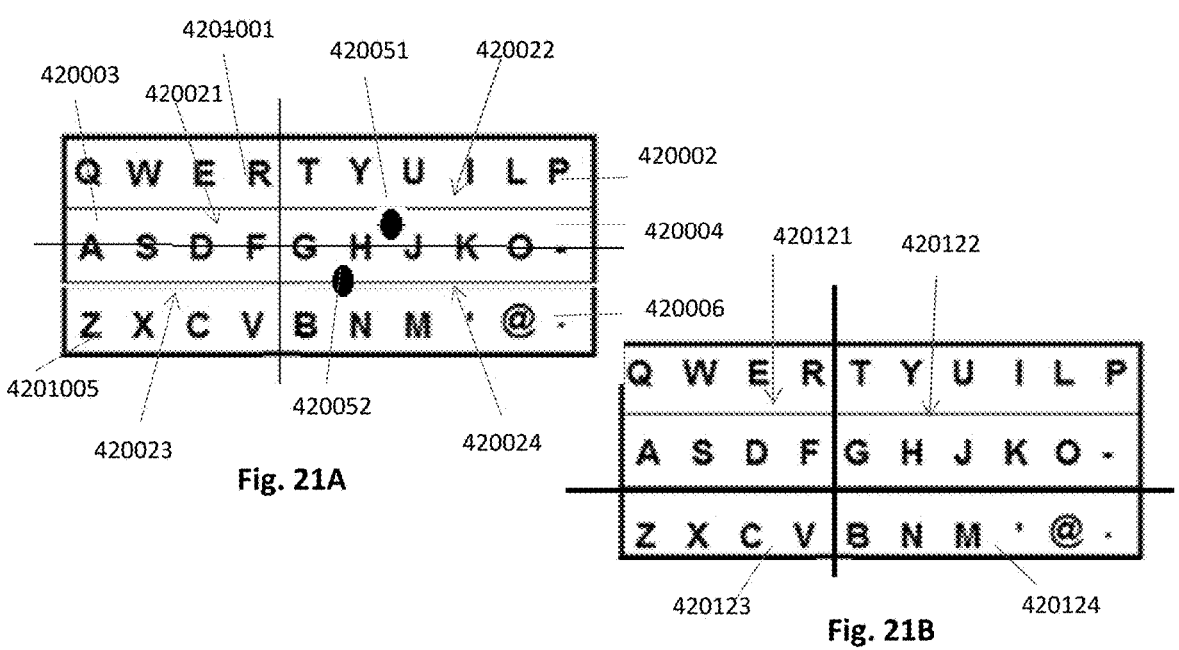

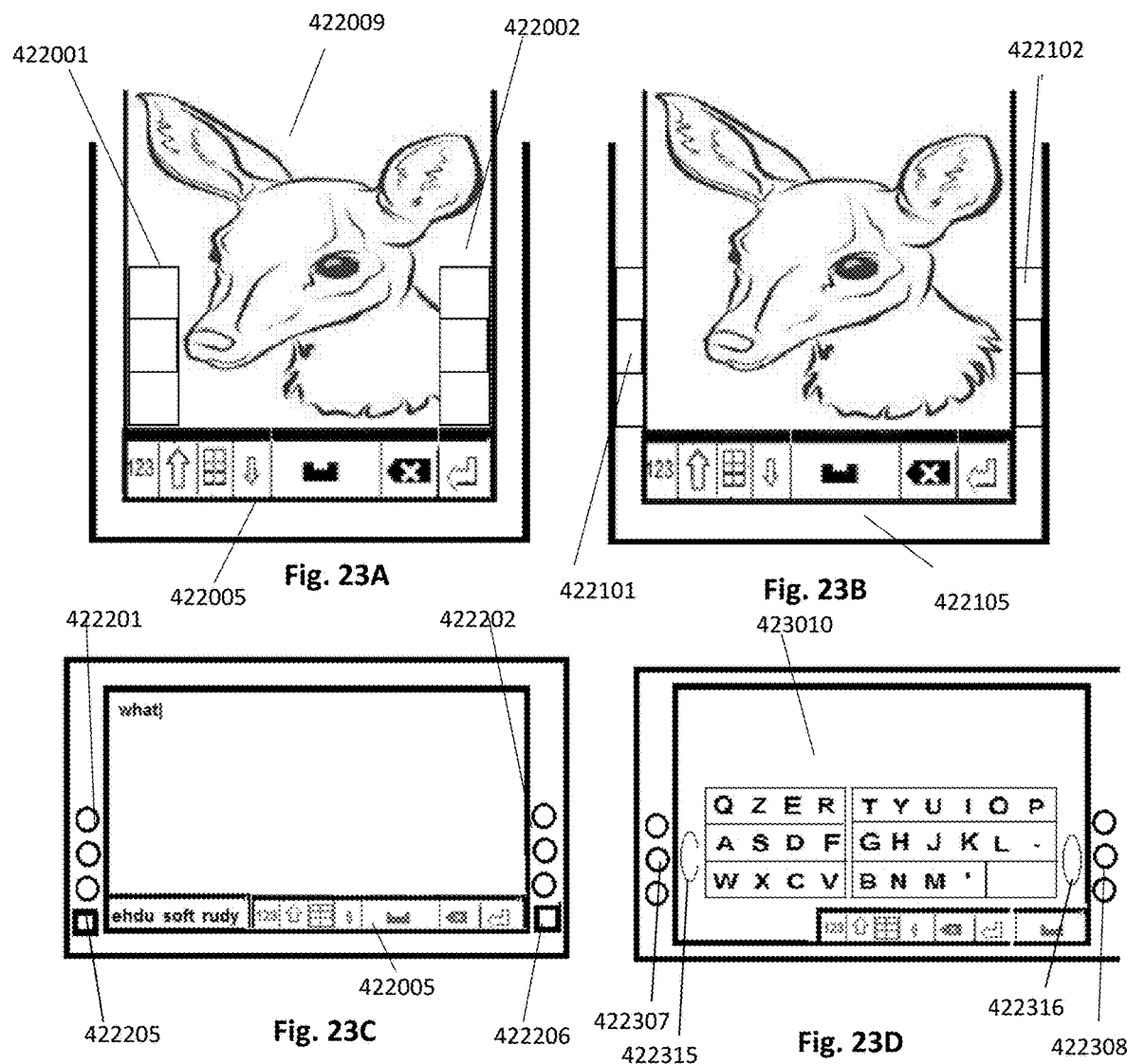

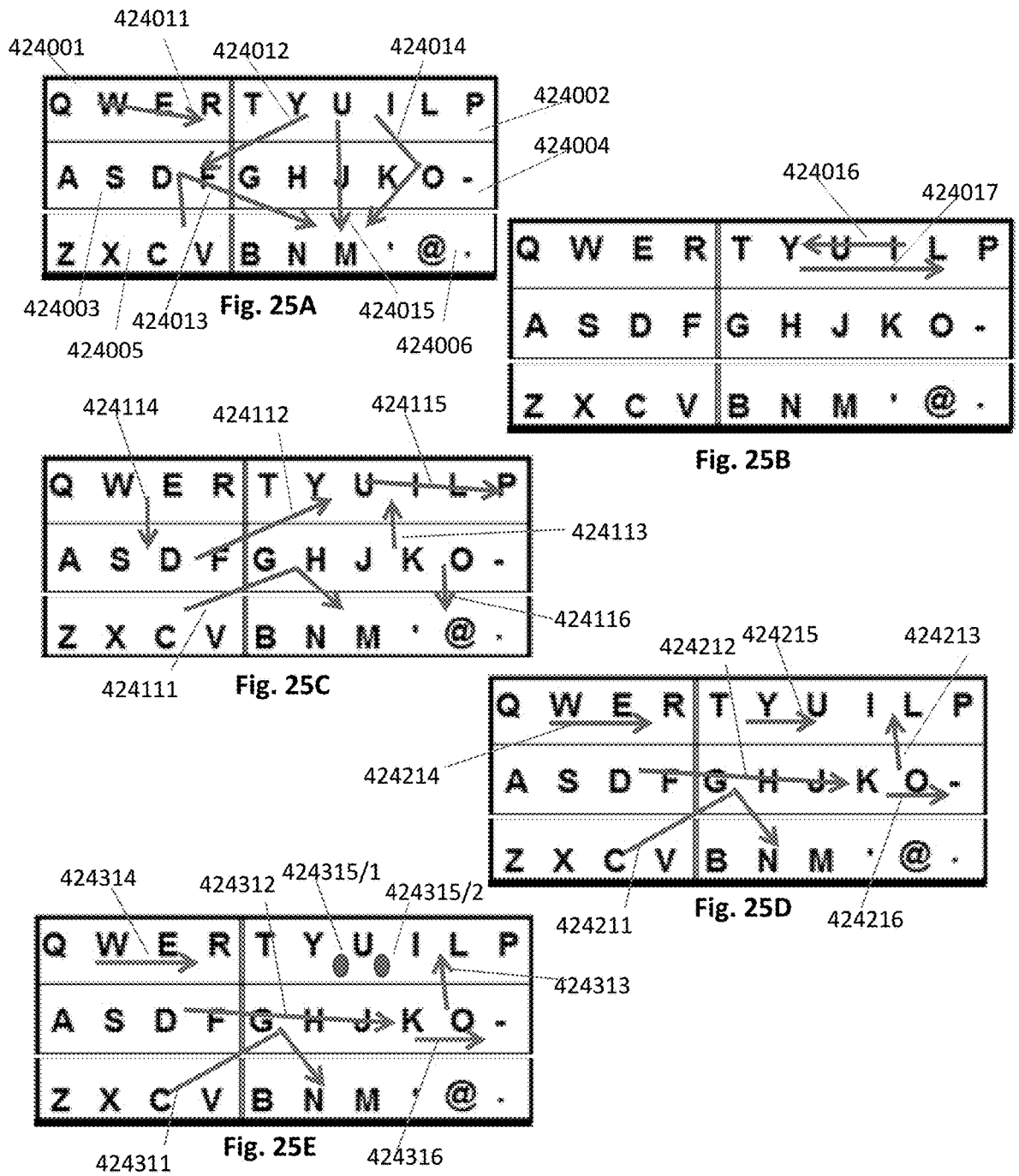

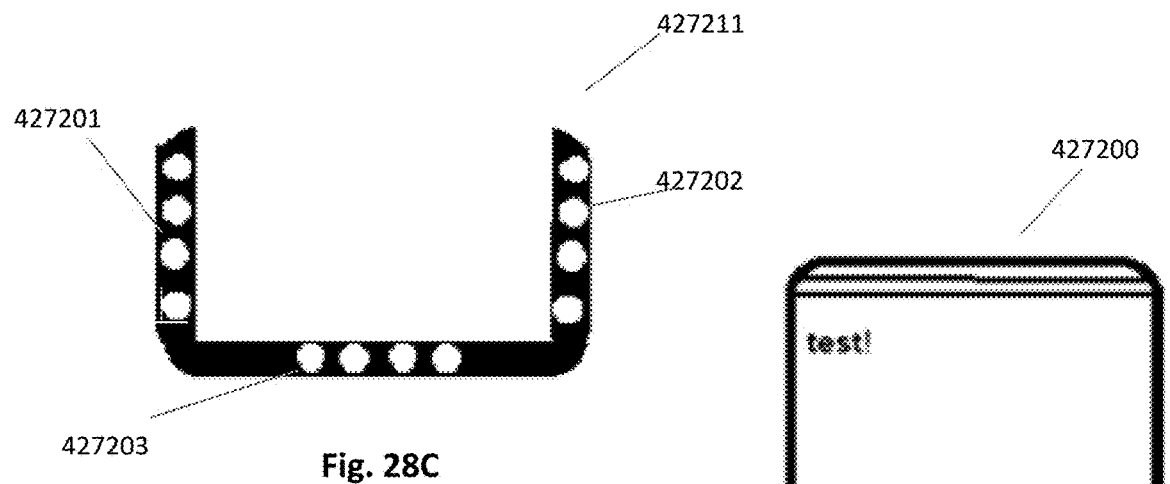
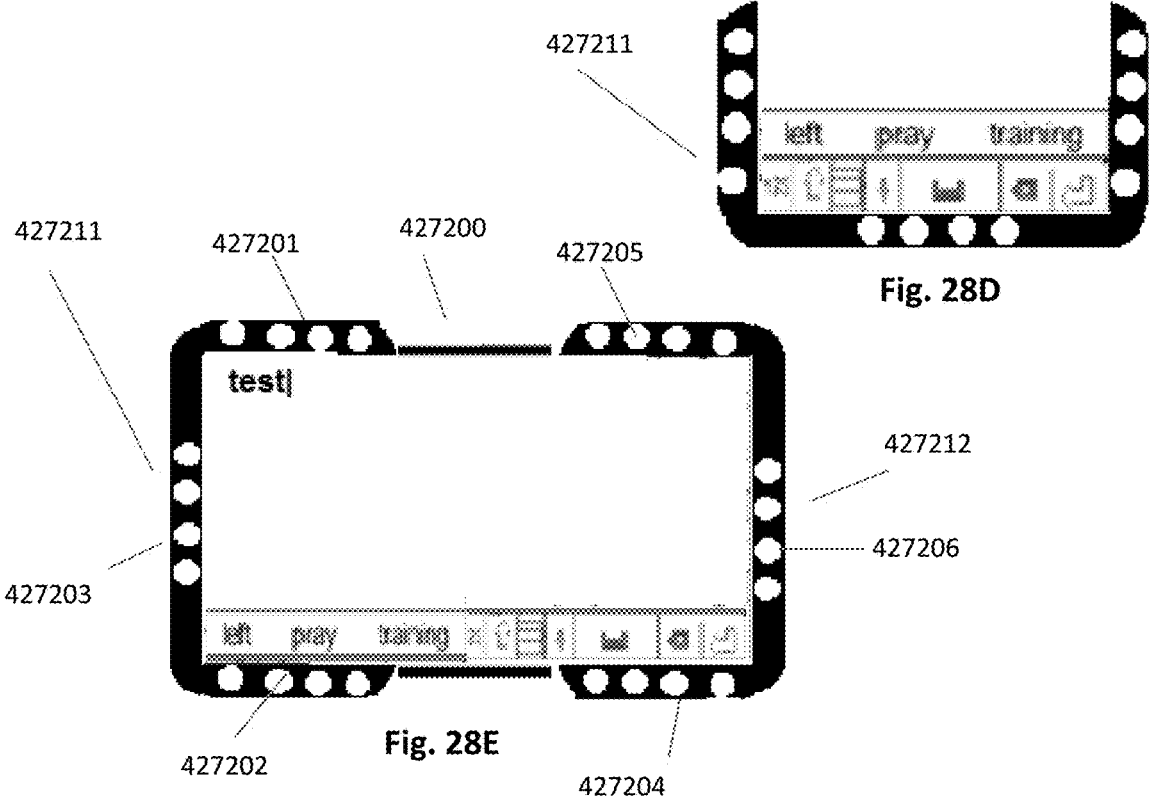

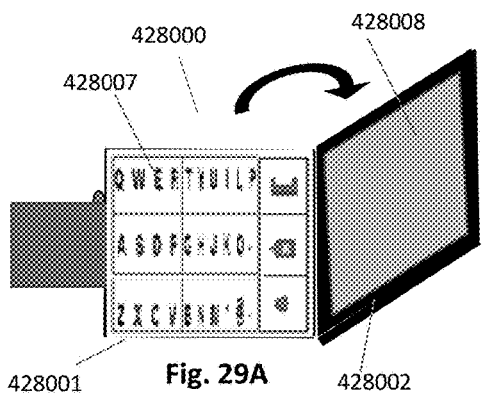
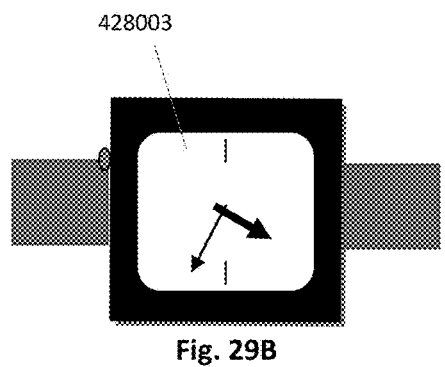
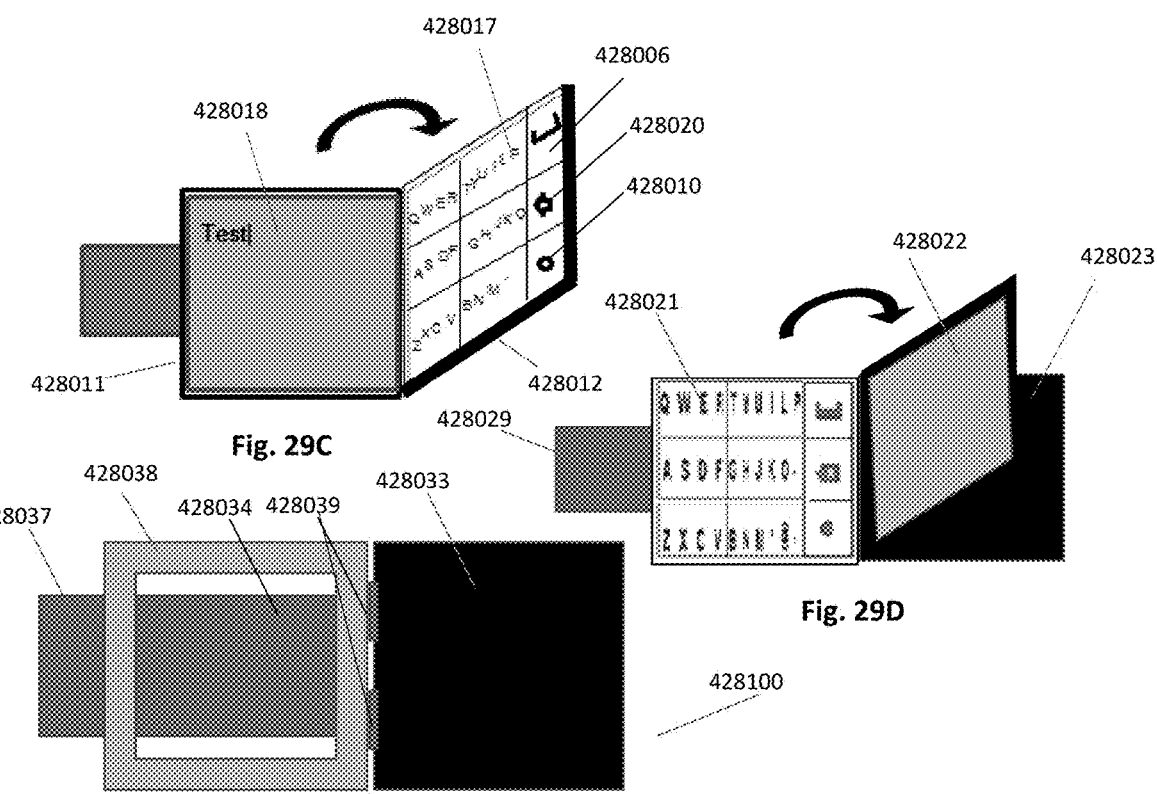

DATA ENTRY SYSTEMS

FIELD OF THE INVENTION

The present invention relates to data input systems and particularly systems and methods for entering letters, words, other symbols and/or other information. The present invention also relates to a method of social interaction by texting on virtual content(s) such as a picture or a video.

BACKGROUND OF THE INVENTION

Mobile devices including cellular phones, personal digital aids and miniature computers are widely used as they are easily carried around and can perform many tasks. One problem of mobile device(s) is text entry, which is problematic due to their small size of a device. One solution for text entry in mobile devices is using a limited key set in which at least some of the keys are ambiguously associated with a plurality of letters. Upon receiving a sequence of key interactions (e.g. providing an 'information' corresponding/relating to a desired word being entered. Such information herein may be referred to as 'input information; and such a word may herein be referred to as 'current word'), a word predictive system proposes a word from a dictionary/database of words. The problem of such system is that when a word is not in the database the user must use another method of text entry.

Another problem of mobile devices is entering symbols other than letters.

With the emergence of devices having touch screens, on screen full (e.g. QWERTY) keyboard systems are used on most devices. Due to the size of mobile devices, and the number of keys of a full keyboard, such keys are reduced in size rendering the keyboard cumbersome and the data entry slow. The screen of a device is intended to display the output. Having a full keyboard with many keys on the screen covers a significant portion of the screen, hindering the use of many current applications and limiting creation of many other applications.

A real mobile data entry system must be mobile, enabling to enter data in any environment such as while standing, walking, in the dark, etc. In addition, such system must preferably free the screen from an interface that occupies a large portion of the screen.

SUMMARY OF THE INVENTION

The data entry system, described in this application, provides a system that is adapted to mobile environments. It is also intuitive, accurate, fast, and easy to understand and use.

An aspect of some embodiments of the invention relates to an input interface adapted to identify user interactions with the input interface and to associate at least some of the user interactions with different types of input signals. Optionally, some of said input signals are together associated with all the letters of a language such as the Latin/Roman alphabet or a phonetic alphabet.

An aspect of the inventions relates to an input interface (e.g. herein may be referred to as a keyboard) having a few input means (e.g. herein may be referred to as keys/zones) adapted to relate an input signal received by/through an interaction with an input means to an unambiguous character (e.g. herein such an input signal may be referred to as unambiguous/identified input signal, and such a character may be referred to as identified/precise character) and/or to ambiguously relate said interaction to any character of a group of characters assigned to an/said input means (e.g. herein such an input signal may be referred to as ambiguous input signal, and such a character may be referred to as ambiguous character).

An aspect of some embodiments of the invention relates to an input interface (e.g. hereafter may be referred to as keypad/keyboard) wherein (e.g. at least) a (e.g. few) number (e.g. 4 to 12) of its input means (e.g. hereafter, may be referred to as keys or zones on a touch sensitive surface such as a touchscreen) ambiguously and/or precisely represent more than one character(s)/letter(s). According to a first method said a few number of keys together represent all of the letters of an alphabet. According to a second method, said a few number of keys together represent some of the letters of an alphabet (e.g. hereafter may be referred to as Preferred characters). The rest of the letters (e.g. hereafter may be referred to as Non-preferred characters) of said alphabet are represented by a key/zone outside said a few number of keys. For ease of description, herein, such a key of the/a keypad and interaction with it may be referred to as "narrowly ambiguous key/interaction" providing "narrowly ambiguous input signal", and said key/zone outside the keypad and interaction with it may be referred to as "broadly ambiguous key/interaction" providing "broadly ambiguous input signal". In some paragraphs herein, said zone may also/is referred to as "navigation zone".

An aspect of some embodiments of the invention relate to a procedure of assisting the user to correctly entering a word which may be mistyped by the user by assigning all of the characters (e.g. letters) of a language to the broadly ambiguous keys/interactions. This aspect herein may be referred to as Spelling Help feature.

Preferably, said a few number of keys are split to form two groups of keys. Preferably, said key/zone outside said a few number of keys is located between or below said split group of keys. Preferably, said keypad is a virtual keypad located on a touch sensitive surface. Optionally, said touch sensitive surface is a touch screen.

Preferably, said input interface is used with a word prediction system/software wherein upon/during providing a sequence of one or more interactions with the input interface, the system predicts one or more words from the corresponding entries of a database of words used by the system. A word predictive system/software predicting words as such is known by people skilled in the art and some of such software (e.g. T9, iTap, or auto correction software used with an on-screen QWERTY keyboard wherein an interaction with a key may ambiguously be related to said key and some of the surrounding keys because the keys are too small and the user may mispress a key) are implemented in a variety of mobile phones.

Optionally, a single letter may be assigned to more than one zone/key.

Preferably, the input interface further includes additional input means relating to symbols and/or functions such as the space key sand the back space keys.

Optionally, to at least one of the input means more than one letter of a language is assigned such that a predefined interaction with the input means ambiguously and/or precisely corresponds one of the letters. In such case, herein, the system may be referred to as being in the Ambiguous Letter Mode.

An aspect of the inventions is related to a traditional keyboard wherein the letter are divided into few groups (e.g. 5 or 6) each assigned/represented by a different zone/key. Optionally, the keyboard has an alphabetical layout. Optionally, the keyboard has a traditional letter layout (e.g. QWERTY, QWERTZ). Preferably, (e.g. minor) modification to the layout is provided. Preferably, a different portion of the surface of a key/zone is assigned to an identified character. Preferably, interacting with a portion of a key/zone is related by the system to said identified letter and/or ambiguously to any of the letters assigned to said key/zone. Preferably, the background (e.g. color, shade, etc.) of a zone/key is different than the background of its adjacent key/zone.

Optionally, the keyboard can be switched from a large size to a small size or vice versa. Optionally, the system may be switched to a Precise Symbol Mode, wherein a predefined interaction with a key/zone may provide an individual precise/identified special character or function. The interface of the system in such mode may preferably be different than the interface in other modes. Preferably, special characters are divided into a plurality of groups (e.g. four to five groups) based on a common characteristic.

An aspect of some embodiments of the invention relates to an input system wherein a first predefined type of interaction with an input means ambiguously correspond to a first group of characters assigned to said input means, and wherein a second predefined type of interaction with the input means ambiguously correspond to a second group of characters assigned to said input means.

An aspect of some embodiments of the invention relates to an input system wherein a first predefined type of interaction with an input means ambiguously correspond to any character of a group of characters assigned to said input means, and wherein a second predefined type of interaction with an input means (precisely) correspond to an identified character assigned to said input means.

An aspect of the invention relates to an enhanced word predictive data entry system receiving input information in form of precise and/or ambiguous input signals to predict a (e.g. one or more) word. A precise input signal corresponds to an identified character in a character position in said word and an ambiguous signal corresponds to an ambiguous character in a different character position in said word.

An aspect of some embodiments of the invention relates to a data entry system using one or more N-gram (e.g. N>0) database of words to predict a word.

An aspect of some embodiments of the invention relates to a first type of interactions (e.g. gliding actions) provided anywhere and/or on a virtual keypad on a touch sensitive surface to emulate a second type of interactions (e.g. tapping actions) with the keys of a virtual keypad (e.g. or keypad model).

An aspect of some embodiments of the invention relates to editing/entering text (e.g. preferably, instantaneously) in any direction on a virtual content such as a picture/video, and methods to share the (e.g. combined) content with others.

An aspect of some embodiments of the invention relates to commenting (e.g. writing text) in text box relating to a picture/video (e.g. shared or to be shared). For an edited video such comments may be time-stamped at any particular point in the video.

Note that the product of such edited virtual contents mat herein be referred to as an artwork.

An aspect of some embodiments of the invention relates to methods of masking and/or unmasking at least a portion of a/any virtual content (e.g. a text box, a photo, an artwork, a video, etc.) An aspect of the invention relates to creating and/or operating a virtual forum.

An aspect of some embodiments of the invention relates to the selecting/grabbing at least a portion of text (e.g. a word) to modify the said portion.

An aspect of the invention relates to a resizble keyboard having function keys and letter keys, wherein resizing the letter keys may preferably not resize and/or may slightly resize the function keys.

An aspect of the invention relates to a word predictive data entry system using a keyboard having a number of large zones each including a number of letters. Preferably, each of the large zones has a number of small zones each including some of the letters of a large zone. Preferably, said keyboard is a traditional keyboard (e.g., QWERTY, AZERTY, QWERTZ, et.). Preferably, the zones are linear zones each having at least some of the letters of a row of letters of the keyboard. The keyboard may have soft/virtual keys and of physical/hard keys. According to one aspect, the keyboard has two large zones each having three small zones. Preferably, the keyboard has two large zones each including three small zones.

An aspect of the invention relates to a keyboard having a minimized size. The keyboard may have a few number of function and/or special characters keys. The function keys may be arranged (e.g. vertically, horizontally, etc.) in a linear manner.

An aspect of the invention relates to a (e.g. small) wearable device such as a smartwatch preferably having a minimized keyboard. The keyboard may have a few number of function and/or special character keys. The function keys may be arranged (e.g. vertically, horizontally, etc.) in a linear manner.

An aspect of the invention relates to some embodiments of replacing a first content (e.g. such as a keyboard) by a small window (e.g. such as an icon) so as to visualize a large portion of second content on a screen. Preferably, interacting with the small window, returns the first content to screen. Preferably, the small window may be moved on the screen. Optionally, the small window may be permanently displayed on the screen. In this case, interacting with the small window switch the first content on and off the screen.

An aspect of the invention relates to some embodiments regarding controlling at least a portion of a content and/or the secured access to a portion of a content. The content may be controlled and/or secured locally on a user's device, or may be controlled and/or secured remotely on the user's device from another/remote location such as a remote computer, server, device, etc.

An aspect of the invention relates to some embodiments regarding a messaging application have an interface wherein at least a portion of said interface is presented/displayed above/over another content on a screen. The content may change but the interface may preferably continue to be presented/displayed above/over said changing content. Preferably, the changed content may belong to different applications.

An aspect of the invention relates to some embodiments regarding a search method receiving multimedia input/keywords. Preferably, said keywords may contains one or more attributes such as, for example, text, direction of text, location of text, background color, icons, graphics, objects, sound, etc.

An aspect of the invention relates to some embodiments regarding a physical keyboard. Optionally, said keyboard may be attachable to a corresponding (e.g. mobile) device.

An aspect of the invention relates to some embodiments regarding replication/duplication of at least a portion of a content and displaying the replicated content to the user while using a keyboard. Preferably, the replicated content is generally a text. Preferably, the replicated content is the content close to and/or surrounding a cursor in content being replicated. Preferably, the replicated content also contains a cursor wherein said cursors are synchronized in both contents.

An aspect of the invention relates to some embodiments regarding a method of displaying a content on the screen of a device by providing an interaction such as a gliding action from a first predefined window towards a second predefined window. Preferably, said windows are each located a different edges of said screen. Preferably, said windows are narrow bars. Optionally said windows are invisible.

An aspect of the invention relates to some embodiments regarding a word prediction system/data entry system that uses a keyboard having a few large zones, together including all the letters (e.g. alphabetic, phonetic, etc.) of a language. Preferably, each large zone includes a number of small zones, each small zone having a portion of the characters of its corresponding large zone. Optionally, the word prediction system predicts words by considering users interactions with large and/or small zones. Various methods of prediction based on the principles of interaction with large and/or small zones are considered. Optionally, factors such as word frequency of use, best matching word accuracy against large zone interactions, best matching word accuracy against small zone interactions, best matching word accuracy against identified character interactions, etc. are considered. Preferably, the keyboard is a virtual (e.g. on-screen) keyboard. Optionally, the keyboard has physical keys. Optionally, the keyboard has a combination of virtual/soft and physical/hard keys.

BRIEF DESCRIPTION OF THE DRAWINGS

Exemplary non-limiting embodiments of the invention will be described with reference to the following description of embodiments in conjunction with the figures. Identical structures, elements or parts which appear in more than one figure are preferably labeled with a same or similar number in all the figures in which they appear, in which:

FIGS. 2-2C show a keyboard divided into six letter zones in accordance with different embodiments of the invention;

FIGS. 3-3E show a split keyboard divided into six letter zones in accordance with different embodiments of the invention;

FIGS. 4A-4C show a split keyboard of the invention having physical keys in accordance with different embodiments of the invention;

FIGS. 6A-6B show different exemplary letter arrangement on a telephone-type keypad in accordance with different exemplary embodiments of the invention;

FIGS. 7A-7B show different exemplary letter arrangement on keyboard in accordance with different exemplary embodiments of the invention;

FIG. 8A shows an exemplary letter arrangement on keyboard in accordance with an exemplary embodiment of the invention;

FIGS. 10A-12L describe a chatting system and its corresponding exemplary interface over any application running on the screen of a device in accordance with an exemplary embodiment of the invention;

FIGS. 13A-13E show a function bar and a proposed word list related to a keyboard in accordance with different exemplary embodiments of the invention;

FIGS. 19A-19B describe methods of dividing a keyboard in two broadly ambiguous zones and six narrowly ambiguous zones and a method of predicting words in accordance with exemplary embodiments of the invention;

FIG. 19C describes a method of dividing a keyboard into two to four broadly ambiguous zones and six narrowly ambiguous zones and predicting words in accordance with exemplary embodiments of the invention;

FIGS. 19D-19E describe a method of dividing a keyboard into two (or more) broadly ambiguous zones and six narrowly ambiguous zones and predicting words in accordance with exemplary embodiments of the invention;

FIGS. 20A-20C show different types of movable keyboards in accordance with different exemplary embodiments of the invention;

FIGS. 21A-21B describe a method of dividing a keyboard into two to four broadly ambiguous zones and six narrowly ambiguous zones and predicting words in accordance with exemplary embodiments of the invention;

FIGS. 23A-23D show a variety of keyboards having split virtual/on-screen or split physical keys ant the corresponding function bars in accordance with exemplary embodiments of the invention;

FIGS. 25A-25E describe a method of swiping over a keyboard for entering words in accordance with exemplary embodiments of the invention;

FIGS. 28A-28E show different types of attachable/detachable external keyboards for a (e.g. mobile) device in accordance with different exemplary embodiments of the invention;

FIGS. 29A-29E show different types of input interface for a small (e.g. wrist) device in accordance with different exemplary embodiments of the invention;

DETAILED DESCRIPTION OF EMBODIMENTS

The data entry system of the invention generally refers to using a predefined number of keys to enter text/data. The letters/characters of a language are distributed on at least some of said number of keys such that to at least one of the keys (e.g. hereafter may be referred to as an "ambiguous letter key" or "ambiguous key") more than one letter/character is assigned.

According to one embodiment of the invention the keypad may preferably have a few number (e.g. 4 to 8) of keys ambiguously representing more than one character/letter. According to one method, said a few number of keys together substantially represent all of the letters of a language.

Figure 1:
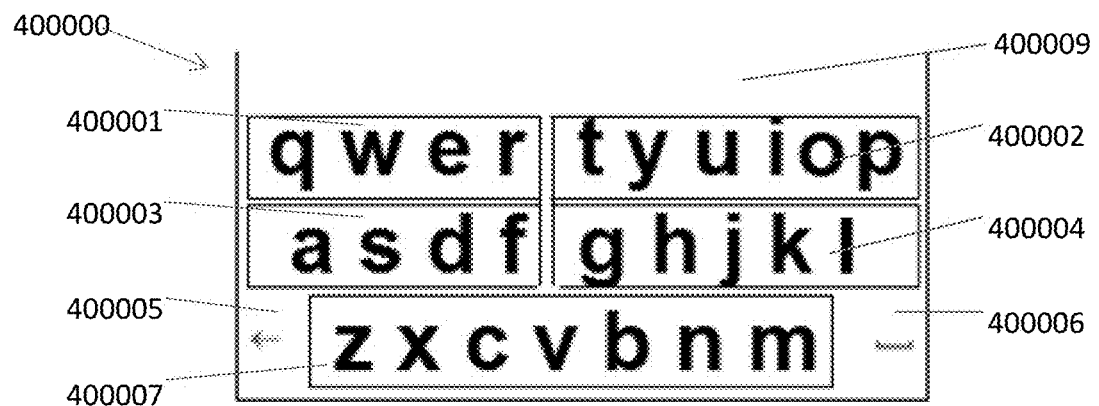
FIG. 1-1B shows a keyboard divided into five letter zones in accordance with different exemplary embodiments of the invention.

Preferably, said keys and the layer layout may represent a traditional keyboard (e.g. QWERTY) form factor. FIG. 1 shows, as an example, a device 400000 having an on-screen keyboard wherein the letter(s) are represented by five zones/keys 400001-400004 and 400007 located on a touch sensitive surface 400009, wherein each of said keys represents a few characters/letters. In this example, the keyboard includes two more keys, namely the Space key 400006 and Backspace key 400005. Preferably the keys are/zones are separated such that to be easily distinguished from each other. In case of a virtual (e.g. on screen, on a touchpad) keyboard the border between the keys are marked by separating delimiters (e.g. lines).

According to one embodiment, the surface relating to the letters of a virtual keyboard may be divided in into few (e.g. 4 to 6) zones each having a plurality of letters. Each of said zones may be considered as an ambiguous key/zone. A word prediction system as described may be used to predict words upon interactions with said zones. The letters may be divided in any manner, preferably, such that to augment the accuracy of the prediction. Preferably, the divided zone may be marked such that to be distinguished from each other.

Figure 1A:
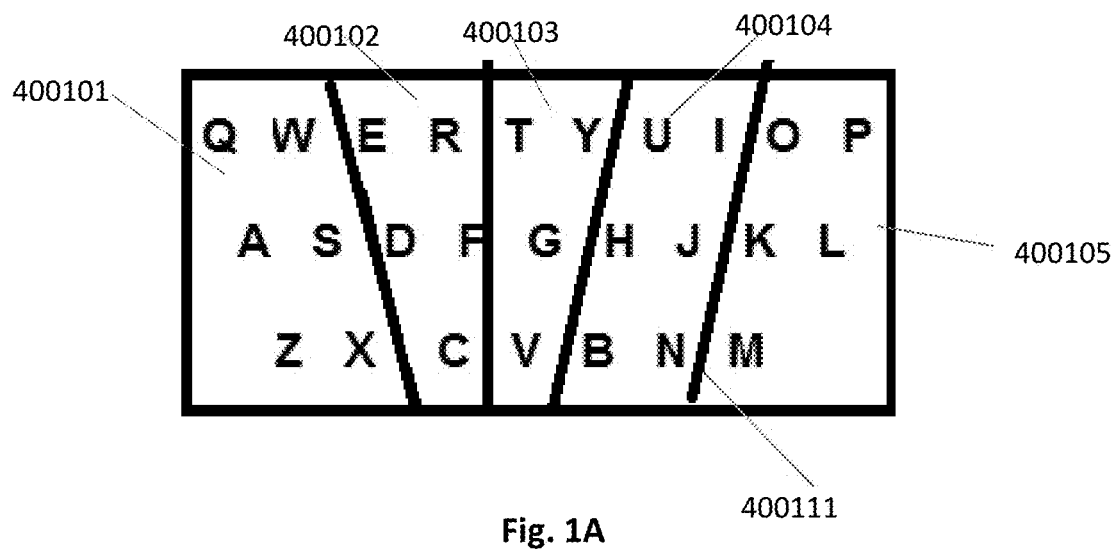

FIG. 1A, shows as an example, an on screen QWERTY keyboard divided into five zones 400101-400105 to each a plurality of letters are assigned. The zones are divided by distinguishing lines (e.g. 400111). All principles (e.g. of data entry) described herein may apply to this type of keyboard. For example, when a zone is interacted, the system may relate the interaction to (e.g. both) an ambiguous input signal (e.g. corresponding to any character of the letters assigned to the interacted zone) and/or to a unambiguous input signal (e.g. corresponding to the letter on which the said interaction is provided).

According to one embodiment of the invention, when a location on a zone is interacted by a user, the system may first consider the characters within said zone on which the interaction impact is provided, to predict a word. Preferably, the priority for consideration may be given to the characters based on their distance from said impact (e.g. respectively from the closest to the farthest). According to one method, in addition (e.g. preferably considering with less priority) the system may also consider the characters (e.g. close to said impact) from a neighboring zone (e.g. horizontally and/or vertically (e.g. preferably by giving higher priority to the characters from the horizontal neighboring zone)) relative to the interacted zone or (e.g. preferably considering with still less priority) from other zones.

A zone of a keyboard may include one or more special characters following the same rules of a letter (e.g. considered ambiguous and/or unambiguous). For example, an apostrophe may be assigned to one of the zones.

Figure 1B:
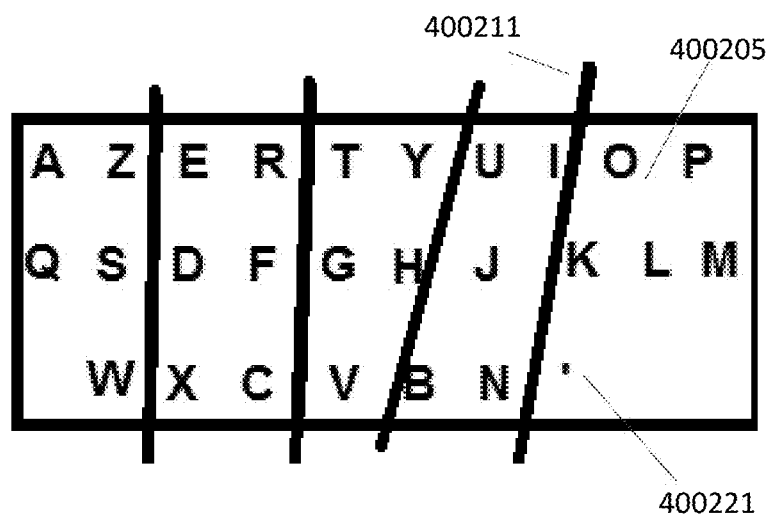

FIG. 1B shows an AZERTY keyboard divided into five zones. In this example an apostrophe 400221 is assigned to the zone 400205. Note that in this example, the separating/distinguishing bars/lines (e.g. 400211) are also traversing outside the letter zone of the keyboard so that to better distinguish the zones from each other.

The rest of the keyboard such as function keys and/or special character keys are not shown here. One or more of said keys may be integrated within a zone but preferably being as an independent key.

It must be noted that the division of a virtual keyboards as shown here are exemplary divisions. Other manner of division of a virtual keyboard based on these principles may be considered (e.g. the keyboard/zones may be divided/defined differently). The dividing such a keyboard may be a predefined division (e.g. by the creator/manufacturer of the keyboard) or a dynamic division (e.g. by the creator/manufacturer of the keyboard or by a/the user). Note that the division of (e.g. preferably the letter keys of) a keyboard may be determined by the user, for example, by providing gestures to define delimiters of (e.g. arbitrary) zones of said keyboard. Preferably said delimiters may be display. Note that the zones of a keyboard may be delimited by (e.g. slightly) distancing said zones from each other.

According to a preferred embodiment, the keyboard is divided into several zones such that the zones are delimited such that to augment the accuracy of the predictive system without deforming the keyboard. As an example, main vowels may be separated from each other by delimiters. Preferably, the delimiters are provided arbitrarily such that each of the zones may have a different shape. Preferably, the delimiters are provided such that each zone is easy to interact with. The number of zones may be defined such that to be as few as possible while keeping prediction accuracy at a high level. Preferably the delimiters are provided from top to bottom or bottom to top. Alternatively, the delimiters can have any shape.

The principles of dividing and presenting a virtual keypad as described has a many advantages. While keeping the form factor of a traditional keyboard, they permit to have few large keys that can be divided differently based on the language used by the keyboard, also permitting to have very high accuracy of word prediction in any language. Such principles, may be very beneficial for languages having many letters (e.g. Russian, Indian, Korean, etc.). The number of zones may vary for example based on the number of letters of a language.

Additionally, a virtual keyboard designed as such may be reduced in height and/or width. Throughout this patent resized keyboard are shown and described in detail.

Note that the principles of division of a virtual keyboard described herein may also be applied to the keyboards having hard/mechanical keys. In this case, interacting with a key within a zone, may precisely correspond to interacted key and/or ambiguously correspond to any of the keys of the zone in which the interacted keys is located. The hard keys of a zone may have a different characteristics (e.g. different color) so that to be easily distinguishable from the keys of another zone.

According to one method, the pair of keys 400001 and 400003, and the pair of keys 400002 and 400004, are (e.g. reduced in size and) positioned on opposite sides of the touch sensitive surface and the zone 400007 (e.g. herein may be referred to as broadly ambiguous zone) is located outside (e.g. between) said pairs of keys.

Preferably, the pairs of keys are arranged such that to form two columns of letter keys. Preferably, the Space key is positioned on the side of a first column of letter keys and the Backspace key is positioned on the side of a second column of letter keys. Optionally, each of said space or the backspace keys may form a column of keys together a first and a second column of letter keys, respectively.

According to one embodiment, a word predictive system using predicting a word from a database of words based on key interaction provided by a user may be used by the data entry system of the invention. The principles of such word prediction system is commonly known (e.g. T9, etc.) Upon interaction(s) (e.g. tapping action(s)) with the one or more said keys/zones, the system may predict a word from the database and preferably propose it to a user.

In the example, FIG. 1, in order to enter the word "why" the user may provide input information corresponding (e.g. precise and/ambiguous input signals corresponding to entering a word by the (e.g. word predictive) system may herein be referred to as input information) to entering said word by for example interactions (e.g. pressing/tapping actions) on ambiguous key 400001, the zone 400004, and the key 400002. The system may propose/predict the word "why" which corresponds to said key/zone interactions and has the highest priority among the words of the database corresponding to said interactions. If the predicted word is the desired word, the user may confirm it by providing an end-of-the-word signal such as tapping on the space key. As such, according to one method, in addition to entering the predicted word, the system may provide a space character after the entered word. Such a system to predict a word may herein be referred to as fully ambiguous/predictive system).

Preferably, the system may simultaneously propose more than one word corresponding to the input information provided by the user. The proposed words may form a wordlist. If a desired word is not in the word list, upon providing a predefined interaction (e.g. a gliding action on/from the wordlist, tapping on an icon, etc.) the system may propose additional corresponding words.

Optionally, the user may be enabled to enter at least one of the characters of the desired word precisely so as to assist the system to enhance the quality of prediction by the system. By receiving and combining said at least one precise/identified character and one or more key presses ambiguously corresponding to at least one of the remaining characters of the desired word, the system may more accurately predict a desired word.

For better prediction results, in addition to the received input information (e.g. provided by key/zone interaction) corresponding to a word being entered (e.g. school), the system may also consider one or more words (e.g. going to) preceding (e.g. already entered) the word being entered (e.g. herein may be referred to as prefix) in a text to predict the current word being entered. For that, according to one method, the entries of the database used by the system may include one word (e.g. herein may be referred to as N-gram wherein N=1) and/or more words (e.g. herein, may be referred to as N-gram wherein N>1 or may be referred to as more that 1-gram entry). By considering said prefix and said input information (e.g. herein may be referred to as combined input information) with the more that 1-gram entries of the database the system may predict a word. It is understood that in some cases, such as when there is no prefix and/or the system does not find a word in more than 1-gram entries that corresponds to the combined input information, etc., the system may compare said input information to the 1-gram entries of the database to predict a word. Note that in this application the word being entered may be referred to as 'current word.

The input information corresponding to a current word may be related to an entire word or it may be related to a portion, preferably to the beginning portion, of a word. Accordingly, the system may look for words (e.g. in the entries of a database of words) that their entire characters correspond to the (combined) input information (e.g. herein may be referred to as short search or short words) or the words that a (e.g. preferably, beginning) portion of them correspond to the (combined) input information (e.g. herein may be referred to as long search or long words).

The letters of a keyboard may be divided into any number of zones/keys. As an example, FIGS. 2-2C show the letters of a keyboard divided into six groups and represented by six zones/keys 401001-401006 each having a plurality of the letters. The division of the letters into said zones is provided such that to extremely enhance the accuracy of the word prediction system using said keys/zones. For example, the letters R and T are assigned to different keys. The same regarding the letters F and G, and to the letters C and V which are also assigned to different keys (e.g. FIG. 2). Note that in the examples of FIGS. 2A to 2C, the letters O and L are swapped for still more accuracy. Note that some groups of letters assigned to a zone may also include one or more special characters (e.g. apostrophe).

Note that preferably the zones of at least one side of a keyboard may have the same number of characters/letters. In the example of FIG. 2A, the left zones of the keyboard have each four letters. This may permit to have a split keyboard (e.g. explained herein) wherein at least one of the portions having a rectangular form factor.

According to one embodiment, the keyboard may be split into two portions. Said portions may be attached to each other or they may have a gap between them, as shown in FIG. 3. Each of said portions 402131/402132 may form a (e.g. vertical) row of keys preferably having reduced width and/or height (e.g. herein may be referred to as reduced mode). On a touch sensitive surface such as a touchscreen said portions may be disposed on opposite sides of the touch sensitive surface (e.g. 402109) as shown in FIG. 3A. Preferably, a switching means may be used to switch the keyboard from large size mode to reduced size mode.

According to one method, one of said row of keys may include the space key and/or one of said row of keys may include the backspace key. According to another method, the space key may be positioned on the side of a first row of keys and the backspace key may be positioned on the side of the second row of keys (e.g. see FIGS. 3B and 3C).

When the keyboard is in reduced size mode, preferably, the function keys may be located on the side(s) of the screen preferably in form of side bars as shown in FIGS. 3A-3E. The keyboard may be moved on the screen to a desired location. Also the portions of the split keyboard may be distanced or approached as shown respectively in FIGS. 3D and 3E.

According to one method, the function keys/icons may be located on the edges of the screen while the letter keys and preferably the space and backspace keys are moved/relocated inside the screen (e.g. see FIG. 3D). According to another method, said function keys are also (e.g. simultaneously) moved/relocated on the screen preferably attached to the rest of the keyboard (e.g. see FIG. 3E).

According to one embodiment, at least the letter keys of the keyboard may be hard/physical keys (e.g. and/or touch sensitive keys/pad/screen separate to the touch sensitive screen/surface) preferably liberating the screen of the corresponding device from a cumbersome on-screen keyboard at least most of the times. FIG. 4A shows as an example, a device having six hard letter keys 403001-403006, a space key 403008 and a backspace key 403007. Said device has also a touchscreen/touch sensitive surface 403009. By using a word prediction system using a database of words, the system can predict the corresponding right/correct words from the database. According to one embodiment, in some cases (e.g. for a word which is not in the database) upon an interaction such a by using a switching means (e.g. by the user) the system may pop up/provide a full/traditional/alternative keyboard on the screen so that the user can enter his/her desired word, character by character, precisely by interacting with the on-screen keyboard. Same may be applied for providing/popping up a keyboard with special characters on the screen. As an example, a long pressing action respectively on the key 403008 and 403007 may respectively correspond to providing/popping up an on-screen keyboard in precise letter mode and precise special character mode. FIG. 4B shows as an example of an on-screen keyboard 403119 corresponding to the precise letter mode (e.g. and digits).

FIG. 4C shows a device having the hard keys as described positioned close to each other such that, for example, said keys can be manipulated with one hand. In this example, interaction with respectively the keys 403221 and 403222 respectively corresponds to providing/popping up an on-screen keyboard in precise letter mode and precise special character mode.

The arrangement of letters on six keys/zones may be applied to the keys of a remote control (e.g. TV remote control, etc.). In order to avoid additional buttons on a remote control, said arrangement of letters may be assigned to the (e.g. existing) buttons, preferably to the number keys of the remote control. As an example the left column of letters and the backspace may be assigned to one of the columns of the number keys, and the right column of letters and the space key may be assigned to another column of the number keys of a remote control. A switch buttons may switch the number keys from number functions to letter/keyboard functions. Preferably the letter keys are used with a word predictive systems for entering text as described herein. Additional characters such as special characters and some functions may be assigned to the remaining buttons of the number keys or other numbers of the remote control. This matter has been described in detail in previous applications filed by this inventor, all of which is included herein by reference.

Figures 5A, 5B, 5C, 5D:
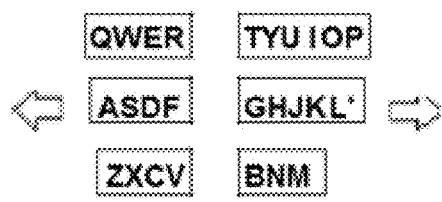
FIGS. 5A-5D show exemplary letter arrangements on keyboards, in some languages, having six letter zones in accordance with different embodiments of the invention.

The manner of division of the letters into six zones may differ to improve the accuracy of the word predictive system. For example, by assigning the letters V and N to different zones/keys in a French keyboard as shown in FIG. 5A, the common words such VOUS and NOUS correspond to different input information (e.g. different sequences of key interaction). In this example, the letters E and D, and the letters O and L are swapped for better accuracy. According to one method any or all of said letters may not be swapped. FIG. 5B shows the arrangement of characters of a Russian keyboard in a manner to augment the accuracy of the word prediction. Note that in this example the letters M and И belong to different zones/keys for better accuracy.

Note that (e.g. minor) modifications to the assignment of letters to different zones/keys may be considered. For example, in FIG. 5C shows another method of assignment of letters to six zones on a keyboard. In FIG. 5D, the split keyboard of the invention has the zones arranged such that the letter locations look like (e.g. similar to) that of a traditional keyboard.

The data entry system of the invention may be used with any type of language such as alphabetical language, phonetic based language, etc. As an example, the system may be used with Pinyin Chinese language. In Chinese language each letter/character is presented by a Pinyin. A pinyin is represented by one or more Roman/English letters. A word of the Chinese language may be constituted of one or more Chinese characters. The database of words used by the system is preferably Pinyin based. By using the (e.g. word predictive) data entry system of the invention and preferably its English keyboard, the user types a desired Pinyin based word. the system proposed one or more such words (e.g. preferably having the highest priorities among the words corresponding to the input information provided by the user) to the user for selection. The system may also propose the Chinese characters/words corresponding to the proposed or selected Pinyins. Preferably, upon providing an end-of-a-word signal such as a space character, the system enters the Chinese word having the highest priority. The user may have also the option to choose any of the proposed words.

When a word is being typed, the chain of precise characters (e.g. herein may be referred to as precise word) being entered may be printed with the text field (e.g. in addition to proposing it in the word list). According to one embodiment, preferably, in addition to said precise word, at least one predicted word (e.g. a word corresponding to the input information provided by the user, with highest priority) may be printed next to the precise word in the text field (e.g. preferably with a separator, for example, a graphic object or a special character between the words). In most text fields, the physical location of the cursor is unknown to the input system. According to one embodiment, the system may propose/display/enter both the precise word and said predicted word, preferably as a single word (e.g. herein may be referred to as the combined word) at the cursor position within the text field. Preferably, the predicted word is printed before the precise word. Preferably, a distinguishing means (e.g. bar(s)/dot(s) between said words, different backgrounds, different fonts or font colors, etc.) may be used to visually distinguish said words from each other. Upon providing an end-of-the-word signal such as pressing the space key, one of said words, preferably the predicted word, is entered into the text field, preferably replacing the combined word. Accordingly, if the user selects a word of the word list, the selected word is entered into the text field, preferably replacing the combined word in the text field.

Principles of entering text directly onto a (e.g. virtual) content has been described before in detail by this inventor. As an example, a user may take or select a photo, provide a gliding action in a desired direction on a location on said photo and start entering text. The text entered may preferably be located in the direction of the gliding action on the content, preferably, starting from location corresponding to the beginning of the gliding action. A menu may be available to the user to select features such as font, color, size, etc. The entry of text may be through any text entry system such as a keyboard, user's speech using a speech recognition system, handwriting, etc. Preferably, upon providing the gliding action a keyboard is provided/pops up on the screen. According to one embodiment, a user may select a zone on a content such as an image, and may start entering text in a desired direction in said zone. Preferably, the defined direction of a zone may also define the direction of the entry of the text. Alternatively, providing a gesture in a desired direction defines the direction of the text within said zone. Said zone may be defined in different manners such as by placing/using a predefined shape of a zone (e.g. a modular and/or rotatable rectangle) or by drawing a desired zone, on the content. Preferably, the text entered will/may be wrapped within said zone, if needed/desired.

According to one embodiment, the data entry system of the invention may be used with a numeric keypad such as the keypad of a remote control (e.g. of a TV). FIG. 6A shows as an example, a such keypad. According to one method, some of the keys of the keypad may include letters (e.g. herein may be referred to as letter keys) and some of them may not include letters and rather include one or more special characters such as digits and/or punctuation marks (e.g. herein may be referred to as special character keys). Preferably, at least some (e.g. preferably all) of the characters (e.g. letters and/or special characters) assigned to a key may be considered as being ambiguously assigned to said key. As such, preferably, a sequence of interactions with one or more of the keys of the keypad may be considered by the system as an input information corresponding to a desired word(s). The system may predict one or more words accordingly. Note that in this case, preferably the special characters assigned to the interacted keys may be considered as part of the input information. As an example, in order to enter the word ABC4, the user types on the keys 405005, 405009, 405008, and 405004. To enter the word NBC9, the user presses the keys 405009, 405009, 405008, and 405009. In this example, according to one method, in order to (e.g. precisely) enter precise/identified (e.g. individual) characters a (e.g. modifier/ing) interaction/key may be used to enter the system and the keypad into another mode where the user can enter characters (e.g. letters, digits, etc.) precisely. For example, in one of such modes the keypad may be related/represent a numeric keypad, for example, to change TV channels. Note that FIG. 6A shows only one option for arranging letters and/or special characters on a keypad. Other/more special characters, other key layouts, other letters and/or special characters, etc. may be considered by people skilled in the art. FIG. 6B shows another example of such a keypad.

According to one embodiment, a zone assigned to a group of characters may be comprised of one or more (e.g. discontinued) subzones. FIG. 7A shows a keyboard of the invention wherein a zone such as the zone 406111 and/or the zone 406112 each include several (e.g. three) subzones. This may permit to divide the letters/characters of a keyboard to a number of groups where in a group may be assigned to a zone comprising several subzones, in order to keep the conventional layout of a keyboard. FIG. 7B shows a French keyboard wherein some of its zones have subzones based on the principles as just described.

FIG. 8A shows a slightly modified French keyboard.

As mentioned before, a sequence of interactions with the keys of a keyboard may be provided by tapping actions on said keys and/or providing gliding actions on/over one or more than one key(s). The swiping actions described throughout this and the previous patent application may preferably be applied to any of the keyboards of the invention.

Systems and methods of hiding/covering (e.g. herein may be referred to as masking) at least a portion of a/any content by another content such as a cover (e.g. herein may be referred to as a mask) and methods of unhiding/unmasking a/said covered at least a portion of a content have been described previously by this inventor (e.g. see the corresponding PCT).

According to one method, a user may select a content mask (e.g. a mask from a menu, an arbitrary content such as a photo, etc.) and cover at least a portion of an artwork. Said artwork may be shared with/sent to a group of one or more users. Sharing methods for sharing a content such as text or a photo or video, etc., with one person or with a group of people is known by most people. Examples of such methods include instant messaging, SMS, products such as Whatsapp, etc. According to one method, when a user (e.g. herein may be referred to as the owner of a mask) provides/puts a mask on an artwork and shares it with a person or a group of people, said mask may preferably not be manipulated/removed/relocated (e.g. herein may be referred to as removed) by a receiver unless its owner (e.g. or other authorized user/controller of the content and/or mask) authorizes said receiver of the content to do so. According to one method, an authorized receiver may remove a mask upon accomplishment of a condition such as, for example, using a password, after a laps of time, etc. According to another method, an authorized user may remove a mask without any condition.

According to one method, a (e.g. mask) providing user may provide a condition for removing/unmasking a hidden (e.g. masked) portion of a content. For example, (e.g. upon an attempt to remove/move a mask) the receiving party may be asked to provide an action (e.g. payment, type/say something, open a link, etc.) so that to become authorized to remove/move the mask.

Note that the hidden (e.g. masked) portion of a content may be of any kind such as a text, an image, a video, an audio, a link, etc.). Also the mask may be of any type such as a visible mask or an invisible mask. For example, an interaction provided on a (e.g. preferably, predefined) location of an screen/image may uncover/pop up/unhidden/activate a hidden content sent to a user. Same may be applied to (e.g. unhiding, discovering, playing) any other (e.g. hidden) content such as a video sent or shred by a providing user to a number of authorized receiving parties.

Note that unhiding a content may be of any kind such as making visible a hidden content, activating a (e.g. computing procedure (e.g. opening a webpage), etc.

According to one embodiment, the uncovering/unhiding a hidden content may be playing an (e.g. a hidden) audio sent to the receiving party. For example, a providing user may register/acquire an audio and send/share it (e.g. along with an image and/or a mask) on with a number of users. The providing user may authorize one or more of the receiving/shared users to listen to the said audio. According to one method, upon accomplishment of a condition (e.g. moving/removing) a/the mask by an authorized receiving user, said audio may be played to said receiving user.

The masking element (e.g. herein referred to as a mask) may be of any kind of content such as an image, a video, a text, the result of a blurring action on a content, etc. As an example, a user may mask (e.g. a portion of) a content such as an image by an/(e.g. another) image. The (e.g. masking) image may be provided by the system or by the user.

According to one method, upon providing a predefined interaction such as a long pressing action (e.g. by an authorized user) may remove/delete the mask from the content.

According to one embodiment, a user may allocate more than one mask to a portion of a content. Preferably, a first mask may be placed on a portion of the content and (e.g. then) upon interaction with said portion/first mask, a second mask (e.g. which has been defined by the owner of the masks) may be shown to the user preferably in said portion of the content.

According to one method, an authorized receiver may not be allowed to remove/relocate the mask on a received content and send the received content to a third party with such modification. Preferably, after sharing such a content, the content may include the said mask in its original received location (e.g. and state).

According to one method, at any moment (e.g. predefined and/or arbitrarily) the list of one or more authorized people to remove/relocate/manipulate a mask may be updated by the owner of a mask (e.g. the person who masked a portion of a content).

According to one method, a person receiving a content (e.g. photo) including a first mask may also include her/his own second mask on a portion on said content, authorize one or more people to manipulate (e.g. remove, relocate, etc.) said second mask and share the content with others (e.g. including the mask(s)). Preferably, each of the masks of such a multi-masked content will have its own authorized people. Note that masks can overlap (e.g. partially or entirely). In such case, according to one method, a new mask overlaps the previous mask. According to another method, an authorized mask may overlap an unauthorized mask (e.g. or vice versa).

According to one embodiment, providing a new content (e.g. writing/typing a text, adding a photo, etc.) (e.g. at least partially) over a mask of a received content may preferably dispose said new content over said mask. As such a chatting (e.g. instant messaging) system at least partially under masks may be introduced to the market.

Note that a (e.g. at least partially) masked content may be of any kind such as a photo, a text, a text box, a video, audio, link, web-address, etc.

According to one embodiment, the masking element may be in the form of a picture such as a smiley wherein upon an uncovering interaction such, for example, as providing a pinching action on said picture, only a portion of said covering element may be opened to see the content under the (e.g. opened) portion. Preferably, upon such uncovering action the picture may be deformed (e.g. providing a cartoon-like picture. As an example, the opened portion may be the mouse of the smiley to being opened).

According to one method, typing on a mask may preferably deform the appearance of a portion of the mask by keeping the overall appearance.

The content editing system/application of the invention (e.g. herein may also be referred to as picture/photo editing application/system) may be used for a (e.g. Instant) messaging application on photos or videos (e.g. herein may be referred to as chatting on photos application). This matter has already been described in detail. According to one embodiment, the history of chatting on and/or about different photos between two or more people may be shown/displayed preferably vertically (e.g. gliding actions (e.g. on the screen) upwards or downwards may result in scrolling in said history), while the history of chatting on and/or about a same photo may be printed/shown horizontally (e.g. gliding actions (e.g. on the screen) rightwards or leftwards may result in scrolling in said history) or vice versa. Preferably, the photos sent by a user are shown/displayed on a first same side of the screen, and the photos received by the user are shown/displayed on the opposite side on the screen. (e.g. gliding actions (e.g. on the screen) upwards or downwards may result in scrolling in said history).

Figure 9A:
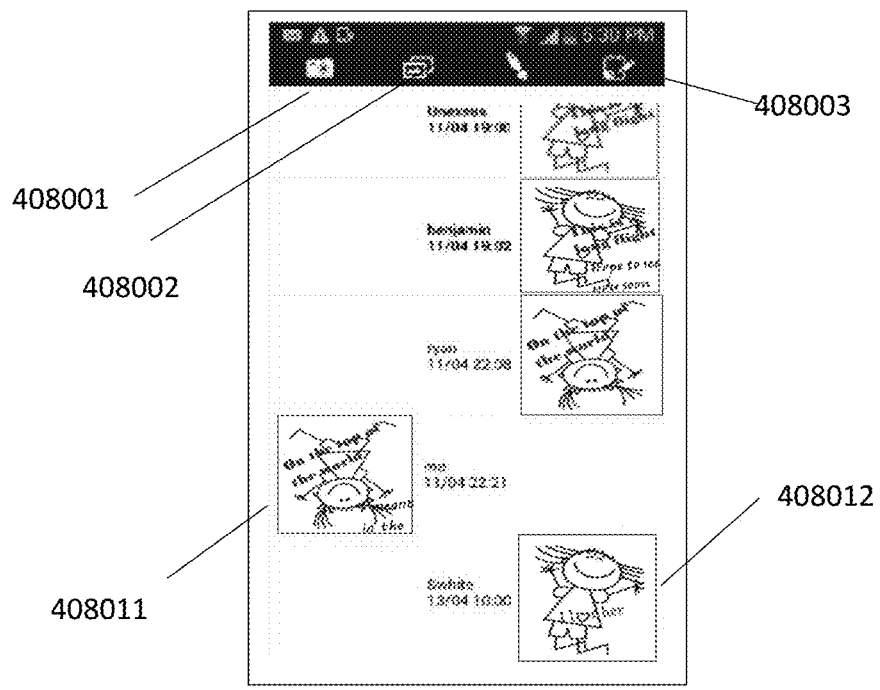
FIGS. 9A-9B shows a content control system and its corresponding exchange history in accordance with an exemplary embodiment of the invention.
Figure 9B:
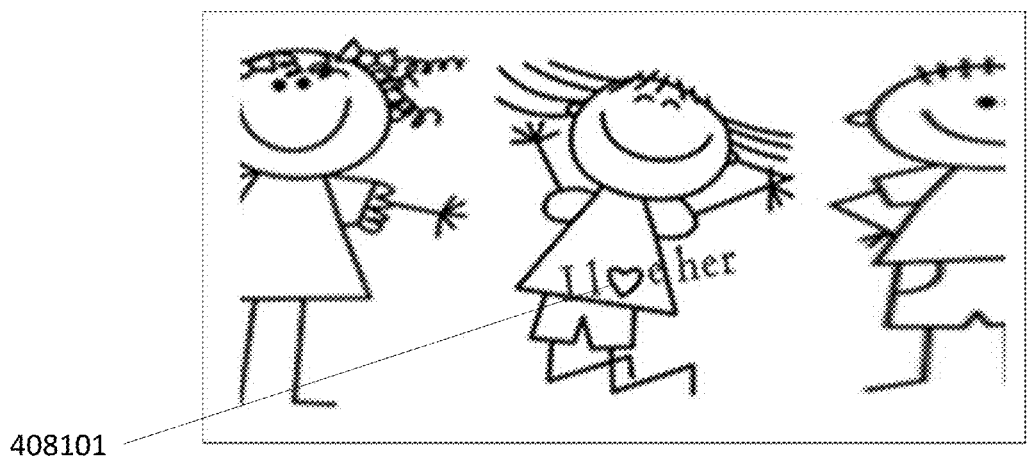

The methods/systems of interactions on a content and using masks, etc., may be used with a/any social interaction system (e.g. such as instant messaging, Whatsapp, etc.). A such social interaction system is described hereafter. According to one embodiment, the history of interaction (e.g. sharing pictures preferably including added contents such as text, mask, etc. Herein may be referred to as chatting) between people (e.g. herein may be referred to as a chatroom (e.g. of two people or a group of people)) may preferably be (e.g. chronologically) shown to a user. Preferably a chronological history may include a portion of the chat. FIG. 9A shows as an example the history of chat room of a group of friends/users on the screen of a device such as a phone. On one (e.g. left) side of the screen, the owner of the device's sent message/s in form of a thumbnail/reduced photo/picture (e.g. 408011) are/is shown. On the opposite (e.g. right) side the received messages (e.g. 408012) are shown in the same manner. Upon interaction with a reduced photo 408012, as shown in FIG. 9B, said message preferably will be shown in enlarged form. In this case, preferably, the user may answer to a received message (e.g. by providing text (e.g. by typing), drawing, masking, etc. on it). According to a first method, the answer (e.g. message) artwork may preferably be shown in the history of the corresponding chat room as described. According to a second method, all of the artworks relating to an original artwork may be shown (e.g. in small/er form factor) next/near to the original artwork in the chat room history. Note that in a chat room other buttons to access a content (e.g. a photo, a video, etc.) may be available to the user. For example, in FIG. 9A, the buttons 408003, 408002 and 408001 are available to respectively access (e.g. and to edit a picture/video), the camera (e.g. to take a picture/video), the gallery (e.g. to select a picture/video) and backgrounds (e.g. to type/draw on). Note that in this example, the received content/photo includes a mask covering 408101 (e.g. in form of a heart) a portion of the received content. If the (e.g. authorized) user removes the mask, the content under the mask may be presented to the user.

According to one embodiment, a text field related to an artwork may be available to entering text. At least a portion of said text field may be shown next to/near the (e.g. reduced) artwork in the chat room history. Upon interacting with said portion and/or with the artwork the text field may be enlarged.

According to one embodiment, an advertising system may be implemented with the masking method. As an example, upon removing/relocating a mask of a received artwork, an advertisement may be shown to the user. Said advertisement may be located on the mask and/or it may cover at least a substantial portion of the screen. Preferably, the content under the mask is shown after viewing at least a portion of the advertisement. The advertisement may be of any kind such as a photo, a movie/video, an audio, etc. and/or a combination of some/all of them.

Preferably, a mask by itself may be or may include an advertisement. In this case, according to one method, a user using such a mask to cover a portion of his/her artwork may be rewarded (e.g. points, money, prizes, etc.) by the supplier of the advertisement. This may be very beneficial for both, advertising companies and users.

Note that all of the features, methods, systems, etc., described in this application may be applied to any type of content and preferably not only to the content editing system of the invention.

According to one method, a first type of interaction such as a sliding action with/on the mask may correspond to relocating/moving the mask and a second type of interaction such as a tapping action with/on the mask may correspond to the/an advertisement functionality (e.g. viewing and/or enlarging a/the corresponding advertisement).

According to one embodiment, a person sharing an unhidden content (e.g. a photo) may include a hidden content (e.g. a text, another photo, an audio, a video, etc.) with said unhidden content and wherein upon accomplishment of a condition (e.g. a predefined interaction provided by a person receiving said content, after a laps of time, etc.) the hidden content may also become unhidden (e.g. viewed). As an example, a user may provide a text on a photo, define said text as hidden, and share the photo with one or more friends. The receiving parties will not see the hidden text. As an example, upon a providing a predefined interaction (e.g. by an authorized receiver) with the photo (e.g. such as for example tapping on a mask provided on the photo) said text may be presented/viewed (e.g. on the photo) to said receiving party.

Note that according to one method, any user that receives a shared content including a mask or a hidden content may be (e.g. automatically) considered as authorized user.

According to one embodiment, fingerprint recognition technology may be used to permit to remove/relocate a mask. As an example, the user may lay/place (e.g. long press) his/her finger on a location such as on a mask itself. A fingerprint recognition system may scan and analyze the user's fingerprint. If the owner of said fingerprint is recognized as an authorized person (e.g. the owner of the receiving device) then the user may be enabled to remove/relocate the mask.

Note that other methods of recognition such as biological finger recognitions (e.g. biological parameters) such as shape and/or size of the finger (e.g. touching the mask) may be used (e.g. for the same purpose).

According to one embodiment, when an image(s) is/are presented on the screen, a gliding action from the edge of the screen towards inside of the screen may correspond to scrolling (e.g. more) images on the screen, while a gliding action departing from inside (e.g. an/the image on) the screen may preferably correspond to the direction of a text to be entered on an/said image.

As mentioned before, the location of the letters on the keyboard of the invention may preferably be similar to a standard (e.g. QWERTY) keyboard with slight modification(s). For better accuracy of prediction, a character such as a letter may be relocated from a first zone preferably to a neighboring zone. Preferably, the new location of said character/letter in a neighboring zone may be very close to said character's/letter's original location. Preferably, the relocated character is a vowel letter such that the main vowels (e.g. A, E, I, O) are assigned to different zones.

According to one embodiment, when the system/user grabs a word, the system may present (e.g. in a words list) several other words (e.g. and said word) corresponding to the input information corresponding to the grabbed word, to the user. Preferably, the preferred choice by the system (e.g. herein may be referred to as the current predicted word) among said several other words may be a word (e.g. preferably, having the same length/number of characters as the grabbed word) other than the grabbed word (e.g. the word with highest frequency of word among said other words, or a known preferred alternative word (e.g. which may or may not directly correspond to said input information)). In this case, after grabbing a word, preferably pressing the space key may correspond to entering a current predicted word other than the grabbed word. This procedure may be repeated more than one time wherein each time another word is presented to the user as the current predicted word.

According to one method, said several other words may preferably be the words that are commonly used (e.g. by, my, see, are, has, had, etc.) for example words that their frequency of use is above a predefined number. As such in the current embodiment such a procedure may preferably not frequently/always be applied.

A fast typist/user may not frequently look at what information/text he/she is entering. There may be a few, preferably common, words (e.g. 'are', 'see') that may correspond to a same input information (e.g. key presses) provided by the user. A list of such (e.g. confusing) words may be available to (e.g. or determined by) the system. According to one embodiment, when a user enters said a same input information (e.g. such a word), an alerting system such as a text-to-speech system may speak (e.g. audibly provide and/or display) said word to the user so that the user is made aware that he/she is entering such a (e.g. expected) word and/or to make the user aware that such a word (e.g. alternative word) is not being entered. Preferably, said alerting system is activated based on an N-gram word entry wherein N>1 (e.g. 'you are', 'you see').

Note that said alerting system may be of any kind such as more silent/short such as a vibration and/or a beep, etc.

Note that such alerting system may alert the user according to full/complete or partial input information corresponding to said (e.g. confusing, common) words, that are available (e.g. or determined by) the system. According to one embodiment upon entering partial input information (e.g. such that the system may identify/predict said available words before the may provide complete information corresponding to such words) corresponding to said words, the system may provide said alert before the user completely enters said complete input information.

As mentioned before, at any moment the provider/owner (e.g. a user, an automated system, etc.) of a mask may change the status of a receiving user from unauthorized to authorized and vice versa. As an example, a user providing a mask on a content (e.g. a text, a video, a photo) may unauthorized all of the shared/receiving users to remove/relocate a provided mask on a content and later (e.g. arbitrated or automatically) authorize at least some of said users to remove/relocate said mask. As an example, a providing user may type a news on a content and mask it and unauthorize all of the receiving users to remove said mask. The providing user may define said users to become authorized users upon accomplishment of a condition such as at a predefined date/time, upon a manual authorization function by the user, etc. so that to be able to remove/relocate the mask. According to one method, upon accomplishment of a condition the mask may be removed/relocated automatically (e.g. without the user's intervention).

According to one embodiment, the picture/content editing application may have its own (e.g. virtual, physical, and/or logical) networking system (e.g. using a server and a database), herein may be referred to as the picture/content editing network.

According to one method, a first user (e.g. identified by the picture/content editing network) of the picture/content editing application may send (e.g. notify a second user and provide the necessary/sufficient data of) a content such as a (e.g. picture) message to a second user (e.g. another user). The sending of said content may take place on the mechanisms (e.g. servers, database, network equipment, etc.) of said picture/content editing network. According to one aspect, the content is send/provided to the second user through the picture editing network when the second user is identified on said picture editing network. If the second user is not part of the picture editing network, the system and/or the first user may attempt to contact the second user to join the network. According to a preferred method a first user may share/send a (e.g. edited) content with/to a second user regardless of the second user being part of the network. In this case, if the second user is not part of the network, the system may send an invitation (e.g. through a SMS or other communications means) to the second user to join the network such that when said second user joins the network (installs and registers the content/picture editing application and/or networking application) the system sends and/or enables the second user to retrieve the edited content (e.g. at that time) after joining said network. In the meantime (e.g. before the second user joins), on the user's device the history (e.g. one or more contents send to the second user) the chat with the second user may be presented to the first user. The same may be applied to a group of users (e.g. group chat) wherein the owner of a group (e.g. a group creator) may invite a number of users to join the group regardless of any of said users being part the network. As such, a group may include users that are part of the network and users that are not part of the network. Note that, after a second user joins the network, the user may see the history (e.g. prior to joining the network) of the chats with said second user.

Note that, the first user generally has the contact information of a second user. For example, preferably in the contact list of the first user (e.g. of first user's device).

According to a second (e.g. another) aspect, a content is send/provided to the second user through another network or communications means (e.g. short messaging servers (SMS), email, Whatsapp instant messaging) when the second user is not (e.g. able to be readily) identified by said picture editing network. As an example of the above mentioned second aspect, a first user of the picture editing application (who is registered on the picture editing network) may edit a content (e.g. a photo) and select a (e.g. said second) user from a contact list of the picture editing application (e.g. said contact list containing users that are identified by the picture editing network and users that are not identified by the picture editing network) where said second user is not identified. In this example, the picture editing application may query (e.g. to determine if the second user is identified in the network) the picture editing network concerning the second user. In the case that the picture editing network cannot identify the user (e.g. for the purposes of the picture editing application), then the picture editing application may attempt to contact the second user via some other (e.g. communication/network) means such as by using the contact information (e.g. preferably from the contact list). In this case, as an example, the picture editing application may use the second user's email to send an email notifying (e.g. inviting) the user about (e.g. to retrieve) the sent content from the picture editing network, or as another example, by using the second user's mobile phone number to send an instant message (e.g. SMS, or Whatsapp message) notifying (e.g. inviting the) user.

According to a third (e.g. another) aspect, the user of the picture editing application may send a content (e.g. a photo, or photo message) such as a (e.g. photo) message to a number of users/destinations such as a group chat where all users included in the group chat may preferably receive content or may at least receive notification of the sending of content communicated within the group chat. Here, not all users included in the group, may be identified by the picture editing network.

As an example of the above mentioned third aspect, a first user of the picture editing application (who is registered on the picture editing network) may edit a content (e.g. a photo) and select a (e.g. one or more said second) user(s) from a contact list of the picture editing application (e.g. said contact list containing users that are identified by the picture editing network and users that are not identified by the picture editing network) where, for example, some of selected said second users are not identified. In this example, the picture editing application may query the picture editing application concerning the second users. In the case that the picture editing network cannot identify a user (e.g. for the purposes of the picture editing application), the picture editing application may attempt to contact any of the unidentified second user(s) via some other (e.g. communication/network) means such as by using the contact information (e.g. preferably from the contact list). In this case, the picture editing application may use the second user's email to send an email notifying (e.g. inviting) the user about (e.g. to retrieve) the sent content, or, as another example, by using the second user's mobile phone number to send an instant message (e.g. SMS, or Whatsapp message) notifying (e.g. inviting the) user.

According to one method, Photos may be enabled to be looked at/edited for as long as the user is looking at it. Once the user closes the picture to do something else, there may be no history, and the photo preferably will be deleted.

According to one method, a content (e.g. photo) may be shared with many/any (e.g. all) of the users having the picture/image/content editing application (e.g. herein may be referred to as public content)

Preferably, Public content/photos may be enabled to fit a limited number of few peoples' writings.

Preferably, as such a multiple copies of the same content may be used to permit writings/comments by more users.

A messaging system wherein its interface is generally above any content/application being opened on the screen is described in detail hereafter (e.g. herein may be referred to as keyboard networking system, chat on any app system, etc.).

According to one embodiment of the invention, people may be members of a networking application (e.g. chat/messaging system) and may interact (e.g. send messages to, content such as an image, audio, invitation etc.) with each other using an interface related to said networking application while also being able to simultaneously interact with an open content/interface related to another application (e.g. herein may be referred to as the main application) is opened on the screen of a device. Preferably the chatting interface overlaps at least a portion of said another app. By using such a keyboard networking system a user can/may chat with others while (e.g. simultaneously) using/interacting (e.g. on the screen) with an additional/other application (e.g. herein the keyboard networking system may be referred to as the chat system/application or first application, and the additional application may be referred to as the/a main application). Preferably, the interface of the keyboard networking/chat application (e.g. herein may be referred to as chat interface) preferably overlaps/overlays at least a portion (e.g. the corresponding portion) of the content/output of the/another application/content (e.g. herein may be referred to as the main application) on the screen. This may permit a multi-tasking procedure/mechanism on a (e.g. mobile) device. As an example, a user may surf the Internet (e.g. the main application), open a page/subject or any other output of a main application and chat with his/her friends about a (e.g. that) page/subject/output. His/her friend may also see/open the same subject/page or another subject/page/application and use the chat application of the invention and chat (back and forth). All methods of identifying, inviting, sending messages, history of chatting, individual and/or group methods of chatting systems, creation of a group, masking methods (e.g. a mask covering at least a portion of a message being sent/shared, etc.) and more such methods as those used by the content editing application of the invention may be implemented with the keyboard networking system of the invention.

According to one method, at least a portion of a shared/sent/outgoing message may be encrypted/not shown/masked (e.g. as described in detail herein) to one or more users among a number users with/to which a message/content is shared/sent. Note that in the keyboard networking system of the invention, a data entry field (e.g. such as a text box/field) may be used to view a message typed (e.g. and to be shared) by the user using an input method such as a/the keyboard.

Note that a text field may belong to (e.g. be part of or under control of) said additional/other (e.g. main) application, or may belong to the keyboard networking system (e.g. each of both applications may have its own text fields. A data entry field dedicated (e.g. under control of) the data entry system (e.g. keyboard) may herein be referred to as the keyboard entry field or chat field).

Note that the keyboard networking system of the invention may have its own user interface (e.g. herein may be referred to as chat interface). Said chat interface may include at least one of a/the keyboard, a data entry field (e.g. corresponding to entering a text which may be saved or shared/sent with/to others, a field/zone corresponding to displaying a received/incoming message, a send/receive means, a (one or more) chat icon/button (described below), etc. Note that according to a preferred method, a receiving message and a sending message (e.g. a message being type, to be sent) may use a same data entry field.

According to a preferred method, a user may receive a notification from another user sending him/her a message. According to one method, (e.g. automatically and/or manually upon receiving a predefined interaction from the receiving user), a means such as an icon/button may be displayed on the screen of the receiving device (e.g. herein may be referred to as chat icon/button) (e.g. using the chat system of the invention. By interacting with said chat icon/button, a corresponding chat interface (e.g. at least a data entry field and/or the keyboard) may be presented on the screen so that the user may start chatting with the corresponding user or a corresponding group of users. A "Send" means/button (e.g. not shown) may be used to send the entered information/content.

According to one embodiment, upon an interaction with a chat icon/button, the corresponding data entry field may be presented on the screen with or without the keyboard being presented on the screen. By interacting with the data entry field the/a keyboard may be presented on the screen.

According to a first method, a corresponding received message may be presented separately from a data entry field. According to a second method, the data entry field may display/include a received message and a message being entered by the user of the receiving device.

Note that a receiving message and a sent message may use (e.g. be displayed on) a same data entry fields or on separate fields.

According to one method, the message/content sent/shared may be encrypted such that to be decrypted by an authorized user(s). Such authorization may be provided in several ways (e.g. simultaneously or separately), for examples provided by the owner/administrator of the group, of the owner/creator sending the message/message, and/or by the sender of the message/content According to one embodiment said an additional/other/main application (e.g. content/photo/video editing application) (e.g. of the system) and the keyboard networking system of the invention may be merged/combined (e.g. to form an integrated service or application).

According to one method, the data entry system may target any data entry field (e.g. text box, text field, picture edit box) of any addition/other application/main. For example, the data entry system of the keyboard networking application may provide text/content to an application (e.g. similar in manner that a keyboard would enter information to an application).

According to one method, preferably the data entry system of the keyboard networking system may only be displayed/enabled for an active/targeted data entry field in an (e.g. additional/other) application.

According to one method, the keyboard networking system may enable users to interact with each other such that they may provide a portion (e.g. all, some) of the content (e.g. text) of (e.g. any) a data entry field (e.g. text field), or other content as the user may like while watching/interacting with a main content. For example, a user may (type a) message or send a/said content to another user while viewing an internet application from of an online competition. Such content may include information (e.g. such as text, hyperlinks, audio, video, images, etc.) from the Internet application form/page (e.g. a link, a photo) and/or some other information source/Internet page.

According to one example, any application may purposely provide a data entry field (e.g. visible or invisible) or instruct the data entry system or keyboard networking system to popup, for example, so that users of said application (e.g. or any other application regarding the keyboard networking system) may interact while using an application (e.g. in conjunction with the keyboard networking application).

Note that the keyboard networking system of the invention may include users using different keyboards. As an example, a cooperation between two keyboard manufacturers may result in using/sharing a same keyboard networking system, wherein users using a first type of keyboard can chat/communicate with users of a second type of keyboard. According to another example, the keyboard networking system may be restricted to use a/the data entry system of the invention. Note that the keyboard networking system may have its own networking system or may use another networking/messaging system (e.g. an existing networking/messaging system such as SMS, IM, etc.).

Figure 10:
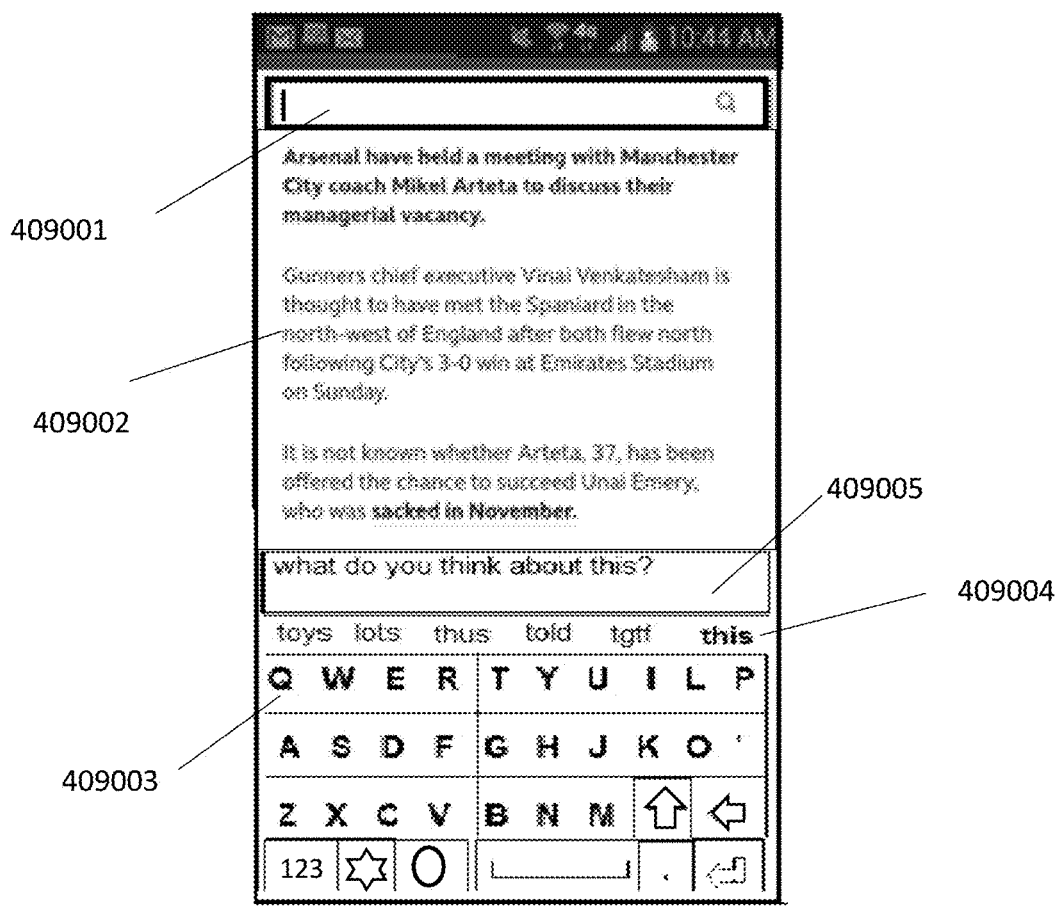

An example of the current embodiment is shown in FIG. 10A. In this example, a device having a touch screen surface is displaying a content 409002 (e.g. a webpage) on the/a touch screen. A keyboard 409003 is presented on the touch screen, for example, by touching a text entry field 409001 of the content. In this example, a keyboard entry field 409005 is also displayed and accessible to the user. A word list

409004 relating a word being entered is also displayed. In this example, the text being entered by a user is entered into the keyboard entry field 409005 so that to be sent to one or more users using the keyboard networking system. By viewing a content on the screen and being able to communicate (e.g. chat) with other users (e.g. simultaneously), users can discuss about the content on the screen and/or about other subjects.

According to one embodiment, upon activation of the keyboard networking system of the invention, a notification is preferably sent to the (e.g. operating system of a/the) corresponding/current device such that when a user opens the notifications page/view (e.g. by interacting with/sliding on a/the notification bar of the device) and interacts with said notification, a chat interface of the keyboard networking system of the invention may be presented/printed on the screen. According to another embodiment, upon activation of the chat system its (e.g. initial, last state/instance) chat interface may be presented on the screen. Said chat interface may be presented fully (e.g. including the chat icons/buttons (e.g. each corresponding to a chat (room) with a different user/group, wherein said chat (rooms) may be preferably be live/open/current chats, and/or closed chats, and/or on pause chats, or chats corresponding to received messages that are waiting to be opened (e.g. and replied), a keyboard, a data entry field, etc., a zone/field to display a received message, etc.) or it may be partially (e.g. only chat icons/buttons) presented on the screen. Note that a same data entry field may be used to display a chat interaction including received messages and sent messages (e.g. replies). According to one aspect, a such notification may preferably always be available in the notification bar/page.

Preferably, upon interacting with said notification (e.g. or when the chat system is activated), a means such as an icon/button may be displayed on the screen to permit selecting a user/group of users (e.g. herein referred to as a group) opening new chats with a user/group from a list of users (e.g. contacts) and/or group of users.

According to a preferred method, when the user interacts with a (e.g. an outgoing) chat icon/button, the/a keyboard and/or a (e.g. corresponding) data entry field become available on the screen (e.g. over/next to the output of the second/main application). Preferably, the data entry field is used to enter any content such as at least one of a text, a photo, a video, an audio, etc. Said data entry field is preferably also used to display any output, such as a chat history, photos, etc.). Preferably, typing on the keyboard provides the corresponding text inside said data entry field. Said keyboard and/or data entry field may be displayed on the screen while an output of said second/main application is also displayed on the screen (e.g. each occupying a (e.g. different) portion of the screen or overlapping said second output). Accordingly, interacting with the button of an incoming message preferably opens said incoming message.

According to one embodiment, said data entry field may preferably belong/related to the keyboard networking application or it may belong to another (e.g. an external) networking/messaging application (e.g. SMS application) used by the keyboard networking system (e.g. of the invention).

According to one method, when (e.g. an instance of) the chat interface (e.g. an icon, a keyboard and/or data entry field, etc.) is displayed on the screen, preferably an invisible or substantially transparent view/glass covers a (e.g. substantial) portion of the second/main content on the screen such that when the user interacts with (e.g. taps/glides on) said view/glass, said view/glass and/or at least a portion of the chat interface (e.g. preferably the keyboard and/or the data entry field, any opened chat) is/becomes removed/closed to permit access (e.g. to full view, and/or manipulation such as, select, navigate, scroll, etc.) to said second/main content. According to another (e.g. preferred method) the/said chat interface may preferably mainly cover/overlay the/a corresponding portion of the main content (e.g. the portion of the main content which is under the chat interface. The rest of said main content is not covered as is accessible to a direct interaction) on the screen such that to permit interacting (e.g. directly) with said content. In this case, according to a first method upon a/said (e.g. direct) (e.g. predefined) interaction (e.g. scrolling, tapping, etc.) with the main content preferably the chat interface remains as is (e.g. unchanged). According to another method, upon said (e.g. direct) interaction with said another/main content the system may remove at least a portion of the chat interface as described. Note that as mentioned, after removing/deactivating the keyboard networking system, a notification as described earlier is preferably sent to the device such that when the user opens the notifications page (e.g. by interacting with a/the notification bar of the device) and interacts with said notification, the chat interface and preferably the corresponding keyboard and/or the data entry fields become available on the screen.

Note that the data entry field may include the chat history between one or more users. It may include the outgoing and incoming messages/contents exchanged between the corresponding users.

According to one method, an interaction (e.g. tabooing, gliding, scrolling) action provided directly on the second content may remove at least a portion (e.g. text fields, keyboard) of the keyboard networking system from the screen.

According to a preferred embodiment, by bringing up a keyboard and a corresponding data entry field by using any procedure such as the procedure described above, a method of chatting between users of (e.g. mobile) devices may be created. Said method of chatting may be used while (e.g. simultaneously) any second/main application (e.g. a web page, a document, a video, a game, a photo, etc.) is being displayed on the screen.

According to one aspect, upon opening the chat interface, a chat list (e.g. in form of a bar) including one or more chat icons/buttons each preferably corresponding to a chat (e.g. chat room/history) with a corresponding user/group may be presented on the screen, over at least a portion of the existing content and without removing it from the screen, such that by interacting with one of said icons/buttons, the user can open a chat (e.g. interface) with a corresponding user/group. Preferably, said chat list corresponds to the users/groups that are currently in chat with the user of the device. A user interaction, for example, such as a gliding action or long press on an icon/button may terminate said chat and preferably delete the icon/button from the (chat) list. Note that according to one aspect, if there is no current chat with anybody, said chat list does not pop up, and preferably only the main button (e.g. 410102 of FIG. 11F) remains on the screen. In addition to the current chats icons/buttons, a means such as a button (e.g. herein may be referred to as the main button of the interface) may be available (e.g. become available when the chat list or chat interface is open, or when a user opens the keyboard networking system of the invention, by for example from the notification bar/page) so that the user can open an additional list of users/groups (e.g. any contacts list such as the contact list of the device, a list of Facebook friends, etc.) to select a user/group and open a new chat (e.g. opening a new instance of chat interface corresponding to the new chat). Preferably, upon such selection a corresponding chat icon/button may be added to the current chat list.

By using such a chatting procedure, users of mobile devices can chat together at any desired moment even/preferably while a content corresponding to another/main application is displayed the screen. They can bring up the chat interface and chat while said content is displayed on the screen. They can chat about said content (e.g. a video, a game, a (e.g. medical) document, etc.) or about any other subject. Note that preferably said chat interface remains on the screen over any of second/main content even when a second/main content is changed by another second content (e.g. said second content may for example be a web page and may be changed/replace by opening another application such as a document, a picture from the gallery of the device, taking a photo using the camera of the device, etc.) on the screen. Preferably, at least a portion of said chat interface (e.g. permanently) remains on the screen over a such second/main content (e.g. or a new main content that replaces said second/main content) preferably at all time and may be removed under a predefined condition such as by the user providing a predefined interaction (e.g. pressing the main button of the interface). Preferably, the interface portion of the keyboard networking system covers/overlays (e.g. overlays) the corresponding portion of (e.g. the content) of the second application on the screen. The rest of the content of the second/main application can be viewed and/or accessed by the user.

Note that preferably, the input provided by the keyboard which is popped up as just described may preferably/mainly be related to enter text in the data entry field of the chat interface. As such the regular usage of a keyboard (e.g. popping up by tapping in a regular text field) may not be affected.

Preferably, a user can enter text in any text box on the screen regardless of to which (e.g. of the two) applications it belongs. As an example, the user may interact with the text box of the main application and enter text in said text box, or he/she may tap in a text field of the keyboard networking application and enter text within said text field.

Preferably, the system may permit multiple chats (e.g. simultaneously). At least the corresponding chat icons/buttons may be presented on the screen. Preferably, the user may switch between chats by interaction with the corresponding chat icons/buttons. Preferably, the icon/button preferably corresponding to the current/open chat may be highlighted.

It is understood that other methods of notification (e.g. for the same purpose) may be created/used by people skilled in the art.

Figure 11A:
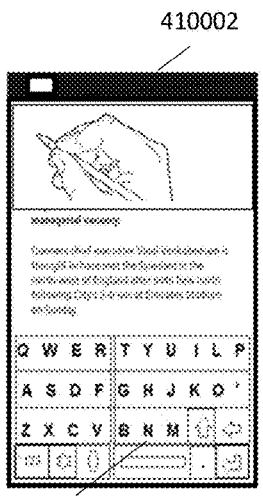
Figure 11B:
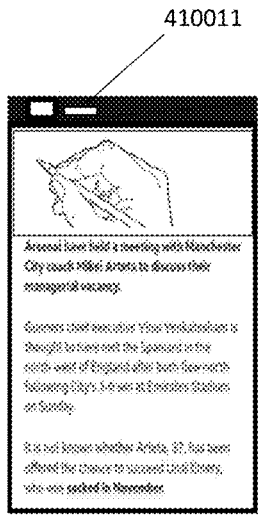
Figure 11C:
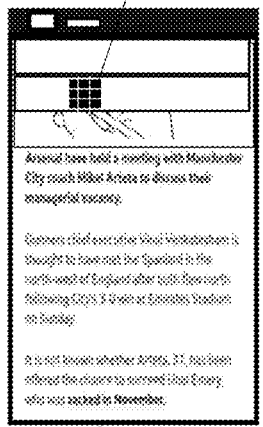
Figure 11D:
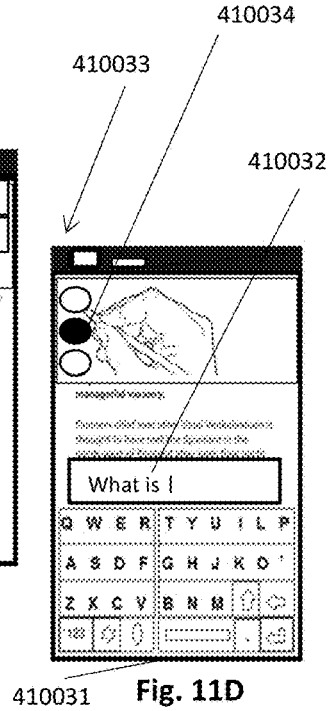

An example of some of the principles of a keyboard networking system of the invention is described through FIGS. 11A to 11D. In FIG. 11A the screen of a device having a popped up touchscreen keyboard 410001 is shown. A notification bar 410002 of the device is also displayed on the screen. According to one method, if a user removes the keyboard networking system from the screen, then as shown in FIG. 11B, a notification 410011 is sent to the device (e.g. to notify that there is no keyboard networking system that is now activated). Then, as shown in FIG. 11C, the user may open the notification list and tap on the/a corresponding received notification 410021 to activate the chat application which as shown FIG. 11D it will result in popping up a chat interface (e.g. fully (e.g. including the chat icons/buttons, keyboard, data entry field) or partially (e.g. chat icons/buttons only) on the screen. The user may tap on a desired chat/button icon 410034 in the chat list 410033 to select/open a chat (e.g. may open the full chat interface if it was partially opened) with a desired user/group.

Figure 11E:
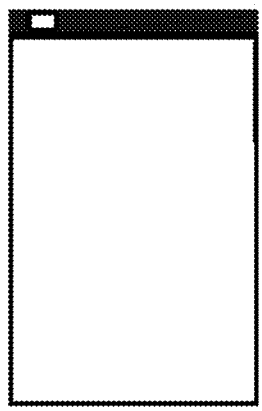

Note that when the keyboard networking system of the invention is activated, an incoming message may automatically pop up a corresponding chat icon/button on the screen (e.g. see icon/button 410041 of FIG. 11E). Note that a/the chat interface may be partially displayed/opened. For example, it may exclude a keyboard and/or the data entry field. As an example, the opened portion may be the chat icons/buttons. Then by tapping on an icon/button a corresponding (e.g. full) a chat interface may be opened on the screen.

Note that according to one method, a user may open more than one chat (e.g. by interacting/tapping on more than one chat icon/button) simultaneously. In this case, preferably multiple corresponding data entry fields and/or incoming messages may be opened, (e.g. simultaneously). The user may select any of said opened chat rooms by providing a predefined interaction such as interacting with (e.g. tapping on) the opened data entry field or incoming message of a corresponding chat room.

According to one embodiment, a user using the keyboard networking system of the invention may be able to exchange information/chat with another user that does not use the keyboard networking system of the invention (e.g. such a network, herein may be referred to as an external networking application. e.g. SMS). In this case, the incoming messages received from an external networking system may (also) be redirected to a/the keyboard networking system of the invention. Accordingly, the outgoing messages from the keyboard networking system of the invention may be sent/directed through/to an/said external networking system.

According to one method, a predefined interaction with a keyboard (e.g. of the invention), may popup the keyboard entry field.

According to one method, a content (e.g. such as a URL, text, image, etc.) may be entered to the entry field and sent by using the keyboard networking system. According to another method, a content (e.g. such as a URL, text, image, etc.) may be acquired (e.g. copied) from (e.g. anywhere in) the/an additional/other/main application into a keyboard entry field of the keyboard networking system and preferably send to other users.

According to one method, a user may active the keyboard networking system (e.g. popping up a keyboard and/or keyboard entry field, history, the corresponding chat interface, etc.) by providing a predefined interaction such as by providing a gesture from the edge of the device, interacting with/tapping on a text field of another application, etc.

According to one embodiment, upon opening/activating the keyboard networking system, a/the chat bar may become available and permanently be open to display the corresponding chat icons/buttons (e.g. herein may be referred to as chat bar) on the screen. According to another embodiment, as described before, upon opening/activating the keyboard networking system, preferably in addition to opening a user/chat interface of the keyboard networking system, a notification may preferably be sent to the (e.g. local) device such that each time the interface of the keyboard networking system is removed from the screen, upon interacting with said notification an interface of the keyboard networking system preferably the chat bar/list may become available to display the corresponding chat icons/buttons on the screen. Said chat bar may be removed from the screen or become hidden upon a providing a predefined interaction such as removing the chat bar (e/g/all of the chat icons/buttons) from the screen, or by removing for example, the icon/button corresponding to the contacts, or simply by pressing a predefined key/zone, etc. Said chat bar may be reactivated by for example again interacting with/a the notification sent to the device when the keyboard networking system was first opened/activated. According to another method, when closing/removing the interface of the keyboard networking system (e.g. the chat bar (e.g. which preferably also includes the button corresponding to the contacts)) the system may send a notification to the device such that interacting with said notification may re-open the chat bar. According to another method, when removing said chat interface (e.g. the chat bar), the keyboard networking system and preferably the corresponding notification closes/removes. Upon opening/activating the system again, a notification is again sent to the device.

Note that, the embodiments, methods, principles, example, described above are used to describe the principles of the keyboard networking system of the invention. It is understood that other methods, examples, etc., may be used to use the keyboard networking system of the invention. For example, the keyboard used with the keyboard networking system may be any type of keyboard from any source (e.g. the chat interface of the system may permit/pop up/accept any/a native keyboard of the device used by a user, or a keyboard dedicated (built-in) the keyboard networking system). Also as an example, closing the system and/or removing the corresponding notification may be done upon accomplement of any other predefined condition.

Also as an example, according to one embodiment, when (e.g. each time) a chat interface (e.g. of the keyboard networking system) (e.g. herein may be referred to as a/the first application) is not displayed on the screen or removed from the screen of a device (e.g. and preferably an output of/related to a second/main application such as a web page, a document, a photo, a video, etc. is displayed on the screen), a notification similar (e.g. for the same purpose) to the one described above may be sent to the device so that interacting with said notification opens/displays the partial or full chat interface corresponding to the keyboard networking system of the invention.

Note that preferably, although the keyboard networking system may accept input from any input method (e.g. keyboard from any keyboard supplier, a voice recognition system, a handwriting recognition system, etc.), it may include a means to allow input from a preferably specified input method (e.g. keyboard).

Figure 11F:
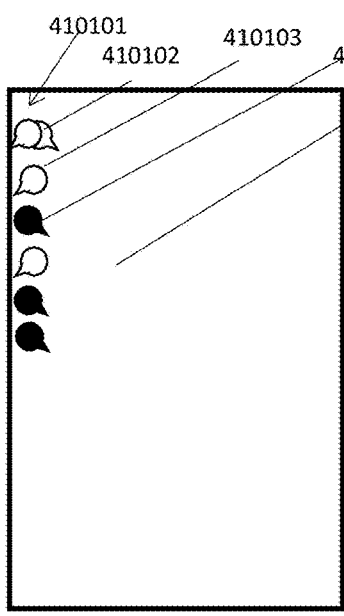

A preferred keyboard networking system and a corresponding exemplary interface is described hereafter. FIG. 11F, shows a chat interface of the system having a chat bar 410101 including several chat (e.g. incoming and outgoing message) buttons. Preferably, an incoming message button (e.g. 410104) and an outgoing message button (e.g. 410103) are presented differently. They may be different in color, shape, etc. Note that the chat interface of the keyboard networking system (e.g. generally) overlaps at least a corresponding portion of a content/output of the/a second/main application which its output is preferably printed on the screen (e.g. note that an output of a main application may include any content (e.g. even an input field). As mentioned before, the main application may be of any kind (e.g. a web page) and may be changed/replaced by a new main application (e.g. a video, a photo application displaying a photo on the screen, a text document, etc.). Upon activating a new main application, preferably, the keyboard networking system of the invention may remain activated and its interface may overlap the content/output of the new main application on the screen. By overlapping a portion of the/a main application, as mentioned, preferably, the user can interact with both the chat application and the main application preferably simultaneously. Note that in the current example, the content of a main application is not shown on the screen 410109.

Figure 11G:
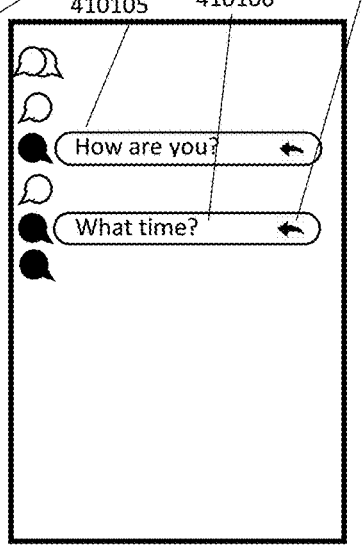
Figure 11H:
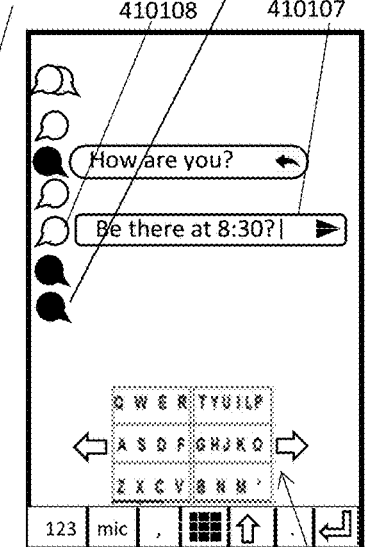

As mentioned, a user may initiate/start a chat by selecting a user/group (e.g. of users) from a list of users. For this he/she may interact with the/a corresponding button (e.g. 410102, herein may be referred to as the main button) of the chat interface to open the/a list of users (e.g. contacts) and select one or more users to (e.g. write/type and) send them messages. The user may also initiate a chat with a new user not from the/a list (e.g. by providing the telephone number (e.g. and/or some other identifying information) of a new user). As mentioned a chat/message bar 410101 may include the icons of one or more incoming and/or outgoing messages. As shown in FIG. 11G, a user may open one or more received messages to view them. For that the user preferably interacts with a/their corresponding chat button(s). In this example, the user has opened the received messages 410105 and 410106. The user may replay to one or more messages by providing a predefined interaction preferably with a corresponding chat interface portion. As an example, in FIG. 11H the user is responding to the received message 410106 of FIG. 11G (e.g. by tapping on the corresponding reply button 410116). When responding, the chat button of the response message (e.g. 410107) may change to another form/color/etc., (e.g. 410108). Note that in this example, a new message is received and its corresponding chat button 410009 is displayed in the chat button bar.

Note that according to one method, the chat buttons may not form a chat bar/They may be presented separately from each other (e.g. on opposite sides) on the screen.

Note that preferably, a user may be able to view a receiving message and respond to it. Preferably the user may switch between the corresponding received/incoming and outgoing messages. According to another method, both, the incoming and the outgoing messages may be shown in a same view/edit box (e.g. as history).

According a preferred method, if a user sends an outgoing message, the corresponding chat interface including its corresponding incoming and/or outgoing buttons is/are deleted from the screen. In this case according to a preferred method, preferably the corresponding incoming and outgoing messages are deleted from the system and no trace/history is kept/memorized/saved. According to another method, the history of (e.g. none shown/deleted) chats may be saved and may be accessed at a later time, on demand (e.g. by providing a predefined interaction (e.g. with a key of the system)), by/through another application, etc.

According to another method, if a user sends an outgoing message, the corresponding chat/text field is closed but its corresponding incoming and/or outgoing buttons are not deleted from the screen, so that the user can send additional messages to said user/group.

According to one embodiment, a user may close an opened received/incoming or outgoing/draft message by providing a predefined interaction such as tapping on the corresponding chat button. Several (e.g. three) scenarios may be considered:

a) In case of closing a response being typed (e.g. draft) to an incoming message, preferably, the corresponding chat button will turn to an incoming message button. When the user interacts with said button again, at first the incoming message will preferably be presented. Preferably from there (e.g. by tapping on the/a reply button (e.g. 410116), the user may re-open the reply/response message and preferably continue his previous response from the instance that he closed it.

b) in case of closing a chat initiated/started by the user (e.g. of the device) without receiving a corresponding incoming message (e.g. a new chat) the system preferably keeps the corresponding outgoing chat button.

c) in case of closing an incoming message the system preferably keeps the corresponding incoming chat button.

Note that other scenarios may be considered based on the principles described herein.

Note that, when the system enters into the/a reply instance (e.g. a text input box is presented to the user), a keyboard (e.g. 410111) may become available (e.g. pop up automatically or manually on the screen) to/by the user.

Figure 11I:
Figure 11J:
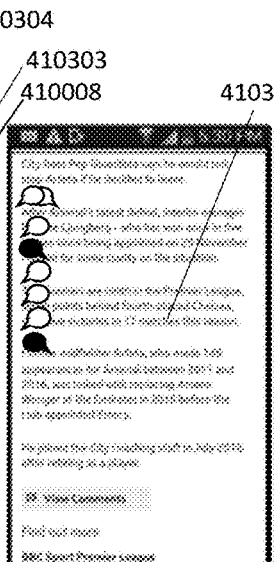
Figure 11K:

FIGS. 11I to 11L are exemplary drawings to demonstrate additional principles of the current (e.g. keyboard networking system) invention. In FIG. 11I, the messaging/chat system (e.g. keyboard networking system) of the invention (e.g. herein may also be referred to as SMSnap) is used within a device. In this example, the interface relating to an instance 410300 of the messaging system is shown (e.g. covering/overlaying a portion of the a content 410308 of a main application displayed on the screen). The chat button bar 410301 shows a number of received messages wherein one of them 410302 is opened, and a number of outgoing messages wherein one of them 410303 is open and a user is using a keyboard 410320 available on the screen to input text in the corresponding text field 410304. An internet/web page 410008 is open on the screen and the user is chatting/typing about a subject (e.g. Donna Summer) included in said Internet/web page. According to a preferred method, upon interacting with the/a main content on the screen (e.g. scrolling the internet/web page for/to view more information (e.g. see internet/web page 410319 of FIG. 11J), tapping on it, long pressing on it, etc.), the system may preferably automatically close all of the opened fields/chats of the chat interface. According to one method, as shown in FIG. 11J, the system preferably shows their corresponding chat buttons. This may permit an almost complete/full view of the corresponding main content (e.g. the web page) on the screen. According to a preferred method, in this case, at any moment, upon a (e.g. predefined) interaction such as interacting with any of the buttons of the chat bar, the system may re-store/re-open the chat interface preferably in its/the instance before it was (e.g. automatically) closed by the system. In the current example, as shown in FIG. 11K, after the user interacts with the chat button 410311, the system re-opens an/the instance 410310 of the chat interface similar to the instance 410300 of the chat interface of FIG. 11I when that was closed (e.g. preferably including the keyboard). Note that, preferably, in the meantime if a new incoming message is received, its corresponding chat icon may also be added to the re-stored chat interface. According to one method, as shown in FIG. 11K, the revived/reinstalled interface may exclude the keyboard.

Figure 11L:
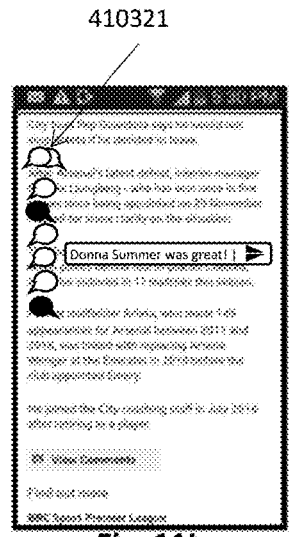

The user may continue his/her interaction with the system/interface. For example, as shown in FIG. 11L, the user may tap on the chat button 410321 to close its corresponding chat window/field.

As mentioned the system preferably stays activated (e.g. and at least a portion of its interface stays on the screen) when a user changes a current main application to another main applications.

Figure 11M:
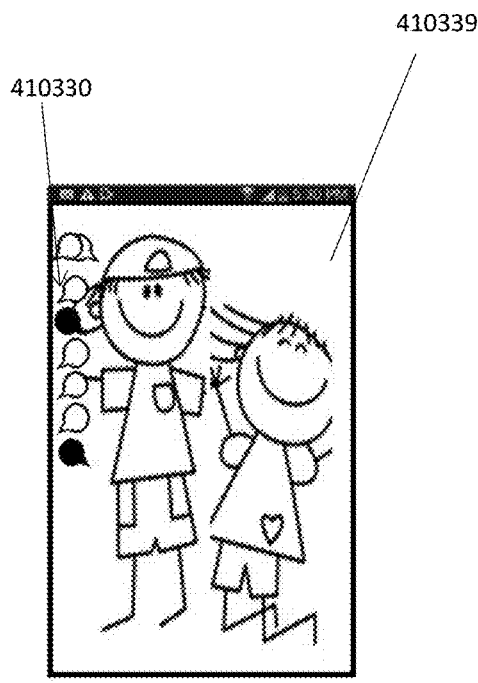

In FIG. 11M, shows the chat interface (e.g. and the chat system) remaining activated after the user changes the main application to another application (e.g. a video 410339 being played on the screen), and wherein the chat interface 410330 of the system overlays a portion 410339 of the output (e.g. a video) of the new main application.

Note that according to one method, when a message is received, it may automatically be opened and shown on the screen.

Note that the history of chats may be tagged (e.g. by user name, date, subject, etc.) and accessed based on any tags.

Note that, when opened, the function bar may preferably overlap the text message box so that chat interface occupy a minimal portion of the screen and/or the main content which is open on the screen.

Note that the SMSnap may be used on/with any content or activity (e.g. on the screen) such as a webpage, a video, a photo, etc. people may watch a same or different videos (e.g. games, live sport video streams, etc.)

According to one method, during reading and/or typing a message all other portions of the chat/SMSnap interface may be removed from the screen. They may be re-shown on the screen preferably after sending or closing said message.

Note that the button corresponding to bringing up the/a contact list on the screen (e.g. 410101 of FIG. 11A) may also be considered as part of the chat buttons bar. According to one aspect, only up to a predefined number of chat buttons may be presented to the user, after which, a predefined (e.g. more) button may be/become available on the screen so that interacting with said button provides more chat buttons on the screen adding to or replacing the current chat buttons shown on the screen.

According to one method, after closing a message being entered (e.g. without sending it or replaying), the icon corresponding to a replay message may be remained/shown on the screen such that if the user interacts with said icon the system re-opens said message.

Preferably, each time a non-finished/non-sent/draft message is reopened the system shows/reinstalls the instance of said message as when is was closed last time.

According to one method, after sending a message, the corresponding chat and preferably the corresponding send and/or receive chat buttons are deleted. According to one aspect, the history of said chat may be memorized so that to be accessed if desired. According to another aspect, all history of said chat will be destroyed.

According to one embodiment, size of a chat field (e.g. of incoming or outgoing message/content or both combined (e.g. a chat history)), history, etc., may be enlarged or reduced by a user or automatically.

According to one aspect, upon a predefined interaction such as providing a long-pressing action on the/a contacts button (of/in the chat bar), the (e.g. chatting) system may become closed/deactivated (e.g. the interface of the chatting system may be removed from the screen). In this case as mentioned before according to one method a notification is preferably sent to the user's device, wherein upon interacting with said notification, the system is re-activated on/in the user's device. According to another method, the/a notification is always available in the notification bar/page of the device.

According to one method, the chat interface, partially or all, may be brought up on the screen upon providing an interaction such as providing a gesture from an edge of the screen towards inside the screen, from a menu of the device, etc. The chat interface may be removed by providing a predefined interaction such as providing a gesture in the opposite direction on the screen, from a menu of the device, etc.

Note that the SMSnap/chat application/system is preferably not used for messaging only. It can also been used locally on the user's device to enter text (e.g. and save it.). For example, a user can/may read an article, view a document, see a video, etc., and take notes using the SMSnap/chat system of the invention. For that, while the system is activated, a predefined interaction such as tapping on a predefined button presented by the system on the screen may open a data entry field (e.g. a text field). A keyboard may be automatically by the system or may be manually by the user popped up in the screen. The user may then enter text within the text field. He may then be able to save the entered text. Note that the saved message may be sent to another user at a later time.

Note that the input of text within a text field of the SMSnap/chat system/chat application (e.g. which is herein also referred to as a/the keyboard networking system) may be provided by any input system or means such as a keyboard, a speech recognition system, a handwriting recognition system, etc.

According to one aspect, the chat buttons and the corresponding chat fields corresponding to an incoming message may be shown/printed on a first side of the screen of a user's device, and the chat buttons and the corresponding chat fields corresponding to an outgoing message may be shown/printed on a second (e.g. the opposite) side of the screen of the user's device.

According to one aspect, the application may have a means to take a (e.g. one or more) screenshot(s) to, for example, share/send it to others. Preferably, the application may also permit selecting/taking a contact such as sharing photos, videos, ground/space positioning, taking a picture(s), and sharing them.

As mentioned, the application may have its own networking system, permitting to create group chats, individual chat, using the masking/unmasking system of the invention to mask a content to be shared, and the methods of unmasking it, etc. A received shared content may be resized such that to be displayed on a portion of the screen of the received device (e.g. reduced size) and/or it may be enlarged to substantially cover the said screen (e.g. enlarged size). Same resizing may be applied to any other content (e.g. relating to the application) such as the history of chat with a party.

According to one aspect, when a message is received and/or sent, an alerting means such as an audio or visual alert may be performed to alert the receiving party. Said alert may vary upon a completion of a condition such as for example from which party a message is received, etc. A specific alert may be assigned as such may be selected manually (e.g. by the owner of a device) or automatically by the system.

According to one aspect, a content shared with others in any content sharing application may be disappeared from the receiving party's device/screen upon a completion of a (e.g. one or more) condition(s) such as for example after a predefined lapse of time. According to a preferred aspect, a user sharing such a content may select some (e.g. one or more) of people with whom he/she shares the content such that the shared content does not disappear/remove (e.g. automatically and/or upon completion of said condition) from their device/screen. According to another concept the selected people are those that the content disappeared/is removed upon completion of a condition while on other receiving user's devices the content remains on the screen/device.

The chatting application of the invention may include additional features such as camera, photo attachment, ground positioning (e.g. of the user's device), call back (e.g. calling the party that has sent a (e.g. an opened) message, short history (e.g. reduced size history of chat with a person/group), large history (e.g. history displayed on substantially whole screen), etc. Said features may be accessed from a menu list/bar. Said menu list may be opened by using a means such as a button. Said button may be within a chat. According to one method, upon interaction with the main button of the chat application said menu list may be opened. According to one method, said menu list may also include a button for opening the contact list, while according to another method, upon interaction with the main button in addition to the menu list the contact list will also become open.

Figure 12A:
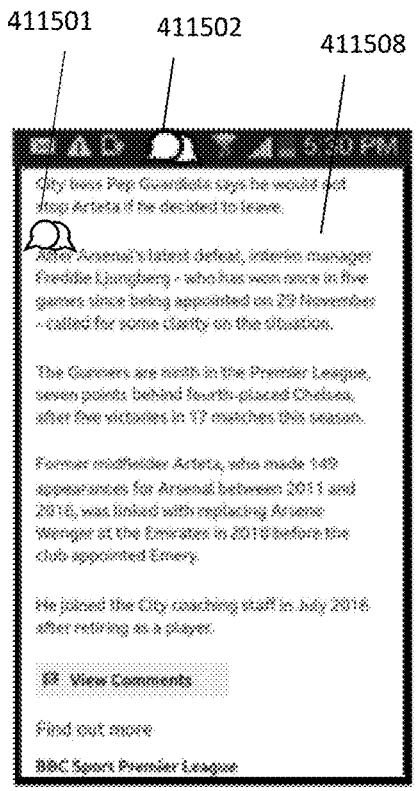

FIGS. 12A to 12L show an exemplary preferred interface of the chat (e.g. on any app) application on the invention. FIG. 12A shows a device of a first user having installed the chatting application of the invention and wherein the main menu (e.g. or main button) 411501 is preferably popped up on a content 411508 on the screen of the device. As mentioned, preferably said main menu and other components of the interface of the chatting application is present on the screen above or together with any other content or any other application on the screen permitting the user to preferably interact simultaneously with both/any/all applications. Note that said other/any other content or any other application may herein be referred to as the other application. Note that the chatting interface may preferably remain on the screen preferably above any other application even if a second other application replaces a first other application on the screen. As mentioned, according to a preferred method, a long pressing action on the main button 411501 removes the chatting application from the screen. To bring it back, the user may use the notification bar/page 411502 in which the chatting application button may always be present or may become present after the user removes the application from the screen or, optionally, after some other event (e.g. a system event).

Figure 12B:
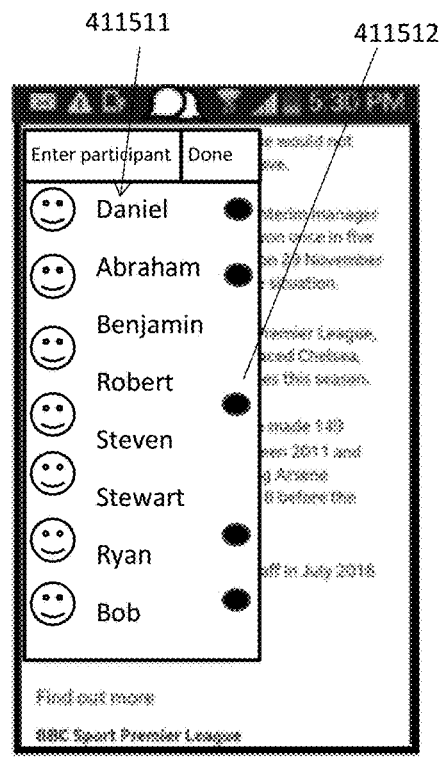

According to one method, an interaction such a tapping action on the main button may present the/a contact list 411511 to the user, as shown in the example of FIG. 12B. In the contact list an icon 411512 highlights a user that has the chatting application of the invention on his/her device and/or use the networking system of the chatting application, or, optionally, some means of interacting with the chat (e.g. on any app) application of the invention. As mentioned before according to one method, other systems of messaging such as a SMS system may be used for chat with the users that do not have the chatting system of the invention. In any case, preferably, all/some incoming messages received through the chatting network of the invention or from any other network may be integrated in the chatting system of the invention and/or shown to the user using the chatting system of the invention.

Figure 12C:
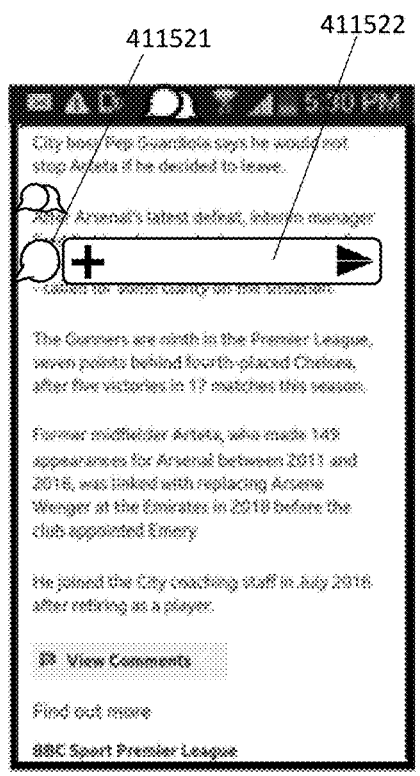
Figure 12D:
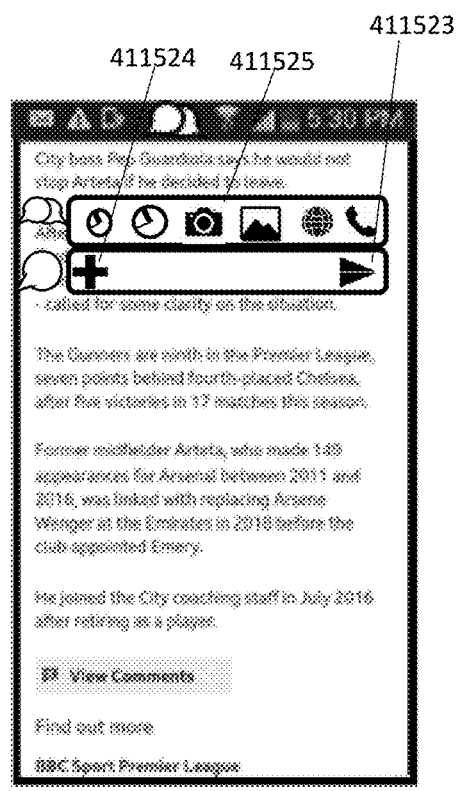
Figure 12I:
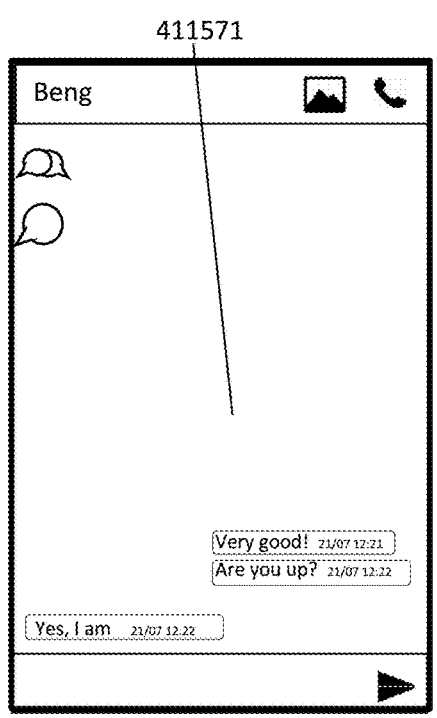

In FIG. 12C, after selecting a user, an icon 411521 corresponding to a/the chat(s) (e.g. herein may be referred to as a chatroom icon) may be presented on the screen preferably adjacent to an edge of the screen. Preferably said icon may be dragable/moveable on the screen preferably by a user. A tapping action on said icon (e.g. or automatically upon selecting a user, the system) may open at least a portion of a corresponding chat interface. In this example, the opened portion 411522 is a text box to type a message and sending it by tapping on a send button/icon 411523, as shown in FIG. 12D. In FIG. 12D, an interaction with an icon 411524 preferably corresponding to the selected chatroom may open a corresponding chat menu/function bar 411525 for accessing additional features such as to a camera or to a gallery for taking/selecting a photo or video and sending it (e.g. automatically) preferably to the selected user, a button corresponding to calling (e.g. automatically) preferably the selected user, sending a ground positioning map regarding the location of the device/user, etc.

In the example of FIG. 12E, upon an interaction such as selecting a user or upon interaction with the text field 411522, a keyboard 411526 may become available so that the user can type a message and send it to the/a corresponding user.

FIG. 12F shows the device of a user to which the/a message is sent. Upon receiving a message, a corresponding chat icon 411551 may become present on the screen (e.g. if said chat icon is not already present on the screen) and/or an alert may preferably inform the user of the incoming message. Said alert may be an audio, vibration, or visual (e.g. 411552). According to one method, upon interacting with the chat icon the system opens the received chat 411553 (e.g. in FIG. 12G). According to another method, upon receiving a message the system opens the received chat 411553 automatically. The user may reply to the received chat opening a sending message interface upon for example an interaction such as tapping on a reply icon 411554.

Note that a user may chat simultaneously with different users (e.g. multi-chatting system). In this case according to one method several chat interfaces may be at least partially open on the screen. According to another method, when only one chat interface can be open on the screen and other current chats may be closed and be represented by their chat icons only. In this case when a user opens a closed chat, the other open chat will be automatically closed and only its icon will be present on the screen.

As mentioned before, the system may include additional features. One of said features may be displaying the history of the chats with a person/group (e.g. history of a chatroom). According to a preferred method the system may have a reduced in size chat history 411561 (e.g. FIG. 12H) and an enlarged chat history 411571 (e.g. FIG. 12I). Said chat histories may be opened by providing a predefined interaction such as providing respectively a tapping on the buttons 411562 and 411563 (e.g. as shown in FIG. 12H).

Figure 12J:
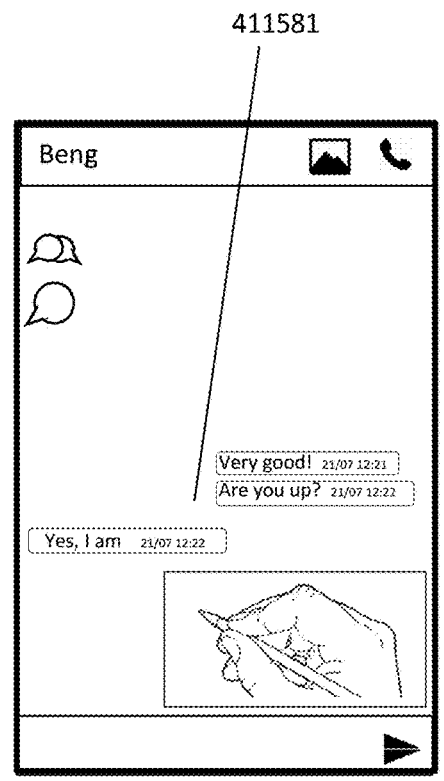

As mentioned before, any of the chat histories may include any content (e.g. text, image, video, audio, etc.). In FIG. 12J, the history 411581 includes text and image.

Figure 12K:
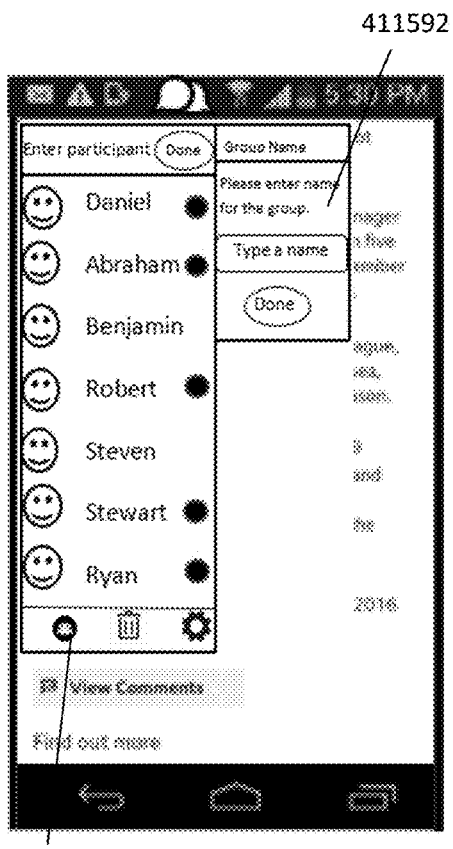
Figure 12L:
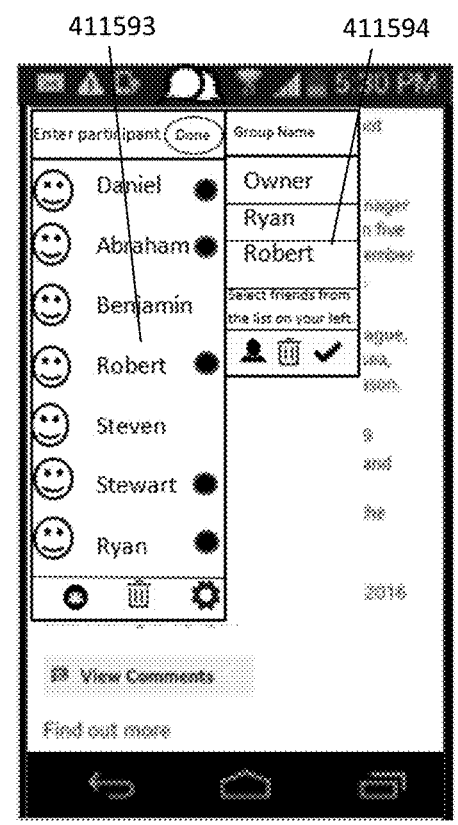

The system may also include a (e.g. simplified) creation of a group chat. As shown in FIG. 12K, upon interacting with a means (e.g. interaction with the button 411591) corresponding to creating a group chat, the user may present an interface 411592 to name a group (e.g. by a user), and, preferably, then as shown in FIG. 12L the user may select a number of users from a/the (e.g. contact) list 411593 to include then in a/the group 411594. According to one method, a group may include an (e.g. one or more) individual and/or a (e.g. one or more) group.

Note that a (e.g. contact) list may include a (e.g. created) group too.

Note that the methods, aspects, descriptions, drawing, etc., described here are examples to describe the principles of a chatting system that is targeted to be available on/with any other app preferably simultaneously. Other methods, aspects, descriptions, drawing, etc., may be considered by people skilled in the art for the same purpose.

According to one embodiment, the keyboard of the invention may be made of several portions (e.g. see exemplary FIG. 13A). A first portion (e.g. 411001) may primarily include letters of the language, and a second portion (e.g. 411008) may primarily include function keys and preferably a few common punctuations marks such as, for example, dot and comma. Preferably, the first portion may also include space key (e.g. 411002) and/or the backspace key (e.g. 411003). Preferably at least one of the portions is movable on the screen. For example, the first portion is movable on the screen and the second portion is fixedly positioned on the screen (e.g. or vise versa). Preferably, the second portion is positioned on an edge of the screen (e.g. in form of a bar). Preferably, the keyboard includes a means such as a key 411009 (e.g. by pressing on it) to switch between a compact mode (e.g. fully ambiguous mode) and expanded mode (e.g. to enter also characters precisely) or vise versa.

According to one embodiment, the word list is located adjacent to the function bar (e.g. above the function bar) preferably close to the edge of the screen so that to provide a reduced input interface even during the entry of a word. In the example of FIG. 13B, such a word list 411007 is shown adjacent to the function bar 411008 and located just above the function bar.

According to a preferred embodiment, in order to further (e.g. compared to immediately above description of the keyboard) reduce the size of the input interface, the word list may preferably overlap (e.g. or replace) the function bar (e.g. preferably close to the edge of the screen). Preferably, the length of the wordlist is limited in size (e.g. less than the length of the function bar) so that to permit access to some of the functions (e.g. that may be presented on the word list) of the function bar while the word list is presented. Preferably, the functions that can be accessed are those that may be used during the entry of a word. FIG. 13C shows as an example, a word list 412007 overlapping (e.g. or being included as) a portion of a function bar 412008 wherein such that two portions 4120081 and 4120082 of the function bar 412008 (e.g. each having some functions) may be accessible.

The principles just described may also be applied to a symbol bar. As an example, optionally, in the current embodiment, after entering a word, a symbol bar may replace such a word list. FIG. 13D shows as an example, after entering the word "how" a symbol bar 412017 partially overlaps (e.g. or is included in) the function bar 412008.

Note that both, the word list and the symbol bar may be expanded (e.g. by sliding up from the corresponding bar) and/or scrolled to show more corresponding options.

In the current example, FIG. 13E shows as an example, the entire function bar 412008 after the word list and/or the symbol bar is/are removed.

According to another method, the word list and/or the symbol bar may cover any portion and even substantially the entire function bar. In this case, according to one method, after entering a word (e.g. by pressing the space key), if the system covers the function bar with a symbol bar, then user may (e.g. again) press the space key to remove the symbol bar. In this case (e.g. if the user provided two consecutive pressing actions on the space key), the system may not relate the second pressing action on the space key to a spacing function.

Preferably, the content (e.g. other than the input interface) on the screen is displayed such that to not be covered or not cover any one of the function bar, word list, and symbol bar.

Figure 14A:
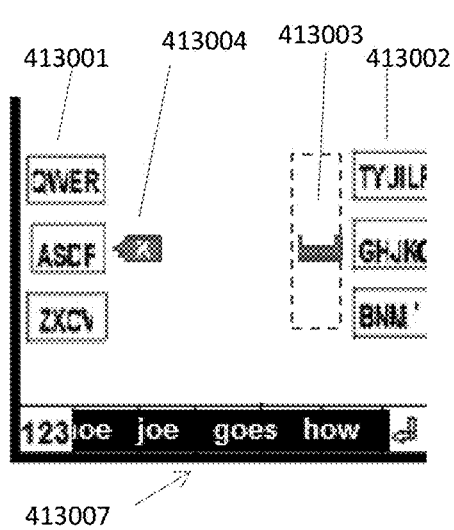
FIGS. 14A-15E show different types keyboards and use of a functions bar on a phone and/or on a Smartwatch in accordance with different exemplary embodiments of the invention.
Figure 14B:
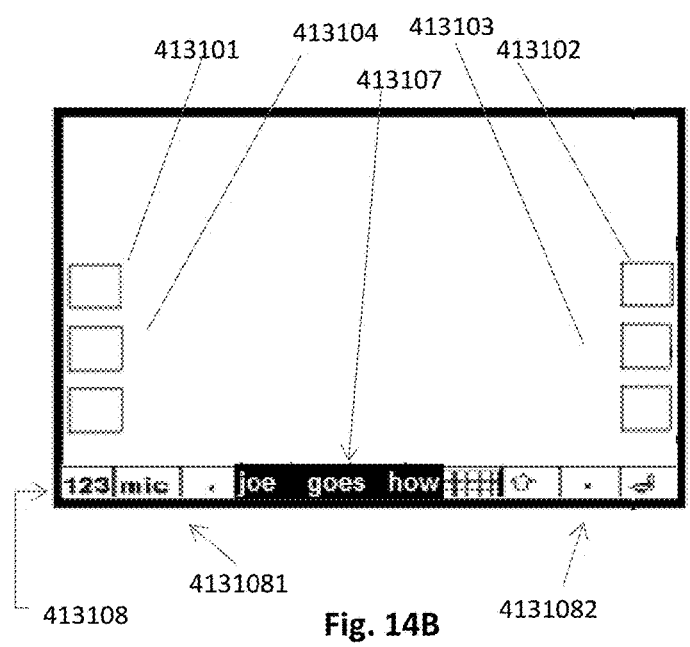

FIGS. 14A to 14B show the keyboard of the invention according to another exemplary aspect. In FIG. 14A, at least the letter keys keyboard of the invention is split in two portions each forming a bar respectively, 413001 and 413002. Said portions may be movable on the screen. In this example, the key bar 413001 is located on the left edge of the screen and the key bar 413002 is located on the opposite edge of the screen. In this example, each of the portions of the keyboard have one of the backspace key and the space key. The space key 413003 is located on the left side of the right bar and the backspace key 413004 is located on the right side of the left bar. Preferably, the space and/or the backspace key have a form of a bar preferably the same size as the letter keys bar. Preferably, the space and/or the backspace keys are invisible (e.g. in this example, the discontinued lines are used around the invisible space key to demonstrate the borders of such an invisible key). Preferably, the space and the backspace keys are represented by their respective icons. According to one method, the icons are not shown to permit view to the content displayed on the screen under the keyboard. According to one method, all of the keys (e.g. the letter keys of the left portion and the backspace key, and/or the letter keys of the right portion and the space key) of each portion of the keyboard together form a single keybar for each respective portion (e.g. see key bars 414101 and 414102 of FIG. 15B).

In the example of FIG. 14B, the letter keys of the letter bars 413101 and 413102 are invisible/transparent and are represented by their borders in the corresponding figure of this example. Also in this example, the space key 413103 and the backspace key 413104 are shown completely transparent (e.g. their borders are also not shown). This may permit an almost completely invisible input interface most of the time on the screen (e.g. except when the user switches the system into the expanded/visible mode (e.g. to for example enter a password or a special character). According to one method, the keys of a/the expanded keyboard may form a frame or bar contouring the edges of the screen.

Note that in the current example, the device is in the landscape mode and, for example, therefore has room for the function bar 413108 and/or word list 413107 and/or the symbol bar. This may permit to show a number of function keys (e.g. 4131081 and 4131082) and/or words/symbols while a word list and/or a symbol bar is present.

Figure 15A:
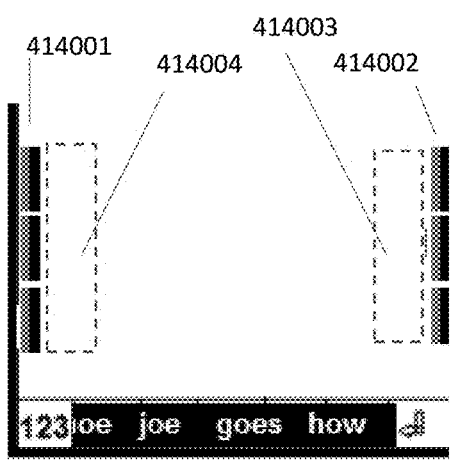
Figure 15B:
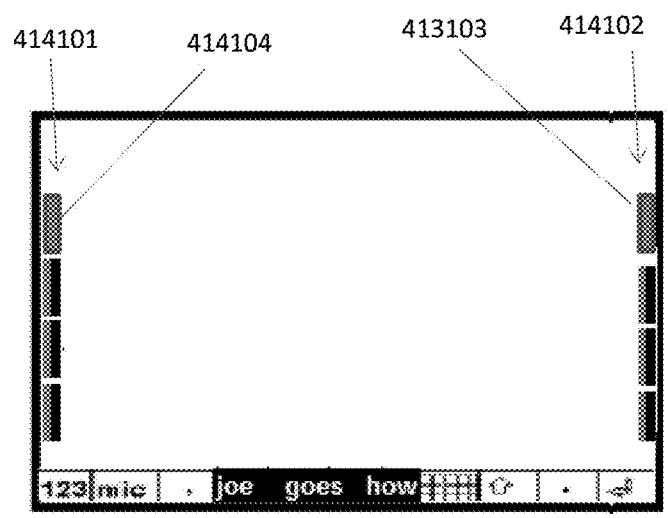

In the example of FIG. 15A, the letter keys (e.g. or their visible portion. The key may be of bigger size but only a portion of it being visible in form of a bar) of the keyboard have the form of (small) narrow bars forming two long narrow bars of keys 414001 and 414002 located adjacent to the edges of the screen. A such letter key may be interacted with by either tapping on it or, by providing a gesture from it or by a gesture starting from outside the screen towards inside the screen by first interacting with said key. This matter has already been described in detail by this inventor. In this example, the space key 414003 and backspace key 414004 are invisible (e.g. transparent). In the example of FIG. 15B, the space key 414103 and the backspace key 414104 (e.g. or their visible portion) are narrow bars and each form a single long bar of keys (e.g. 414101 or 414102) with their respective letter keys. Said single long bars of keys (e.g. 414101 or 414102) are, preferably, located on the edges of the screen, for example, to free a maximum space on the screen to view a content under the input system.

It is understood that these are examples and other methods of displaying keys of the keyboard of may be considered such that to maximize the view of a content on the screen while the data entry system is also available.

Figure 15C:
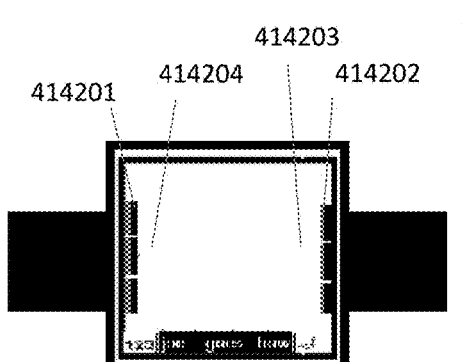

These methods of reducing the view of an input interface are may be implemented in device with very small screen such as wrist electronic device. FIG. 15C shows an input interface similar to that of the FIG. 15A being implemented within (e.g. the screen of) a Smartwatch.

According to one embodiment, each one of at least the commonly used special characters and/or functions may be assigned to providing a gesture in a corresponding direction departing from a predefined key of the letter portion of the keyboard of the invention (e.g. a letter key and/or the space or backspace key). These matters have already been described before in detail by this inventor.

Figure 16:
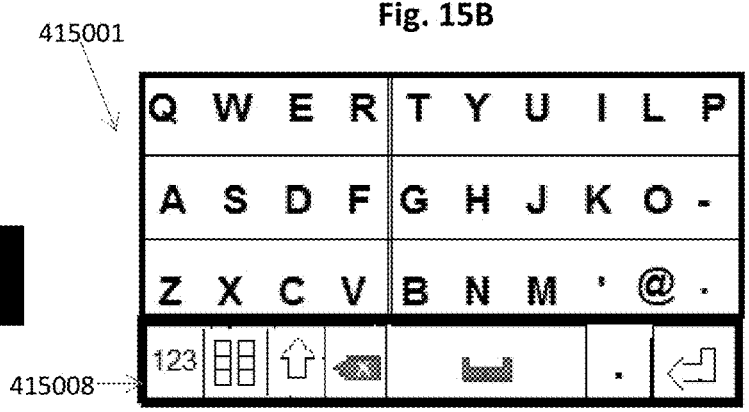
FIGS. 16-16E describe the use of a functions bar with different types/modes of keyboard in accordance with different exemplary embodiments of the invention.

The function bar described herein may be used with any type of arrangement of letter keys. As an example, a such function bar (e.g. also including space key and the backspace key) may be used with any type of input method such as for example an expanded letter-keys keyboard, a speech recognition system, etc. As an example, in FIG. 16, a function 415008 bar is used with an expanded letter-key keyboard 415001. In this example, the function bar also includes a backspace key and a space key. Said function bar and said expanded letter-key keyboard may preferably be separated from each other. For example, the function bar 415008 may be fixed (e.g. docked on the bottom of the screen) and the expanded letter-key portion/keyboard 415001 may be movable on the screen. A word list and/or a symbol bar may be used with the system and presented preferably such as described before. The expanded letter portion 415001 may be replaced by any other input method such as the small (e.g. letter-key) keyboard (e.g. 411001 of FIG. 13A) of the invention (e.g. a speech recognition system, a handwriting recognition system, etc.).

Note that according to one method, upon providing a gesture on a location on the screen, a keyboard may pop up at said location. The orientation of the keyboard may be based on/similar to the orientation of said gesture.

As mentioned, the function bar and the letter portion of the keyboard may be considered as two separate portions wherein different functions may be applied to them. As mentioned before for example, the function bar may be a fixed portion of the keyboard and be preferably located on an edge of the/a screen of the corresponding device. On the other hand as an example, the letter portion of the keyboard may be resizable, movable on the screen, being visible or invisible (e.g. by switching back and forth), etc.

Figure 16A:
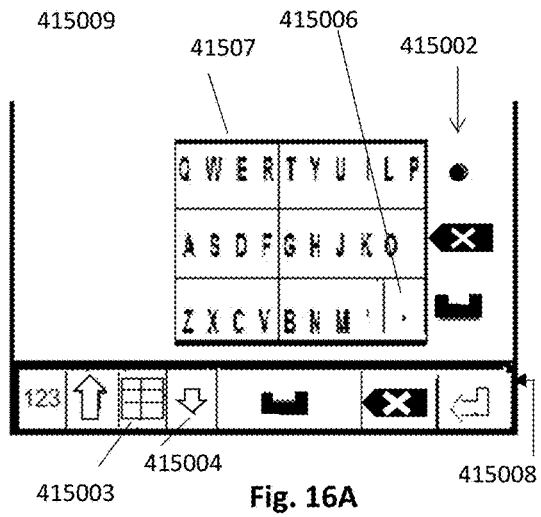
Figure 16B:
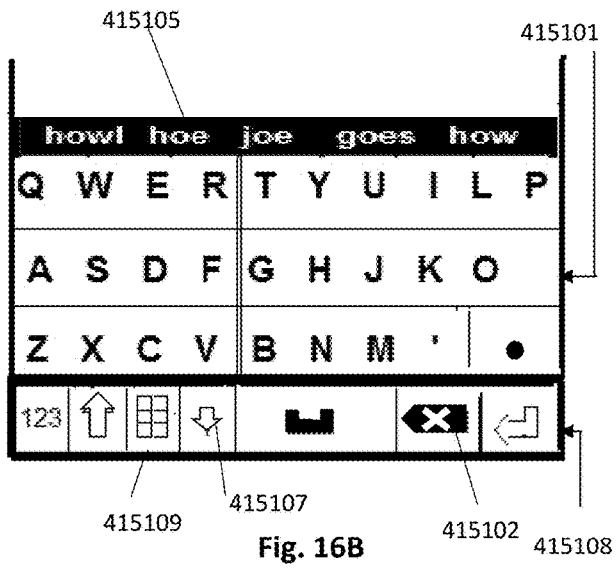

FIG. 16A shows a keyboard of the invention having two portions, a function bar portion 415008 and a letter portion 415007 as described, positioned on the screen 415009 of a device such as a smartphone or a tablet computer. In this example, the letter portion 415007 is reduced in size. In this example, optionally, the letter portion also includes a small function bar 415002, located on a side of the letter portion 415007, having some very frequently used functions such as space key, backspace key and a dot/period key. According to one embodiment, a portion of the keyboard, preferably the letter portion, may be removed from the screen (e.g. by a providing predefined interaction, or automatically upon accomplishment of a condition). The other portion, preferably the function bar, may remain on the screen. This may permit a quick access to almost the full screen also permitting a fast reinstall of said removed (e.g. letter) portion on the screen. In the current example, tapping on a key 415004 in the function bar is used for removing the letter portion of the keyboard from the screen. FIG. 16D shows the keyboard of the invention after removing the letter portion from the screen. As shown in this example, at this time only the function bar 415308 of the keyboard is presented on the screen. At this time, a predefined interaction such as for example interacting with the (e.g. same) key 415304, the removed portion may be reinstalled back on the screen. Note that a key 415003 (e.g. as shown in FIG. 16A) or a predefined interaction may be used to change the keyboard to enlarge position and preferably switch back to reduced position (e.g. back and forth).

Note that the letter portion of the keyboard may also include a function and/or a special character key. In this example, FIG. 16A, the letter portion 415007 includes a key 415006 for entering a dot/period. Preferably, the letter portion (e.g. or another portion) of the keyboard may be moved (e.g. and positioned) on the screen by dragging it (e.g. by using some other gesture or interaction) from a/said function (e.g. key) and/or special character key.

The principles just described, may be applied to the keyboard in any enlarged or reduced position. As an example, FIG. 16B shows a keyboard of the invention in enlarged/expanded position having two portions, a letter portion 415001 and a function bar 415008, such as described above. In this example, by interacting with the key 415107, the letter portion of the keyboard may be removed from the screen as shown in FIG. 16D. In this example, the key 415107 is used to resize at least the letter portion 415101 of the keyboard. The principles just described may also be applied to a miniaturized keyboard of the invention as shown in FIG. 16C.

Figure 16C:
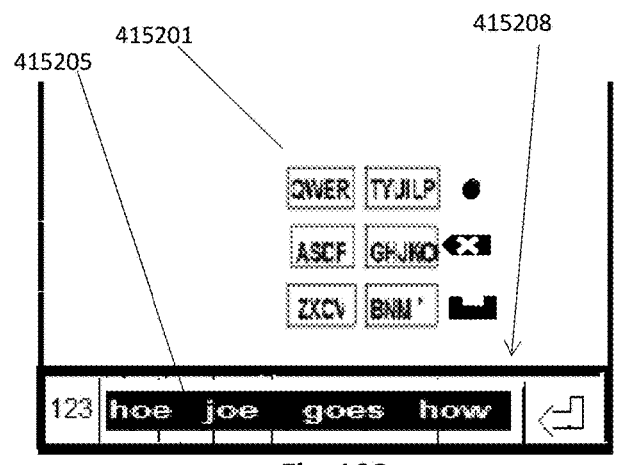
Figure 16D:
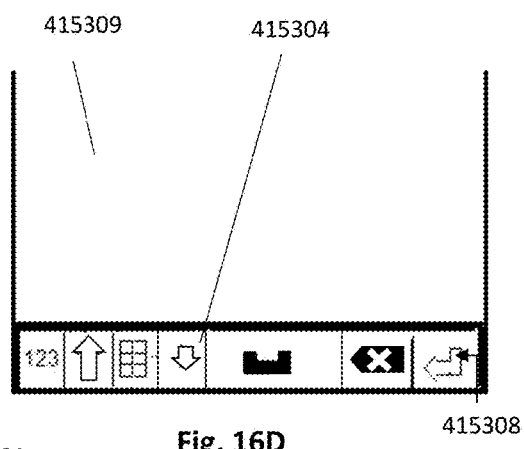

When the keyboard is in reduced mode and/or in invisible mode preferably the word list is located near an edge of the screen (e.g. word list 415205 of FIG. 16C). Preferably, when the keyboard is in the enlarged (e.g. visible) mode, the word list is located above the keyboard (e.g. word list 415105 of FIG. 16B).

Figure 16E:
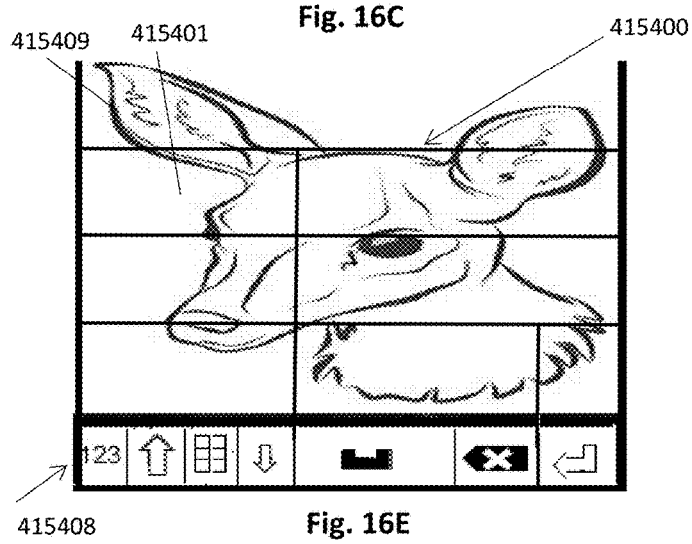

As mentioned, at least at least the letter portion of the keyboard may become/be invisible. As an example a switching means may be used to switch said portion from visible to invisible (e.g. and vise versa). FIG. 16E shows an enlarged keyboard 415400 of the invention wherein its letter keys/zones are invisible/transparent. In this example each invisible zone (e.g. 415401) is marked by a frame/lines defining its borders. In this example, the function bar is visible. By using such a keyboard while having an almost complete/full view of a content 415409 printed on the screen, the user can use the keyboard of the invention to type text (e.g. the keyboard is qwerty-based using few zones, therefore after a short while a user may know to which zone a letter is assigned without viewing said letter).

Note that according to one method, the function bar may be resized and/or moved on the screen, etc.

When at least the letters portion of the/a keyboard is in reduced size mode, preferably, the output content of an active application on the screen may be printed above the function bar. Preferably, when the at least the letters portion of the keyboard is in an expanded (e.g. full) mode, said content is displayed above the keyboard.

In landscape mode, at least the first time, preferably the keyboard opens/pops up in a reduced mode wherein at least its letters portion is in a reduced mode/size.

According to one aspect, the function keys are placed horizontally next to the letter keys portion. In this case according to one aspect the functions portion may preferably will not be in form of a bar but rather in from of a matrix. Preferably, such arrangement may preferably be applied if the screen is in landscape mode or the letters portion of the keyboard has a reduced size. According to another aspect, the function bar is in form of a bar horizontally next and the letter keys portion. According to still another aspect, the letter keys portion may be located/dragged above at least a portion of the function bar.

Note that preferably any portion other than the functions portion (e.g. special characters portion) may be considered as a separate from the functions (bar) portion and all the functionalities (e.g. moving, resizing, etc.) described regarding the letter keys portion may also be applied to said separate portion.

Figure 17:
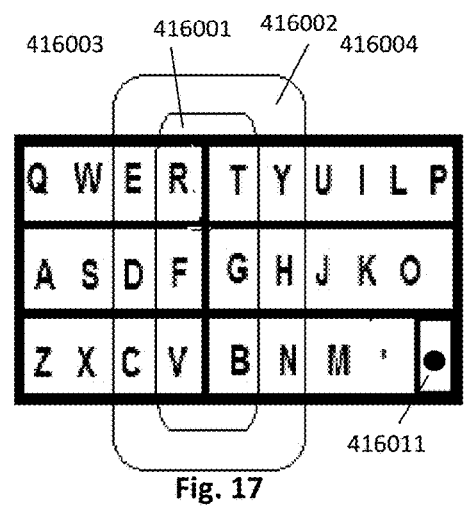
FIG. 17A describe the use of predefined regions of an exemplary keyboard in accordance with an exemplary embodiment of the invention.

According to one embodiment, the system may be defined to consider interactions with a first portion of a zone/key of the keyboard as to be ambiguously corresponding to any of all of the letters assigned to said zone/key. An interaction with a second portion of said key/zone may preferably correspond to the letter located at or near the interaction (e.g. tapping) impact on said key/zone. Said first and second portions may be a predefined portions or dynamically be defined based on the users interactions with keyboard. As an example, FIG. 17A shows the letter portion of a keyboard of the invention having six zone/keys as described throughout this application. In this example, the said first portion of a key/zone is a portion located inside the (e.g. virtual) small area 416001 (e.g. or according to another example inside the (e.g. virtual) larger area 416002), and said second portion of a key/zone is a portion located outside the said small area 416001 (e.g. or according to another example outside the area 416002). As an example, in order to enter the word "shapes", if for all of the letters the user taps inside said area on the corresponding keys/zone, the system may propose the word "shaped" as a having the highest priority. On the other hand, for all of the letters except the last letter the user taps inside the area and for the last letter he/she taps outside the area (e.g. on or near the letter "s") on the corresponding keys/zones the system may propose the word "shapes".

Note that according to one aspect, during the entry of a word, at least a number (e.g. one, two, etc.) of interactions (e.g. tapping actions) outside (e.g. or inside) the area may be necessary so that the system consider/activate the current embodiment. According to another embodiment, if the user provides at least a predefined number (e.g. one, two, etc.) of interactions (e.g. tapping actions) outside (e.g. or inside) said area, all of his/her tapping actions may be related to the characters on or near the tapping impacts in the corresponding zones.

According to one embodiment, when a user interacts (e.g. taps) on a first (e.g. horizontal) zone, in addition to the characters ambiguously assigned to said zone, the system may also (e.g. first) consider at least one (e.g. preferably the first) character from a/the neighboring zone (e.g. preferably from the same horizontal row of zones) preferably near the corresponding user's (e.g. finger) interaction impact provided on said first zone. For example, by considering the keyboard of FIG. 2C, if a user interacts (e.g. taps) on zone 401502 on a location near the zone 401501, in addition to ambiguously considering the letters assigned to the zone 401502 the system also considers at least one of the nearest characters (e.g. 'R') from the zone 401501. Note that the system may also consider (e.g. ambiguously) (e.g. additional) character/s from the vertical row of zone/s (e.g. preferably at first from the adjacent zone), and the system may consider (e.g. ambiguously) (e.g. additional) character/s from any other zone of the keyboard.

Note that as mentioned, according to one embodiment when the user interacts with a (e.g. preferably linear, such as a horizontal) zone, the system may preferably first consider the characters near (e.g. on left and/or right side of) the user's finger impact of an interaction (e.g. a tapping action) provided anywhere on a row of zones regardless of the zone on which said tapping action is provided. (E.g. If needed,) The system may (e.g. also) consider (e.g. additional) character/s preferably respectively from the zone on which the interaction (e.g. tapping action) is provided, the other horizontal zones, the other zones of the same side of the keyboard on which the interaction (e.g. tapping action) is provided and (e.g. finally) from other zones. In this embodiment, preferably at least a number of zones, optionally all of the zones, are linear zones such as horizontal zones.

Note that according to one embodiment, according to one method, each row of the keyboard may be considered as one zone.

Figure 18A:
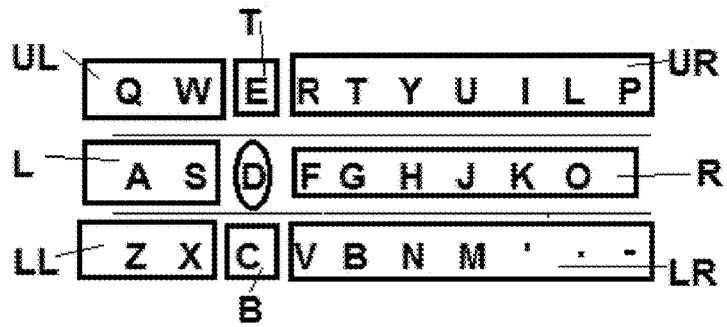
FIGS. 18A-18H describe methods of word prediction in accordance with exemplary embodiments of the invention.

According to one embodiment of the invention, a method of predicting words based on the shape of the (e.g. direction or) trajectory of finger gestures of a sequence of tapping actions on a keyboard may be invented. According to this embodiment, when the user taps a location of a keyboard corresponding to a first character of a word, a character on or near the impact of said tapping action may be considered by the system. Said impact may be considered as the center of or departing point of a number of directions/zones preferably eight directions (e.g. top T, upper-right UR, right R, lower-right LR, bottom B, lower-left LL, left L, and upper-left UL) wherein to each direction a group of characters (e.g. comprised of at least one character) is assigned. An example of such directions and the corresponding groups of characters are shown in FIG. 18A. In this example, the user has tapped on a point on the keyboard relating to the first character of his desired word. In this case said first character may be the letter D (e.g. or may be any of the other characters around said point). In this case, the corresponding (e.g. groups of) characters in different directions relating to the departing/dynamic point is defined. If a user taps for the following character of his word in any of said zones/directions the system may ambiguously consider any of said characters of said zone as the second character of said desired word. Now, the second impact becomes the center, and the principles just described applies to it. The same may be applied to the following impact points relating to at least some of the following characters of the desired word. By considering the ambiguous characters corresponding to the interacted zone/directions, the system may predict a word. For example, in order to enter the word "david" the trajectory of the user's finger to provide the impacts of the corresponding tapping actions may be the trajectory 416011 shown in FIG. 18E. Only two common words (e.g. 'david' and 'santa') of English language have the same trajectory. The system may propose said words.

Figure 18B:
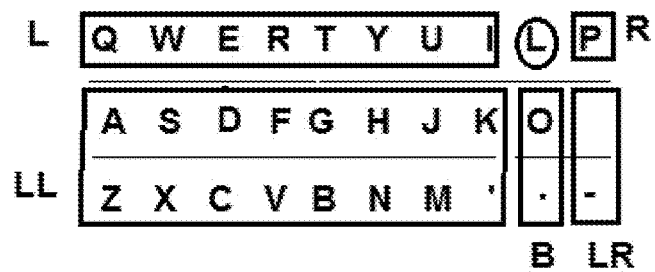
Figure 18C:
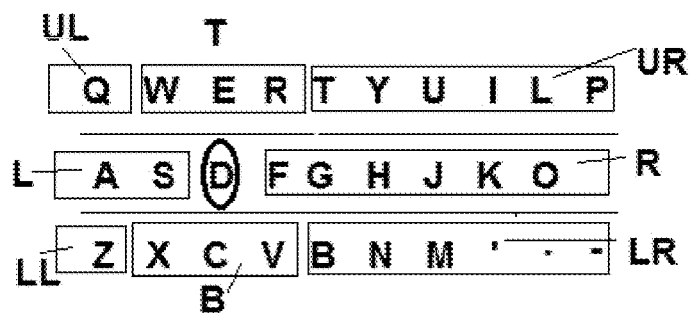

In FIG. 18B, the zones of characters relating to a tapping impact on the letter L is shown. In FIG. 18C, another way of assignment of zones and the corresponding letters relating the impact of a tapping action corresponding to the letter D is shown.

Figure 18D:
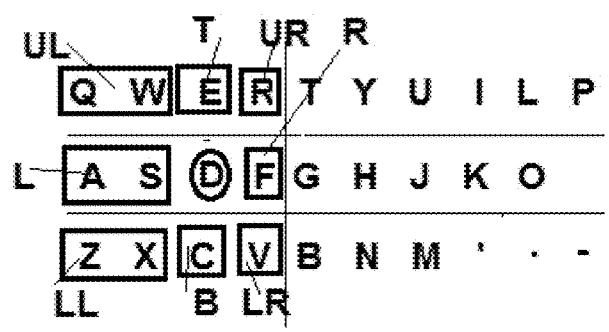
Figure 18E:
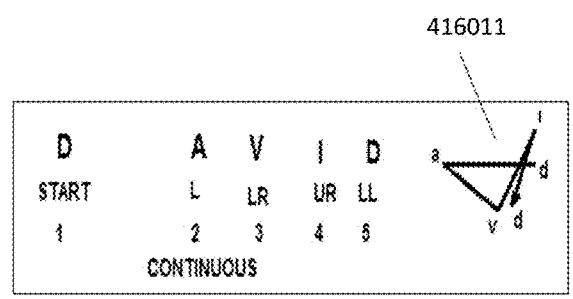

Note that in order to have higher accuracy of prediction the keyboard may be divided into more than one zones (e.g. two zones) wherein the principles described above may be applied to each of said sub-zones separately. In FIG. 18D, an exemplary assignment of zones and characters relating to the tapping action corresponding to the letter D based on principles described herein is shown.

Figures 18F, 18G, 18H:
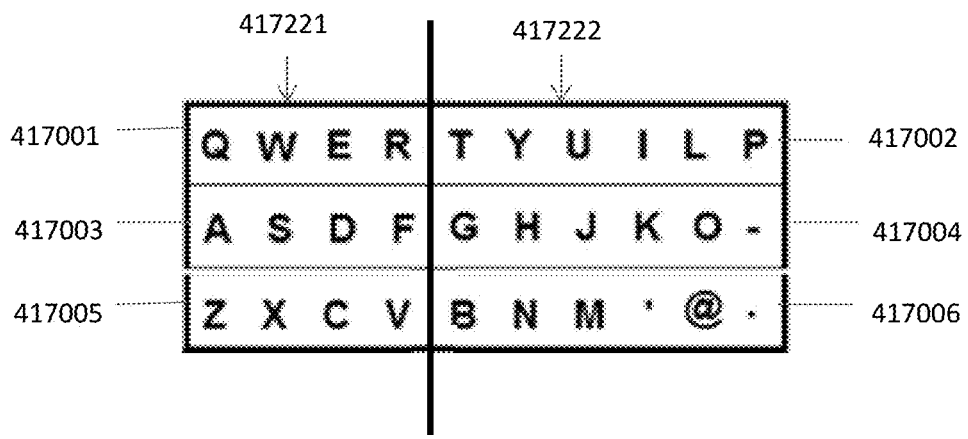

FIG. 18F shows the keyboard of a preferred embodiment of the input system of the invention permitting extremely sloppy and/or substantially blind typing. In this example, the keyboard has preferably two large zones 417221 and 417222. The keyboard is also considered to have/has preferably six small zones 417001 to 417006. According to this embodiment, when a user types a word, he/she may preferably type/interact on the large zones corresponding to the letters/characters of his/her desired word. Preferably, the user may type on the corresponding small zones and he/she may also be permitted to type anywhere on the corresponding large zones. According to one method, after a first tap/interaction (e.g. corresponding to a first character of a word) the user may preferably tap/interact anywhere in the direction of a small zone for the characters following a first character of his/her word. The taps/interactions corresponding to a word may be digitized/determined/calculated according to different (e.g. predefined) methods. One of said methods may herein be referred to as simplified method. The simplified method may consider only the vertical (e.g. vertical position of character on a keypad) relationship between the characters of the words of a database and/or the characters of a word being entered (e.g. key/zone interaction). Another method which herein may be referred to as complex method may consider both vertical (e.g. vertical position of character on a keypad) and horizontal (e.g. horizontal position of character on a keypad) relationship between the characters of the words of a database and/or the characters of a word being entered (e.g. key/zone interaction).

The simplified method may preferably function as follow:
to a (e.g. first) tap the exemplary digit 0 may be assigned (e.g. by default). Now, different scenarios may be considered:
a) If the following (e.g. second) tap is provided within a predefined range (e.g. distance) of the first tap, then a predefined character/digit such as the digit 0 may be assigned to said following tap.
b) If the following (e.g. second) tap is provided anywhere above the first tap, preferably, outside a predefined range of the first tap, then a predefined character/digit such as the digit 1 may be assigned to said following tap.
c) If the following (e.g. second) tap is provided anywhere below the first tap, preferably, outside a predefined range of the first tap, then a predefined character/digit such as the digit 2 may be assigned to said following tap.
Now, according to a predefined method, the following/second tap/interaction may become considered as the first tap and the following (e.g. third) tap/interaction may be considered as the second/following interaction and the principles of scenarios a to c just described may be applied to a following (e.g. third) interaction. And so on.

By considering the principles just described, a word being entered by a user may be predicted with high accuracy even if a user does not type accurately on the small zone but types according to the (e.g. relative) direction of location of letters/characters while interacting/tapping anywhere in the corresponding large zones.

FIG. 18G shows as example of the principles just described. In this example, the bi-gram entries corresponding to a prefix word (e.g. already entered word) "you" (column 1) and the words (column 2) corresponding interactions (column 3) in the large zones are shown. Column 4 shows the chain of digits corresponding to small zones relating to the characters of each corresponding word, and column 5 shows the frequency/priority of each word. In column 6 each chain of digits demonstrates the simplified method of digitization of a word based on the (e.g. relative direction of) locations of characters relating to each other as described earlier. For example, by considering the word "read", the first character "r" is represented (e.g. by default since it is the first letter of the a word) by the digit 0. Note that the character 'r' is located in the small zone 417001. The second character 'e' is in the same small zone (e.g. as the letter 'r'), therefore, for someone (e.g. interacting or) tapping anywhere on the large zone for the letter "r", re-tapping on the same location generally means (e.g. or is equivalent to) re-tapping on the same small zone, therefore the same digit 0 is assigned to the 2$^{nd}$ character 'e'. The 3$^{rd}$ letter 'a' is assigned to the small zone 417003 which is below the small zone 417001, therefore, the digit 2 is assigned to said (e.g. 3$^{rd}$) character. Finally, the 4$^{th}$ letter 'd' is assigned to the same small zone 417003, therefore the digit 0 is assigned to said character (e.g. or interaction corresponding to said character).

Now, for example, a user typing the word 'read' taps anywhere on the corresponding large zone 417221. The system assigns the digit 0 to this interaction (e.g. the interaction for the first letter of the word). The user knows that the second character 'e' is in the same small zone therefore the user may re-tap (e.g. interact again) on the same location. Because the vertical position of the tapping impact is substantially the same, then the system assigns the digit 0 to said second interaction. The user knows that the third character 'a' of his/her desired word belongs to the small zone 417003 which is below the zone 417001, therefore he/she may tap anywhere (e.g. preferably for a distance greater than a predefined range/distance) below his/her previous tapping impact in the corresponding large zone. In this case the system assigns the digit 2 to said third interaction. Finally, (e.g. by knowing that) the character 'd' is in the same zone as the character 'a', so the user may tap again in substantially the same (e.g. vertical) position (e.g. as the previous character) in the corresponding large zone. In this case the system assigns the digit 0 to said fourth interaction. The closest word relating to the chain of digits in column 6 (e.g. the sequence of numbers corresponding to a word herein may be referred to as predefined position digits) and the chain of digits corresponding to user interactions (herein may be referred to as interacted position digits) for a desired word which are assigned upon receiving said user's interactions is the word "read". The system may enter/propose said word. Note that the system may propose more words based on the number of (e.g. correct) digit matches (e.g. from highest/closest to lowest/furthest matches) and preferably the priority of the words.

Note that according to a preferred method, the assignment of digits is based on the (e.g. vertical) (e.g. relative) position of characters (e.g. of a word) in the corresponding small zones regardless of the large zones. As an example, as shown in FIG. 18H, the words relating to the prefix 'you' of the bi-gram entries corresponding to said prefix and the large zones interaction 1121 are assigned the corresponding digits based on their (e.g. relative) vertical position relating to each other regardless of the large zones. As an example, the word 'send' is represented by the chain of digits '0121' as follow:

1) 's' (e.g. 1$^{st}$ character) is represented by 0.
2) 'e' is above 's' therefore is represented by 1.
3) 'n' is under 'e' (although in another large zone 417222), therefore is represented by 2.
4) 'd' is above 'n' (although in another large zone 417221), therefore is represented by 1.

As mentioned before the complex method may preferably consider both vertical and horizontal variations. As an example, a code such as a number such as a 2-digit number may define the vertical and horizontal position(s) of each interaction relative to a previous interaction (e.g. except for the interaction corresponding to the first character of a word, e.g. 00). As an example, a first digit (e.g. 1 or 2 or 0) may represent the vertical variations (e.g. respectively, up, down, same location) and a second digit (e.g. 1 or 2 or 0) may represent the horizontal variations (e.g. respectively, left, right, same location) (e.g. 01, represents that there was no change in vertical variation for a current tap/interaction relating to a previous tap but the current tap/interaction has been provided on the left side of the previous tap (e.g. in a large zone).

Note that the in some cases such as for example if there is no or not enough words corresponding to the interactions relating to entering a word, the system may consider a percentage (e.g. from anywhere between 0% to 100%, preferably gradually (e.g. and preferably relating to the length of one or more words)) of mistyping in vertical and/or horizontal directions.

As mentioned before, the methods of text entry described in this application are mainly considering typing correctly on large zones by permitting sloppy typing within a large zone. It must be noted that in some cases such as when no word or not enough words are found in a corresponding database for the input information provided by a user, the system may also consider that the user may have mistyped on (e.g. not pressed a (e.g. one or more) correct large zone) large zones and therefore may proceed to a correction procedure relating to mistyping on large zones (e.g. too).

Other methods of digitization may be considered for the purpose of describing a method of text input by interacting anywhere in preferably two (e.g. or more or less) large zones and predicting words with high accuracy.

Note that different methods of presenting/selecting words relating to interactions provided by the user for a desired word may be considered. As an example, by considering the exemplary portion of the database of FIG. 18G, the system may first consider interactions of the user based on the large zones and then consider the user interactions on the small zones. Among those words, according to a preferred method, the system may first propose words that best match (e.g. according to some method) the interacted position digits. Different scenarios may be considered:

1$^{st}$ scenario: among the words that best match the interacted position digits, the system may first propose the words that best match the user's corresponding interactions with the small zones provided by the user for the entry of the desired word. If two or more words have the same best matches, the system may preferably propose the words based on their priority.

2$^{nd}$ scenario: among the words that best match the interacted position digits, the system may preferably propose the words based on their priority.

In the content/image editing application of the invention, according to one embodiment, (e.g. after selecting a mask and positioning it on a content) (e.g. upon sharing the masked content with a group of users), the/a supplier of the mask may select those users, among a number of users that he/she wants to share the masked content, who are not authorized to remove or move the mask. All other shared users may preferably be authorized to move/remove the mask.

(e.g. In the image editing application), as mentioned before, a content such a video, audio (e.g. speech), etc. (e.g. included in another content to be shared with a number of users) may be shared with a number of authorized users among a number of users. According to one method, when a mask is positioned by an owner of the mask on a content (e.g. an image), the user may be enabled to relate another content to said mask. The owner of the mask then may authorize a number of shared people to activate (e.g. view, play) said content related to the mask. As an example, when providing a mask on a photo, the user may (e.g. be asked to) record a video and/or audio, and send said package including the photo and the (e.g. recoded) audio and/or video to a group of users. The owner of the mask may authorize some of the shared users to view/play said video and/or audio upon removing/moving said mask. It is understood that any other means other than a mask may be used to permit authorized people to view and/or play said video and or audio.

(e.g. In the image editing application), note that providing a gesture (e.g. preferably including a long-pressing action) in a predefined direction may correspond to one of the mouse functions such as copy, paste, select all, cut, selecting a portion of content, and moving the pointer and/or cursor, etc. For example, such a gliding action towards the upper-left may correspond to the cut function, and towards the lower-right may correspond to the select function, and so on.

FIG. 20A shows a keyboard of the invention having a function bar 419108 and a reduced letter key/zone portion 419100. Preferably, when the device screen is large enough (e.g. smartphone in landscape orientation, or a tablet in any orientation, the word list may preferably overlap at least a portion (e.g. 419107) of the function bar (e.g. as shown in FIG. 20B). Preferably, the hidden/overlapped portion generally includes function keys that are not generally used during the entry of a word. In this example, the space key 419106 is partially hidden so that to be accessible during the entry of a word. In FIG. 20C, a keyboard of the invention having a (e.g. reduced) letter keys portion dragged/moved/located in a manner to overlap a portion of the function bar. This may permit to have a keyboard with reduced height. Note that some of the functions that may be hidden by said letter keys portion and/or the word list may also be presented above the function bar preferably attached to the letter keys portion such that when the letter keys are moved/relocated over the screen, preferably said function keys are also relocated accordingly.

Note that, when the device screen is tiny (e.g. smartphone in portrait orientation) the word list may preferably be located above the function bar.

Note that in addition to the function bar, the keyboard may also include one or more function keys located on preferably an edge of the screen.

In order to augment the accuracy of the system also permitting sloppy or some mistyping (e.g. typing on a wrong zone), the system may consider that a keyboard has one or more broadly ambiguous zones and one or more narrowly ambiguous zones (e.g. for/within each of the broadly ambiguous zones). According to a preferred embodiment, the keyboard of the system may be considered to, preferably, have two broadly ambiguous zones each, preferably, having three narrowly ambiguous zones. As an example, fig. of 19A shows the keyboard of the invention having six zones 418001 to 418006 (e.g. herein may be referred to as to the (small) zones 1 to 6) each, preferably, having a few letters. Each of said zones may be considered as a narrowly ambiguous zone. The keyboard may also be considered to be divided into two broadly ambiguous zones 418011 and 418012 each having a larger (e.g. more letters than are on a small zone) number of letters (e.g. herein may be referred to as to large zones 1 to 2). Note that the left broadly ambiguous zone 418011 preferably ambiguously includes (e.g. preferably at least) the letters of the left narrowly ambiguous zones 418001, 418003, 418005 (e.g. herein may be referred to as the left column of the small zones), and the right broadly ambiguous zone 418012 preferably ambiguously includes the (e.g. preferably at least) letters of the right narrowly ambiguous zones 418002, 418004, 418006 (e.g. herein may be referred to as the right column of the small zones). To simplify the description, a broadly ambiguous zone may herein be referred to as a large zone, and a narrowly ambiguous zone may herein be referred to as a small zone).

Note that the left and/or right large zones just mentioned above, may be designed to be arranged as upper and/or lower large zones (e.g. arranged vertically). Accordingly, the left and/or right small zones may be designed to be arranged horizontally. Or other arrangement such as diagonally.

A user typing a word generally types on the small zones corresponding to the letters of the word. It may happen that the user does not type on a correct small zone corresponding to a letter because for example he may type fast or sloppy (e.g. he/she may type by mistake on a vertically neighboring small zone) (e.g. herein may be referred to as mistyping), but most probably he/she may generally type on a/the correct large zone corresponding to said letter (e.g. or small zone).

Note that typing on a keyboard having two ambiguous large zones is generally error-free typing because the zones are large. On the other hand, while typing accurately on large zones, a user typing a word may erroneously type on wrong small zones within the corresponding large zones.

By considering these principles, when a user types a word, the system may (e.g. simultaneously) consider, both, on/with which large zones and on/with which small zones the user interacts, to provide a highly accurate prediction (e.g. that may) also permitting some mistyping (e.g. preferably, less mistyping for short words and more mistyping for long words).

As an example, FIG. 19B shows an exemplary portion 418100 of a database of words used by the system. In column 418104, a plurality of words are shown. In column 418102, for each of said words (as an example, the word "supports") the corresponding required (e.g. pressing) interactions with the small zones are shown in form of a sequence of digits (e.g. 42224123, corresponding to interacting with the small zones corresponding the word "supports"). Note that each small zone (e.g. see the small zones of FIG. 19A) is represented by its last digit in the corresponding sequence of digits. For example, the sequence of digits 42224123, represents interacting with the small zones 418004, 418002, 418002, 418002, 418004, 418001, 418002, and 418003.

Note that, each of said words also corresponds to interacting with a same sequence of interactions with the large zones of the keyboard as shown in column 418101. In this example, the sequence of key interactions with the large zones corresponding to said words are demonstrated by the sequence of digits 12222121 wherein each digit of said sequence of digits represents the last digit of the corresponding large zone of the keyboard of the exemplary keyboard of FIG. 19A.

Column 418103 represents the frequency of use/priority of the corresponding words of column 418104.

According to a preferred method, after interacting with small zones corresponding to a word, the system may first relate said interactions to the corresponding large zones and select/consider the corresponding words of a corresponding database of words. The system may preferably sort/consider the order of said words based on the precision (e.g. degree of correct typing) of the corresponding small zones interacted by the user for the entry of a desired word. For this, the system may preferably compare the small zones interactions (e.g. provided by the user) with each of the sequence of interactions corresponding/required for the entry of a corresponding word as shown in column 418102. If more than one word has the same number of precise/correct interactions, then preferably the system first proposes/considers the word with highest frequency of use among said words.

In the current example, as an example, in order to enter the word "support", if the user types sloppy and instead of providing the sequence of small zone interaction 32224123 the user by mistake (e.g. 2 mispresses) provides the small zone interaction 32222121, the words with lowest number of mistaken small zone interactions among the zones corresponding to the large zone interactions 12222121 are the words "supports" and "simulate". The word "supports" has higher priority than the word "simulate", therefore it may be presented as a first choice (e.g. the currently predicted word). Note that if the system uses linguistic rules in some cases the word "simulate" may be presented first (e.g. "we simulate". There may be no 2-gram entry for "we supports").

Note, that according to a preferred method of proposing/predicting words, the system proposes words from entries in a corresponding word database in the order from the greatest number of grams to the least number of grams corresponding to the input information.

The principle of proposing/predicting words just described may be applied to any of the inventions described in this application.

Note that according to the principles described, the system may consider/accept mistyping on small zones in a large zone but preferably/generally does not consider mistyping on large zones (e.g. unless no word or a very few corresponding words are found in the database).

Note that the system may also consider longer words such that their beginning portion (e.g. 1 to N beginning letters) corresponds to the large zones interactions provided by the user. Preferably, the system also considers such words when there is no or when there are a few number of words corresponding to the small zones interactions provided by a user (e.g. with a maximum permitted number of mistyping). As an example, as shown as an example in the table below,

| | | | |
|---|---|---|---|
| 2211112121 | 2631132363 | 15524 | understand |
| 2211112121 | 2633112321 | 2335 | inadequate | the large zone interactions 2211112121 corresponds only to two words in a/the database used by the system. The system may also consider longer words beginning with said large zone interaction (e.g. 'understanding', 'inadequately', etc.).

Note that in some cases, the system may include only one word corresponding to a sequence of large key/zone interactions. This means that in some cases the user can type anywhere on the corresponding large zones and get his/her desired word.

Note that preferably, the system may also consider that the user has/may mistakenly pressed an (e.g. one or more) extra zone interactions (e.g. the number of interaction with zones is greater than the number of characters of a word) during the entry of a word and therefore may propose one or more corresponding words by not considering a number (e.g. 1) of the zone interactions within a sequence of a zone interactions. On the other hand, the system may consider that the user may have omitted one or more zone interactions and therefore may propose longer words that include and/or correspond to the zones interactions provided by the user (e.g. also by considering mistyping errors).

Note that according to one method, the system may first select a number of words of a database that correspond to a sequence of large zone interaction, and among said selected words the system selects the words that best match with the corresponding small zones being interacted. According to another method, the system may first select the words that best match the interacted small zones, and preferably in some cases (e.g. when/where there are not enough corresponding words), the system may look for other words that correspond to the interacted large zones.

Note that according to one aspect, a word having a character corresponding to a small zone not neighboring an interacted small zone of a large zone may either not be considered by the system or may be given less priority (e.g. on the fly/dynamically). As an example, in the example of FIG. 19C, if a user interacts with the small zone 418001, the system may not consider that words that in the corresponding letter position have one of the letters of the not neighboring zone 418005 (e.g. the system considers only the letters that are in the small zones 418001 and 418003 (shown by circle 4180111)).

According to one aspect, in addition to the large zones and small zones consideration the system may also consider the letter on/near which an interaction with a zone is provide (e.g. as a precise letter/character). The examples/principles of entry of precise characters (e.g. during the entry of an ambiguous word) have already been described in detail.

Note that according to a preferred method, each time a user interacts with an ambiguous letter zone, the system may (e.g. preferably simultaneously) relate said interaction to, both, the corresponding large ambiguous zone and the corresponding small ambiguous zone. Preferably, the corresponding word database used by the system is arranged (e.g. as shown in FIG. 19B) such that to relate each word to it corresponding large zones interactions and small zones interaction, also preferably including the priority of each word. According to one aspect, the keyboard may have a number of (e.g. 4180111 and 4180112 of FIG. 19C) left large zones and a number of (e.g. 4180113 and 4180114) right large zones. Note that preferably in such case, according to one aspect, a small zone (e.g. 418003) may be included in two corresponding large zones.

Note that the keyboard, the large zones, the small zones, the arrangement of letters, the location of small and/or large zones, etc. are shown to describe the principles to enhance the accuracy of the system based on/by considering a human way of interaction with a/the keyboard (e.g. of the invention). Any other type of keyboard, any number of large zones, any number of small zones, any key/zone and/or letter configuration, etc. may be considered for such purpose and/or based on principles described herein. According to one aspect, all of the words corresponding to a sequence of large zones interactions may be presented/considered by the system. According to another aspect, some (e.g. a predefined number) of the best matched (e.g. the least mistyping on small zones) words may be presented/considered by the system. According to another method, words with lesser match but having higher (e.g. very high) frequency of use may be given higher priority for presentation over the words having more/greater match but having lower (e.g. very low) frequency of use.

As mentioned before, the system may have a number of (e.g. two) large zones wherein each of the large zones may have/include a number of small zones. According to one aspect said small zones may be/are (e.g. dynamically) defined, preferably, based on which location within a large zone the user interacts. According to one method, a small zone is defined around and/or near the user's interaction impact with a large zone. Preferably, the small zone defined as such includes the corresponding (e.g. some) characters from the interacted large zone (e.g. only). As an example, FIG. 19D shows a keyboard of the invention having two large zones 418011 and 418012. In this example, the key/zone interaction 418111 is ambiguously related by the system to any of the neighboring characters (e.g. YUIHJK) to/of the interaction impact 418111 with the large zone 418012. Also in this example, the key/zone interaction 418112 is ambiguously related by the system to any of the neighboring characters (e.g. DFCV) to/of the interaction impact 418112 with the large zone 418011. Note that, preferably, the neighboring characters (e.g. GB) that do not belong to the interacted large zone 418011 are not considered by the system. By considering the principles described, in this example, the system may propose the word 'if', for example. FIG. 19E shows another example of entering a word. In this example, the key/zone interaction 418211 is ambiguously related by the system to any of the neighboring characters (e.g. YUIHJK) to/of the interaction impact 418211 with the large zone 418012. Also in this example, the key/zone interaction 418212 is ambiguously related by the system to any of the neighboring characters (e.g. ERDF) to/of the interaction impact 418212. Note that, preferably, the neighboring characters (e.g. TG) that do not belong to the interacted large zone 418011 are not considered by the system. By considering the principles described, in this example, the system may propose the word 'if' (e.g. and not the word 'it').

The current aspect wherein the small zones are those near/around the user's impact on a large zone may be beneficial for languages having many characters (e.g. Russian) and/or languages (e.g. Arabic, Hebrew) that generally exclude some characters such as vowels from the keyboard.

Note that any number of large zones and any number of small zones within a large zone based on any concept may be considered by people skilled in the art.

Note that according to one aspect, in some cases (e.g. because of the high frequency of a corresponding word) the system may first consider a character from the characters of a large zone (e.g. preferably but not limited to or corresponding to the interacted impact) other than the characters of the small zone related to the interaction impact.

According to one embodiment of the invention, the keyboard of the invention may be/have four large zones and/or six small zones. In the exemplary FIG. 21A, the keyboard has four large zones 420021 to 420024. In this example, the keyboard also is considered to have six small zones 420001 to 420006. Note that the letters of the middle small zone 420003 are used in both large zones 420021 and 420023, and that the letters of the middle small zone 420004 are used in both large zones 420022 and 420024. As an example, a tapping action 420051 on the large zone 420022 may correspond to any of the letters TYUILPGHJKO, and a tapping action 420052 on the large zone 420024 may correspond to any of the letters BNMGHJKO. Note that, the arrangement of the corresponding database of words and/or the methods of prediction of words may be based on principles described before.

FIG. 21B shows another example of the input method of the invention. In this example, the keyboard has four large zones 420121 to 420124, and also is considered to have six small zones as described in the example above. Note that in the example, the large zones 420123 and 420124 are similar to the small zones 420005 and 420006 and do not include respectively the letters of the small middle zones 420003 and 420004.

The principles described above may permit small rate of mistyping for short words, and a larger number of mistyping for longer words. In many cases even with full or almost full mistyping the system may still propose/predict corresponding words with high accuracy because the input information (e.g. large zone interactions) corresponding to a (e.g. a long) word may correspond to a few words, and in some cases even to one word only or not to any word at all. As an example, the sequence of large zone interaction 122211222122221 may correspond to only one word "congratulations". In this case, the user may type on any small zone in the corresponding large zones and still get the word "congratulations".

According to a one method, the system may propose corresponding words in/based on the following order and/or principles:

1) n1 Short words from N-gram (N>1) entries relating to up to n % mistyping(s)
2) n2 Long words from N-gram (N>1) entries relating to up to n % mistyping(s)
3) n3 Short words from 1-gram entries relating to up to n % mistyping(s)
4) n4 Long words from 1-gram entries relating to up to n % mistyping(s)

if there are not enough words, then repeat this loop considering more mistyping (e.g. higher n % mistypings), and so on. Note that, preferably the order of presenting words as described herein/above (e.g. in each of the (exemplary) steps 1 to 4) may be based on the frequency of use of the corresponding words).

Different other methods of presenting predicted words may be used by the data entry system of the invention.

According to a preferred method at least some of the following parameters may be used for deciding which words best match to an input information being received by the system:
   a) words that match the interactions with the large zone,
   b) words that best match the interactions with small zones among the words of section 'a' above,
   c) words that have the highest priority among the words of section 'b' above.

Note that according to one method, a predefined mistyping percentage on wrong zones may be permitted to define the words of section 'b'. Said mistyping percentage may vary based on parameters such as the length (e.g. the number of characters) of a word corresponding to the received input information. For example, for the words up to the length of 4 the mistyping percentage permission (e.g. e.g. herein may be referred to as MPP) may be 34 percent, the word with the lengths of 5-7 the mistyping percentage may be 45, and so on. Note that in case that the system does not find enough word that correspond to the received input information, the system augments the mistyping permission (e.g. gradually) up to 100%. For example, the word 'workmanship' may be entered by simply tapping anywhere on the corresponding large zone. Preferably, if possible, the input information received by the system is combined with a prefix to predict words from a N-gram (e.g. N>1) entry for better prediction. Preferably, the words predicted from a N-gram entry with the highest number of grams have priority over the words that are/can be predicted from a entries with lower number of grams.

According to one method, among words of section 'b' that have very high priority, the word where the user's interactions correspond to the word's characters on the keyboard preferably gets a (e.g. temporarily) highest priority and is presented to the user.

According to one aspect, after entering a word, if the user erases a last portion of said word and types another last portion by interacting with the same small zones of the erased portion, the system preferably predicts a different word.

According to one embodiment, the principles of considering small and large zones may be applied to any N-gram entry wherein N>0 (e.g. by considering said entry as a single word).

According to one method of word prediction, when the system receives input information from a sequence of letter key/zone interactions, in addition to corresponding said input information to a single word the system may also try to split said input information to several portions to predict/propose several words each corresponding to one of the portions.

By relating each interaction with a letter zone (e.g. the zone 420006) of the keyboard to, both, interacting with said a zone and to interacting with the space key, the system may produce several combinations of split portions for input information provided by a user and accordingly may propose one or more corresponding chain of words.

For example, if a bi-gram entry includes the grams "best regards", the system may consider the combined user's interaction (e.g. combined input information) with the corresponding large and/or small zones corresponding to entering a word (e.g. in this case also with an entire entry of a bi-gram entry), to propose/predict a (e.g. one or more) word from a corresponding entry (e.g. entire entry) of a database.

As an example, a user may provide the input information (e.g. key/zone presses) corresponding to the word "best", then, by mistake, instead of tapping on the space key, the user may tap on the small zone 420006, and then may provide the input information (e.g. key/zone presses) corresponding to the word "regards".

In addition to relating the received combined input information to a single word, the system may also relate/compare the entire input information provided by the user to also the entire grams of N-gram (e.g. bi-gram) entries of a corresponding database, and by proceeding to an/the auto correction system (e.g. of the invention) propose/enter the/a corresponding two-gram word (e.g. two words) 'best regards'.

Note that an entry of a database having more than one gram may include a space character between each two of its grams. For example, the entry that includes the bi-gram 'best regards' has a space character between the words 'best' and 'regard'. Therefore, when the user provides erroneously an interaction on the zone 420006 instead of on the space key, the system receives an erroneous signal among a sequence of input signals that are included in the input information and by using the/an automatic mistyping correction system of the invention, the system most of the time correctly predicts the desired words.

According to one method, each of at least some of the ambiguous (e.g. letter) zones of the keyboard may also ambiguously represent the (e.g. another key, such as for example a) space key (e.g. a character representing the space character). According to a preferred method, each of the right side zones and/or each of the left side zones of the keyboard may preferably also ambiguously represent the space key.

In the current embodiments, preferably the system also considers a corresponding prefix of the input information being received and by considering the combined input information may propose single word/s and/or chain of word/s. As an example, if prior to the entry of the erroneous' input information corresponding to the words 'best regards' the word 'my' had been entered, by considering the prefix 'my' and the input information being entered, the system may predict the words 'best regards' from an N-gram (e.g. 3 gram) entry of a corresponding database (e.g. the entry having the three grams 'my best regards'). This method of prediction provides a better accuracy.

It must be noted that according to one aspect a last portion of an input information being received by the system may be related to the beginning portion of a corresponding gram. As an example, an erroneous input information being entered may correspond to the gram 'best' and the beginning characters of a following gram 'regards' of an entry of a database. In this case, by considering the input information received (e.g. at the most recent moment of input), the system may predict the entire grams 'best regards' from a matched entry of the database.

According to one method, by relating a received input information to a portion of a N-gram entry, the system may predict more words from an entry that has more grams. In the current example, the system may predict/propose more grams from a N+n gram entry (e.g. wherein N>1 and n>0) of the database. For example, the system may predict the grams 'best regards from me' from an N gram entry that includes said words.

According to one aspect, the system does not consider the space characters of an entry of the database and considers the characters of the entry as a single chain of characters excluding the space characters and by considering the input information provided by a user, the system predicts words from the corresponding entries that beast match said input information.

According to one embodiment when such a (e.g. or some other type of predefined N-gram based on some condition, preferably related to N-gram attributes) corresponding N-gram entry is detected (e.g. and proposed), the system may provide an alert such as, for example, a device-vibration or a beep to alert accordingly. In some cases, the user may understand the he/she has provided a mistyping relating to a desired space (e.g. or other) character and may select the proposed N-gram to enter it.

According to one embodiment, if two words (e.g. preferably with high priority) are relevant to be proposed to the user and wherein preferably both have high priority, then preferably the one with higher priority is entered in the corresponding text field by the system and the second word may preferably remain in the memory of the system such that when a next word is being entered at least one of the proposed words (e.g. in the word list) is a N-gram word that includes said remained word and a corresponding word that is being entered. According to one method, said N-gram word is shown in the word list. As an example, to enter the chain of words "what if you", the user first enters the word "what" then types on the keys corresponding to the word "if". At least two bi-gram words "what is" and "what if", may correspond to the input information provided by the user. The bi-gram "what is" has higher priority therefore the system enters or first proposes the word "is". Instead of correcting/replacing said the bi-gram "what is" by the by-gram "what if", the user may type the next word which is the word "you". The bi-gram "is you" or the tri-gram "what is you" are not in the dictionary used by the system but the bi-gram "if you" and/or the tri-gram "what if you" exist in the dictionary. The system may automatically or the user may manually replace the chain of words "what is you" by "what if you".

The masking technologies of the invention have been described before. According to one embodiment a masking application to mask at least a portion of any content that is on the screen may be created. Such an application herein may be referred to as the maskie application. Maskie application may include a main button similar to that of chatting application of the invention. Said main button may be present on any application/content which is open on the screen. According to a preferred concept/aspect, upon a predefined interaction such as a tapping action on the main button, the system may open a menu bar and preferably simultaneously take a screenshot. Preferably during the screenshot the main button is removed so that the screenshot excludes the main menu image.

The menu bar/list may preferably include buttons to access features such as different masks, contact list, creating new grouping, etc. According to a preferred aspect, after taking a/the screenshot as such by a user (e.g. herein may be referred to as sending user), the screenshot may be displayed on the screen (e.g. in enlarged or reduced form factor). The screenshot may also be resizable by a resizing means such as pinching.

A user may select a mask, may resize the mask, may move/position the mask on a desired location on the screenshot/screen, and may cover at least a portion of the screenshot/screen. The user (e.g. then) may select a user or a group of users to send/share the masked/covered screenshot to/with them. Among the users/group of users (e.g. herein may be referred to as receiving user(s)) with which the sending user send/shares the screenshot, the sending user may authorize one or some users to remove/move the mask from/on said masked screenshot (e.g. after receiving said masked screenshot). According to one method, the mask may be removed from the/said screenshot (e.g. of preferably of the authorized users) automatically upon completion of a condition such as after a predefined laps of time.

According to one embodiment the/said mask may automatically be removed from said/the received screenshot (e.g. of preferably the unauthorized users) upon completion of a condition such as after a predefined laps of time.

According to another embodiment screenshot may not include a mask. Accordingly, according to one aspect, the/said screenshot may automatically be removed from the (e.g. screen of) the receiving device (e.g. of preferably the unauthorized users) upon completion of a condition such as after a predefined laps of time.

After sharing/sending said screenshot, the user interface of the maskie application may preferably automatically (e.g. or manually) be reduced and preferably only the main button will remain on the screen. Note that at least some of the aspects, methods, features, embodiment, functions, principles of the chatting and/or image editing applications of the invention may be applied to the maskie application. As an example, the main button of the maskie application may be removed from the screen by providing a predefined interaction such as a long pressing action on said main button. Like the smsnap chatting application, as described herein, said main button of the maskie application may be brought (e.g. back) from the notification bar/page of the device. Also for example the methods/principles of creating a group, modifying it, presenting it (e.g. in the contact list) of any of said applications may be used in the maskie application. Also as an example, all/part of the principles regarding the masking procedures described (e.g. in this and in the previous patent applications filed by this inventor) such as creating, selecting, sharing, authorizing, covering, removing etc., may be applied to the maskie application. Also as an example, the history of exchange of screenshots/contents (e.g. history of chat rooms) may be accessible to the users.

Figure 22A:
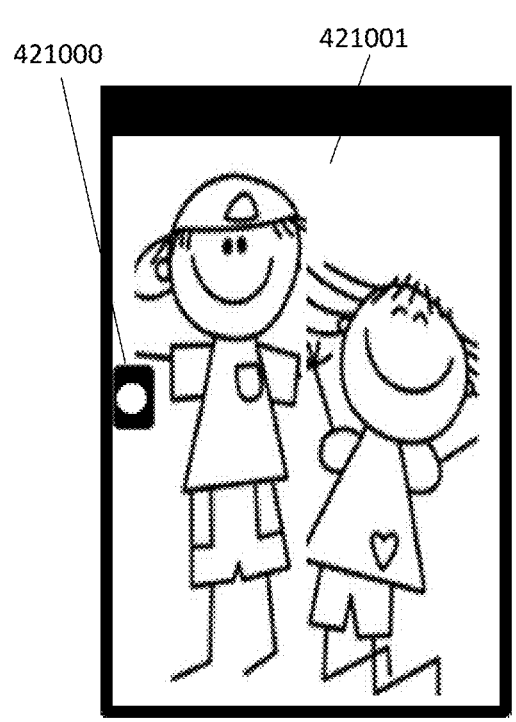
FIGS. 22A-22D describe a content control system and its corresponding exemplary interface in accordance with an exemplary embodiment of the invention.
Figure 22B:
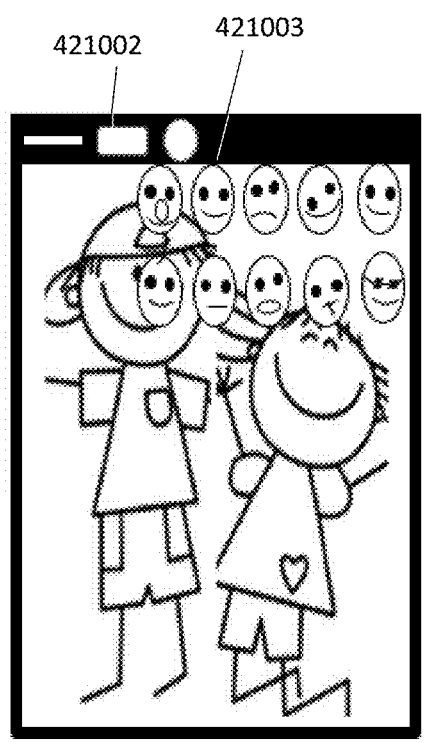

FIGS. 22A to 22D show an example of some of the principles/aspects of the masking application/system of the invention (e.g. the maskie application). FIG. 22A shows a picture 421001 being displayed on the screen of a device from an application such as a gallery or camera application. In this example, the masking application/system of the invention is activated in said device and the main button 421000 of the maskie application is popped up above the content (e.g. the picture) on the screen. According to one embodiment, upon providing an interaction such as a tapping action on the main button the systems menu (list) 421002 corresponding to one or more features/functions of the application may be presented on the screen. Preferably, the system may simultaneously take a screenshot of the screen and display the screenshot on the screen. According to one method, the menu may include a button to take a screenshot and preferably display it on the screen. The menu may also have additional buttons to access additional features of the application such as presenting a number of masks so that the user select one or more of said masks to mask one or more portions of the screenshot/screen. In the example of FIG. 22B, a number of masks 421003 for selection are presented on the screen as described.

Figure 22C:
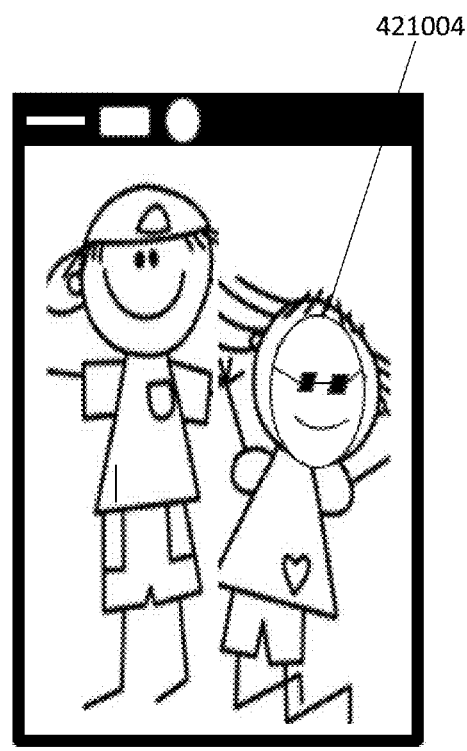
Figure 22D:
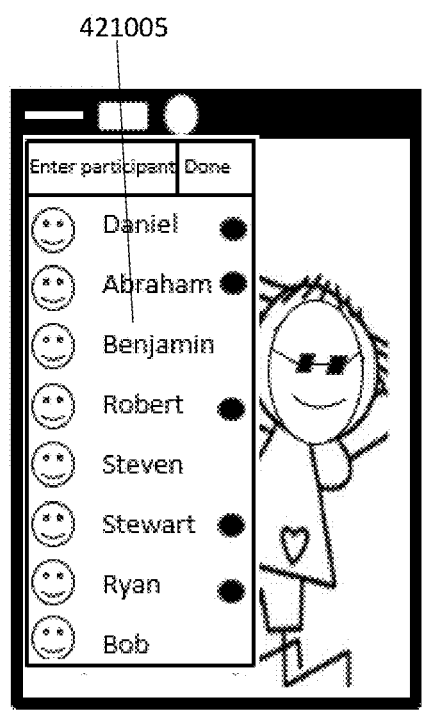

FIG. 22C shows a portion of the screenshot (e.g. the face of a person) being hidden by the/a user using a selected mask. FIG. 22D shows a contact list of the application presented to the user on the screen so that the user may select one or more individuals or one or more groups of users to share the masked screenshot with them. Note that preferably the user may authorize one or more persons among the selected users to remove/move the mask upon receiving the masked screenshot.

Note that as mentioned the user can also type/add text, drawing, handwriting text, audio, etc. to the/an screenshot. Also note that the masking feature and any other feature (e.g. text, handwriting, drawing, etc.) may be optionally used on/with an/the screenshot.

The principles of masking the screenshot of any content which is on the screen may be applied to other type of screenshots or contents such as video capturing of the screen of a device by said device.

As an example, preferably the menu list/bar may have a means to capture a video of the screen of the device, and the user may use the masking system to cover at least a portion of one or more sequences of said video. According to one method, a same mask may be used for masking/covering all of said sequences, while according to another method different masks may be used to cover different sequences of the video. Note that the system may have all of the means (e.g. begin/end recording) necessary for recording and/or playing a video.

Preferably, the system may also include a means for add/combine/integrate additional contents preferably provided by/through using the maskie application such as a text and/or a drawing and/or handwriting text, audio, etc. preferably on/with the screenshot (e.g. herein may be referred to as combined content). The combined content may be shared as several layers of information or it may be formatted as a single image. According to a preferred embodiment, the mask preferably overlays (e.g. at least a portion of) any of the additional contents, while according to another method, some of the contents such as a/the text may overlay the mask.

Note that according to a first method, the mask covering at least a portion of a picture/image/screenshot may be sent as is (e.g. the content and/or the presentation content of the mask) with the corresponding content(s) to another party while according to a second method, the (e.g. mask attribute information (e.g. that describes the mask) such as the type of the mask, its size (e.g. at the moment of sharing), its location (e.g. x, y), etc. may be sent to a receiving party's device and upon receiving the/a corresponding shared content (e.g. (combined) screenshot), such a mask may be created/brought and positioned on said content from a source/sender other than from the sending device (e.g. locally from the receiving device) based on said information received from the sending device.

It must be noted that according to one embodiment, a masking means (e.g. a mask of the invention) alone may be shared/sent with/to others so that to cover a corresponding portion of the screen of a receiving party.

It must be noted that according to one embodiment, the maskie application of the invention may permit masking at least a portion of any (e.g. type of) content which is on the screen of a/the corresponding device and/or a portion of the output of a specific application which is being used by several users.

According to another embodiment, a masking application of the invention may permit to mask by a user (e.g. of a device or automatically) a portion of the screen of a number of other selected users' devices simultaneously (e.g. in real-time).

Note that according to one embodiment, the main buttons of both smsnap chatting application and the maskie applications (e.g. or similar applications) may be presented on any other app on the screen so that to permit combining the benefits of said both applications. As an example, the user may take a photo, use the input method/interface of the smsnap chatting application to type on a desired location on the screen, then use the maskie application to take the screenshot, if desired mask a portion of the screenshot, and share it with others. Note that according to a preferred method, the text box of the chatting application may be transparent so that only the text is visible on the screen.

According to one embodiment, a covered/hidden (e.g. at least a) portion of a (e.g. received) content may be possible to be uncovered/unhidden (e.g. by a receiving user) for a preferably predefined laps of time varying from zero second to infinity. As an example, a mask covering a content may be defined by default as being moveable for a laps of time (e.g. from 0 seconds to infinity). Preferably, after said laps of time the mask may not be removed/moved. Preferably, said laps of time begins when an unmasking interaction (e.g. dragging the mask to move it, or long pressing on it to remove it). Said laps of time may be defined by a user or automatically by the system. Said laps of time may be the same for a selected number of users and/or it may vary for different users or for different group of users. According to one method, unless otherwise decided by an owner of the/a mask/content, said laps of time may by default set to a predefined laps of time (e.g. 0 seconds, 10 seconds, indefinite, etc.). Preferably, a means such as a timer or a list of different number of times (e.g. seconds) may be available to the owner of the mask for selecting a/said laps of time.

According to another embodiment, an uncovered (e.g. at least a) portion of a (e.g. received) content may be covered, or vice versa, for preferably a predefined laps of time varying from zero seconds to infinity.

According to one method, a means may be used to define and/or control said laps of time. According to a preferred method, a hidden/covered portion may be uncovered/unhidden upon completion of a condition such as a paying a fee. As such as an example, a non-movable or a non-removable mask may be moved/removed after a user pays a payment fee for example to an on-line store (e.g. related to the/a Maskie/masking app).

Note that the main button of the maskie application and/or chatting application may be presented on the screen upon interacting with the corresponding zone/button on/from the notification bar of the corresponding device. For that preferably the notification bar may preferably always include the corresponding button/zone at least when the application in not activated and/or a corresponding main button is not presented on the screen.

Note that any of the applications may not have a main button and it may be activated from the notification bar/menu of the device.

According to one embodiment, a (e.g. received) content including or excluding a masking means (e.g. herein may be referred to as a combined content) may partially or entirely be disappeared/removed from a (e.g. receiving) user's device after a (e.g. predefined) laps of time (e.g. defined by the owner/sender of the combined content).

As mentioned before, a (e.g. combined) content may be shared with a single user, a group of users, or with all of the users of the application.

Swiping methods of the invention for example by combining tapping actions and/or swiping actions (e.g. simple or complex gestures) have been described before. Said swiping methods may be used with any of the keyboards (e.g. the keyboard having six letter-zones) of the invention. According to one method, a short gliding action provided from a zone upwards or downwards may preferably correspond to interacting with said zone and the neighboring zone in the corresponding gliding direction. Accordingly, a long gliding action provided from a zone upwards or downwards may preferably correspond to interacting with said zone and the zone after the neighboring zone in the corresponding gliding direction. A gliding action ending outside the keyboard may preferably be resulted in adding a predefined character (e.g. space character) after a previous character or may result in providing a function.

As mentioned swiping actions over the (zones) of a keyboard may emulate other type of interactions such as tapping actions on a keyboard. Optionally, more than one swiping action may be used for entering a word. Preferably, each of said swiping actions may correspond to providing the input information (e.g. input signals) corresponding to a (e.g. different) portion of a desired word. Preferably at the end of the providing one or more swiping actions corresponding to a word, an end-of-the-word signal such as pressing on a space key, entering a special character or a function may inform the system that the input information corresponding to entering a word is ended. Preferably, in addition to providing one or more swiping action, one or more tapping actions corresponding to one or more characters of the desired word may be provided on a/the keyboard. By considering the combined input information (e.g. at least one swiping action and/or at least one tapping action) the system may predict a word. Note that, preferably, at least some of the input signals provided as such may ambiguously correspond to a plurality of characters.

Preferably, the beginning point and the ending point of a swiping action correspond to a tapping action provided on their respective points (on the keyboard). Preferably, a change at any point in the trajectory of a swiping action, and any other change such as a pause or change in speed of the gliding action may correspond to an additional tapping action provided on the respective point (on the keyboard).

As an example, in FIG. 25A of these principles:
- The swiping action/trajectory 424011 may preferably correspond to two times interaction (e.g. two tapping actions) with the zone 424001.

The swiping action/trajectory 424012 may preferably correspond to interaction with the zones 424002 and 424003.

The swiping action/trajectory 424013 may preferably correspond to interaction with the zones 424005, 424003 and 424006.

The swiping action/trajectory 424014 may preferably correspond to interaction with the zones 424002, 424004 and 424006.

The swiping action/trajectory 424015 may preferably correspond to interaction with the zones 424002 and 424006. Alternatively, the swiping action/trajectory 424015 may correspond to interaction with the zones 424002, 424004 and 424006.

According to one method, each of two similar swiping actions provided in different/opposite directions may preferably correspond to different chain of characters. They preferably correspond to the order of characters printed on the keyboard or on corresponding zone(s). As an example, in FIG. 25B, the swiping action 424016 may correspond to the word "it" and the swiping action 424017 may correspond to the word "up".

As mentioned, a swiping system described here is preferably used to emulate/correspond to providing corresponding tapping actions on a keyboard. A swiping system may be used with any of the embodiment, principles, methods, examples, etc., of the invention.

As an example, the correction procedure of the invention correcting a word which is mistyped may be applied to the swiping method of the invention wherein at least some of the swiping actions provided to correspond to the input information corresponding to a desired word may be erroneously provided. As an example, in FIG. 25C swiping actions 424111 to 424115 respectively correspond to interacting with the keys 424005, 424004 and 424006-424003 and 424002-424004 and 424002-424001 and 424003-424002 and 424002-424004 and 424006. This input information corresponds rightfully (e.g. with no mistakes/mistyping) to all of the letters of the word 'configuration" and the system may preferably propose said word.

The data entry system of the invention permits a large percentage (e.g. from more than 34 percent for short words to up to 100% for long words) of sloppy/mis-tapping and/or erroneous interactions (e.g. swiping actions) corresponding to a word and still predicts the right word in most of the times. Note that preferably the tapping and/or swiping actions are rightfully provided on/between the corresponding large zones.

As an example, in FIG. 25D swiping actions 424211 to 424215 respectively correspond to interacting with the keys 424005, 424004 and 424006-424003 and 424004 (erroneous)-424004 and 424002-424001 and 424001 (erroneous)-424002 and 424002-424004 and 424004 (erroneous). By considering the principles of the two large zones and six small zones as described herein, the word that best matches this input information is the word 'configuration" and the system preferably proposes said word.

Note that the accuracy of the prediction may be augmented by considering language rules (e.g. by considering the one or more words preceding the current word being entered).

In the exemplary FIG. 25E a combination of swiping and tapping actions are rightfully provided to enter the word "configuration". Note that in this example, the tapping actions 424315/1 and 424315/2 replace the gliding action 424215 of FIG. 25D. The rest of the gliding actions of FIG. 25E are respectively similar to the gliding actions of FIG. 25D.

According to one method, each back and forth or circle based swiping action in a zone may preferably correspond to an additional interaction with said zone.

Note that the terms "gliding action" and "swiping action" used in this patent application have similar interpretation.

According to a one method, the owner of a (e.g. removable) mask may have a control means to control his owned mask to be movable or non-moveable (e.g. by any entity such himself, a receiver, etc.) upon completion of a condition. For example, the owner may decide/define that the mask can be removed one or more times, at a desired time, for a desired laps of time, upon providing a password, etc.

According to one embodiment, a mask may be moved to preferably unhide a (e.g. a hidden) portion of a content that said mask hides by an interaction with the mask (or with a means related to the mask) such as, for example, a dragging action (e.g. touching screen on location of mask, and then moving finger while still touching the screen to a different location). According to a preferred method, upon releasing the mask (e.g. upon removing the finger) the mask goes back to its original location to hide the original said (e.g. hidden) portion again.

According to one method, as long as the user has not removed the finger from the screen/mask, the (e.g. hidden) portion may preferably remain unhidden.

According to one embodiment, a time definition system (e.g. a slider) may be used to define the laps of time for a mask to remain hidden and/or unhidden. The control of such a system may be assigned to the owner (e.g. sender) of a mask or to a receiver of the mask. The start (e.g. timestamp) of the on hiding period/lapse of time may be defined upon a completion of a condition such as predefined date/time, by a user (e.g. preferably the owner of the mask), an automated system condition, etc.

According to a one method, a mask may be defined as being movable for all people or by a number of selected people. The control of such a mask may preferably be assigned to the owner of a mask.

According to a preferred method, a mask (e.g. on a shared content) may be defined as being either removable or no-removable.

According to a preferred method, the receiver of a (e.g. removable) mask may (e.g. locally in his/her device) have a control means to control a received mask to be movable or non-moveable upon completion of a condition. For example, the receiver may decide/define that the mask can be removed one or more times, at a desired time, for a desired laps of time, upon providing a password, etc.

Based on the hiding/unhiding principles described, according to one embodiment, any type of content (e.g. on a screen) may locally (e.g. within a device) be secured and the security may be controlled by preferably the owner of the corresponding device. As a first example, a user creating a content (e.g. a text) may hide/mask one or more portions of the content and control them locally as described. According to a second example, in a messaging application, a receiving party of a masked content who is authorized to remove the mask (e.g. herein may be referred to as the authorized/trusted user) may control the unmasking and/or re-masking of the content/mask).

Note that according to one method, a same moving condition may be assigned to each mask of a group of masks, while according to another method, a different moving condition may be assigned to a different masks or a group of masks.

According to one method, upon certain condition(s) (e.g. a ceremony, a specific holiday, geolocation, etc.) the masks available within a corresponding application may be dynamically changed.

According to one embodiment, more than one specific content/function may be assigned to a mask. According to one method, upon completion of a first condition (e.g. a first interaction) with a mask (e.g. by a trusted/authorized user), a first content/function (e.g. an audio) may become available to the user. Thereafter, a second content/function (e.g. a video) may become available to a user upon a completion of a second condition (e.g. a payment fee). (e.g. And so on).

According to one embodiment, a content may be a container containing one or more contents. Possibly, some of said contents may be displayed on the screen (e.g. or presented to/for or active for a user). According to one method, one of said contents (e.g. herein may be referred to as a first content) may (e.g. dynamically or predefinitely) be defined as the main content supporting other contents (e.g. herein may be referred to as secondary contents) (e.g. on the screen) (e.g. other contents are mainly displayed/presented/active over said first content, wherein preferably each occupies (e.g. replaces) preferably a portion of said main content). As an example, a main content may be a text box, a photo, a video, or otherwise, etc.

According to one embodiment, in a messaging system of the invention, the main content may be a picture, a text box, etc. A secondary content (e.g. such as a video) (e.g. may be taken and) may be placed as a secondary content over the main content. Preferably the (e.g. video) content frame/container may be resized and/or removed on the screen. Said content (e.g. video) frame/container may be masked by a user and preferably be shared with others. Authorized receivers/users may be able to unmask the content (e.g. video) frame/container. The unmasking (e.g. moving/removing the mask) procedure may preferably result in automatically activating the (e.g. hidden) content such as, for example, playing the video of a video content. A predefined interaction such as a tapping and/or a sliding action preferably on the content (e.g. video) container may result in activating a function associated with said content (e.g. or said content container) such as, for example, recording/playing/stop-playing function depending on a current status of a video recorder/player. As an example, a sliding action may be considered as recording or playing function, and a tapping action may be related to stop recording/playing function.

According to one embodiment, upon creating (e.g. selecting and placing a mask a on a location on (e.g. a content) on the screen, a mask may either be defined as not movable (e.g. herein may be referred to as a locked mask) or as being movable/removable (e.g. herein may be referred to as a unlocked mask).

According to one embodiment, the status of a locked mask may change to become an unlocked upon completion of a condition. As an example, such a condition may be, by entering a password, providing a (e.g. simple and/or complex) gesture, through a speech recognition system, etc. Accordingly, the status of an unlocked mask may change upon completion a condition.

Note that the conditions, principles, methods, etc. (e.g. herein may be referred to as principles) of locking and/or unlocking a mask may be applied to the device in which a mask is created/positioned on a content by a user (e.g. locally created/positioned masks to cover at least a portion of a content in the device of the owner/creator of a mask) and/or said principles may be applied to the user/device receiving a mask.

According to one embodiment, a locked mask may be unlocked upon completion of a condition such as through entering password, a complex and/or on or more simple gesture, upon a voice command, etc. According to a first method, after a predefined laps of time, the unlocked mask may become locked. According to a second method, after dragging/moving an unlocked mask and removing the finger form the mask/screen, the unlocked mask may preferably go back to its original location and my preferably becomes locked.

The principles of masking/unmasking, locking and/or unlocking masks, as described throughout this application are preferably used to control viewing (e.g. or disabling viewing) of at least a portion of a (e.g. screen) content by a user (e.g. an owner of a mask). By using such principle, a local or remote security system may be created to control documents (e.g. photos, vides, emails, messages, etc.) respectively, on the device of the owner of a mask and/or of/on the device of another party (e.g. a receiving party of a mask or of a content containing a mask).

Principles of presenting at least one predicted word in a word list/bar have been described before. According to one method, providing a predefined interaction such as providing a gesture in a predefined (e.g. upwards) from a word (e.g. in the word list/bar) may result in assigning a higher (e.g. than the current frequency of the word) preferably the highest priority to said word among other words that correspond to a same input information (e.g. the same sequence of key/zone interactions corresponding to their character/s). According to one embodiment, providing another type of interaction with said word (e.g. providing a gesture downwards) may correspond to assigning a lower priority to said word. In case, that such a word has the highest priority, and therefore it may be presented in the corresponding (e.g. text) document rather than in the word list/bar, preferably said predefined interaction (e.g. providing a gesture downwards) may be provided with/from anywhere in the word list/bar.

Note that, assigning a higher or lower priority to a word may preferably be applied to the corresponding entry of a database. As an example, if a word is being proposed does not have a prefix (e.g. is not offered based on its (e.g. one or more) previous words in a text) then the system may refer (e.g. applies said higher/lower priority) to said word in a (e.g. or as a) 1-gram entry. Accordingly, preferably, if a word that is being proposed has a prefix (e.g. is offered based on its one or more previous words in a text) then the system may refer to said word in the corresponding N-gram (e.g. two or more grams) entry/ies.

A searching procedure based on a multi-media content (e.g. herein may be referred to as a (virtual) banner) and/or a multimedia keyword (e.g. herein may be referred to as a complex keyword) for searching said banner (e.g. by using the principles of the image editing system of the invention) have been described before by this inventor. A banner may be created to relate to represent any predefined thing (e.g. herein may be referred to as the goods) such as a physical/virtual goods, an entity, etc.

A complex keyword may be created by using the principles of an image editing application (e.g. of the invention). A complex keyword may include a (one or more) main content/s (e.g. herein may be referred to as background) that preferably may correspond to the colors of a banner(s) being searched. The complex keyword may preferably include additional elements/information such as a (one or more) text (e.g. preferably typed on the main content), direction of the text, the font used, the size of the text (relative to the background size), the color of the text, location of the text on the keyword, one or more virtual objects/tools such as drawing tools, clipart, shapes, (simple) pictures, an audio (e.g. a sound, music, speech), etc.

Note that according to one method, an application (e.g. the same application and/or a different application) may be used to create a virtual banner.

A complex keyword may preferably be created in a search application. A search engine receiving a such keyword may try to match the received (e.g. complex) keyword to the/a (e.g. one or more) corresponding virtual banners in a database of virtual banners and may propose/present the best matched contents in the database to a/the user.

The search interface of the search system may also include a number of predefined elements/tools as mentioned before to be selected/used (e.g. by a user) for including/forming a search keyword.

By considering the principles of such a search system, a virtual banner (e.g. a multi-media key/object) may be created (e.g. preferably based on the principles/parameters described above, or based on other principles) for each existing and/or created virtual and/or physical goods. Said virtual banner may be searched by the search system of the invention based on a complex keyword received from a user searching any goods. The virtual banners relating to the best matched complex keyword may be selected and/or presented to the user searching for a goods.

Based on the principles described, an extremely enhanced content search may be created. In today's search systems/engines which are mainly based on text only, searching a desired content may result in millions of results which most of them are not related to what user is looking for. Additionally, small entities often do not have the necessary resources to be seen (e.g. in a first page of search results) when a user searches for them. By using the system described here, everyone can create his/her/its own specific multi-media object/virtual banner (e.g. corresponding to his/her goods) such that to be distinguishable from others, permitting being viewed/found by others with much more precision.

Note that the inventions, features, principles described herein may be combined, or replace each other in different applications/systems described herein.

According to one embodiment, the keys keyboard of the invention may be of any kind such as hard and/or soft keys. As an example, FIG. 23A shows a keyboard having six soft/on-screen (mainly) letter keys divided in two groups of keys 422001 and 422002 located on opposite sides of (e.g. the screen 422009 of) a device. The keyboard also includes a function bar 422005 as described before. Preferably, the function bar is located near an/any edge of/on the screen of the device.

Also as an example, FIG. 23B shows a keyboard having six touch-sensitive/hard/physical (mainly) letter keys divided in two groups of keys 422101 and 422102 located (e.g. on opposite sides) preferably on the edges of a device. The keyboard also includes a function bar 422105 as described before.

Preferably, the function bar is located near an/any edge of/on the screen of the device. FIG. 23C shows another example of a keyboard having six hard/physical (mainly) letter keys divided in two groups of keys 422201 and 422202 located (e.g. on opposite sides) preferably on the edges of a device. The keyboard also includes a function bar 422005 as described before. Preferably, the function bar is located near an/any edge of/on the screen of the device. In this example, the side keys also include a physical backspace 422205 key and a physical space key 422206.

Preferably, the order of the distribution of characters/letters on the letter keys may be similar to or based on a traditional keyboard such as a QWERTY keyboard with or without some/a (slight) modification/s (e.g. see the example of FIG. 5D). As an example, in FIGS. 23A to 23D, each of the left split keys may respectively include the letters of the left split keys of FIG. 14A, and each of the right split keys may respectively include the letters of the right split keys of FIG. 14A.

In the examples above, by receiving the (e.g. ambiguous) input information (e.g. key presses) corresponding to a word through the usage of said (e.g. letter) keys, the system may propose one or more words.

As shown in FIG. 23D, at any moment, automatically and/or based on a user interaction, a full traditional/full keyboard may be displayed on the screen (e.g. to enter precise characters such as letters and/or special characters). Note the/a proposed word list may be displayed on the screen when a user types a word. Note that in the example of FIG. 23D, the space key 422316 and the backspace key 422315 are located on the screen preferably close to the corresponding respective group of (physical) letter keys 422308 and 422307.

According to one embodiment, (e.g. upon) a predefined interaction such as a gesture from or a long pressing on a character such as a letter on a (e.g. an ambiguous) key, said letter may be selected/entered by the system precisely (e.g. herein may be referred to as an identified character). During the entry of the input information (e.g. key presses on the corresponding ambiguous keys) the user may enter one or more identified characters of the word. By considering/combining the one or more ambiguous input signals (e.g. by tapping on ambiguous keys) and at least one or more identified characters (e.g. by long pressing on ambiguous keys) corresponding to a word the system may faster/more accurately predict a desired word.

As mentioned before, a keyboard of the invention may be divided into several zones (e.g. fixedly or dynamically). As an example, when a user interacts near an edge of a (e.g. fixed) zone with said zone, the system may relate said interaction with at least one of the characters of the neighboring (e.g. fixed) zone, preferably in addition to any of the characters of the interacted zone providing a dynamic zone interaction. As an example, when a user interacts within a horizontal zone of a keyboard near another horizontal zone of said keyboard, the system may relate said interaction to the characters of the interacted zone and preferably one or more characters (e.g. preferably those near/closed to the touching impact) of the/said neighboring zone. According to one embodiment, such an interaction may correspond to all of the characters of the corresponding (horizontal) row of zones. Note that according to one method, in addition, (e.g. with less priority) one or more characters from another neighboring zone preferably the characters that are close to the touching impact or (e.g. with still less priority) any other character of the keyboard may also be considered by the system. Based on the principles described, upon receiving a sequence of key/zone interaction the system may permit/propose a corresponding word.

Note the zones of the keyboard of the invention are generally horizontal long zones covering a large number (e.g. 4 to 6) characters of a row of (e/g/a traditional) a keyboard. By tapping on a zone the system may relate said tapping action to any of the characters assigned to said zone. Note that as mentioned, upon interaction with a zone/key the number of characters considered by the system may vary/augment if the user provides an interaction with a zone near another zone.

Usually a user typing (e.g. a long word) types with more precision the beginning and/or the ending characters of a word. By considering this fact, a method of auto-correction may be provided to correct mistyping or misspelling of a word (being) typed. According to one embodiment, when a word is being entered, the system may scan the words corresponding to the input information provided by the user (e.g. starting from the first character towards the last character, and/or starting from the last character towards the first character). The words that their beginning portion and the ending portion best match the corresponding input information provided by the user may be presented to the user. Note that the input information may include ambiguous input information (e.g. by tapping on ambiguous keys) and/or precise input information (e.g. by entering identified/precise character/s). Preferably, the length of the words being scanned are close to the number of characters corresponding to the input information provided by the user (e.g. same length, or shorter or larger words having for example less or more N characters wherein N is preferably 1 or 2).

Note that for better accuracy of prediction, words that are selected/presented are those that the rest of their characters best match the corresponding input information.

Note that preferably the zones of the keyboard are horizontal each corresponding to a number of characters of a row of a (e.g. traditional) keyboard.

According to one embodiment, a traditional (e.g. QWERTY) keyboard may be considered by the word predictive the system as having three zones (e.g. each zone corresponds/covers a different horizontal row of the keyboard.

According to one embodiment of the invention, the keyboard of the system may include a zone/key (e.g. herein may be referred to as spell help key) that interacting with it may ambiguously correspond to any character of a large number of characters including a number of letters preferably all of the letters of a language. During the entry of a word, if a user does not know the exact spelling of a portion of the word, he/she may type/interact with said spell help zone/key a number of times corresponding and/or close to the number of characters of said portion. The user may provide/type the rest of the characters on the correct (e.g. narrow) zones. By considering the interactions on the (e.g. narrow) zones and the interactions on the spell help key, the system may predict corresponding word(s).

Note that a word being selected based on the input information provided by a user is preferably selected based on a combination of parameters such as frequency of use, the best match interacted narrow and/or large zones, direction of taps on in a corresponding sequence of taps on the large zones described in this application, the corresponding word/s being from a 1-gram or being a (the last) word of a N-gram entry wherein N>1, etc.

As an example, for a word having a higher frequency of use may be given a higher priority over another word that has less frequency of use even if is better matches the (e.g. narrow/large) zones being interacted by the user in the corresponding input information (or vise versa).

According to one embodiment, during the entry of a word in addition to ambiguous input signals corresponding to ambiguous key interactions corresponding to a word, the user may enter at least an identified character of the desired word relating to a desired character position. According to one method, a gesture on/departing from a character/letter or a long pressing action on a character/letter may enter said character precisely. By considering at least one identified input signal/character and at least one ambiguous input signal the system may predict one or more corresponding word from a database of word.

Note that the predicted words may be words corresponding to the number of characters corresponding to the input information provided by the user, and/or they may have another length (less or more characters than the input information) preferably longer length.

In the/an/any messaging system (e.g. SMSnap) wherein a portion of its interface is preferably (e.g. permanently) presented over (e.g. overlaps) a main application which is open on the screen, according to one embodiment, the function bar of the messaging system may include more keys/icons corresponding to different functions. As an example one of the keys may correspond to opening a search interface (e.g. a search web page such as the Google search page), a URL search field, etc. Another key may correspond to calling a person/entity for which a chat icon is presented on the screen (e.g. upon receiving a message, opening a chat, etc.). The chat icon may be presented, for example, by selecting a contact from the application's contact list or it may correspond to a received message, etc. By interacting with the icon/button corresponding to an open chat, the system may call the corresponding person/entity. Note that similar icons/buttons may be used for any type of other functionalities. As an example, the function bar may include a button/icon wherein interacting with it opens a document (e.g. locally on the device or remotely from the internet), open a corresponding URL, etc. This may permit collaboration between the provider of a such messaging system and any other entity such as another business, company, etc.

As mentioned before, the chatting/messaging interface of the messaging/chatting application of the invention may partially overlap the screen and/or the interface of another/any application which is open on the screen (e.g. at any time) (e.g. independently from said another application). According to one embodiment, one or more of the function icons/keys in the chatting application may be related to a selected/another application. For example, by interaction with said key/icon a gaming application may be opened, a web page of a gaming application me be accessed, an advertisement may be presented to the user, etc.

Preferably, at least a portion of the chatting application may be transparent/invisible so that the icon discretely occupy the screen of a device while being accessible easily.

Note that according to one embodiment, at least the (e.g. interface) of the chatting application may be located on the screen of any device such as a television (TV), a PC, etc., permitting instant/permanent chatting/messaging with others while for example watching a TV program, working with the computer, etc.

According to one embodiment, a (e.g. hidden) (e.g. covered) portion of a content (e.g. to be shared) may become hidden (e.g. covered) upon completion of a condition. As an example, a user creating a content may perform an action to hide at least a portion of the content (e.g. make it invisible by a mask which preferably is also invisible, or simply make it none-shown). Said content may be shared with other people. A procedure may allow the creator of the content to decide to which of the people the hidden portion/s become unhidden/visible (e.g. upon receiving the content or at a later time).

As an example, this may permit to create a document and make a portion of it visible to only a selected number of a group of people with which the document is shared. Note that all of the methods, principles, etc. of hiding and/or unhiding a content as described herein or in the previous patent applications filed by this inventor may be applied to be used/with the current embodiment/s.

According to one embodiment, a predefined interaction such as removing a mask from a portion of a content may make some (e.g. one or more) other hidden portion/s of a/the content unhidden. For example, the creator of a content may mask a portion of a content and additionally provide some text in/on another portion of the content. Said provider may make said text invisible (e.g. by using a tool/s in the corresponding application). The user may relate said hidden text to said mask that covers another portion of the content, such that upon an interaction (e.g. moving, removing, tapping on, etc.) with the mask (e.g. by an authorized person) the invisible text becomes visible.

According to one embodiment, a chatting/messaging system may be created such that a message may include a hidden and/or invisible portion. As such a user may mask/hide or make invisible a portion of a message, and preferably permit the hidden/invisible portion to become unhidden/visible upon completion of at least one condition (e.g. to an authorized person, after a laps of time, for a laps of time, etc.). According to a preferred method, a portion of the message (e.g. a (portion) of a line of text, etc.) may become hidden or made invisible upon an interaction such as a sliding action provided on said portion. Preferably with the same manner (e.g. by sliding on the hidden/invisible portion) said portion of the message may become unhidden/visible.

Figure 24A:
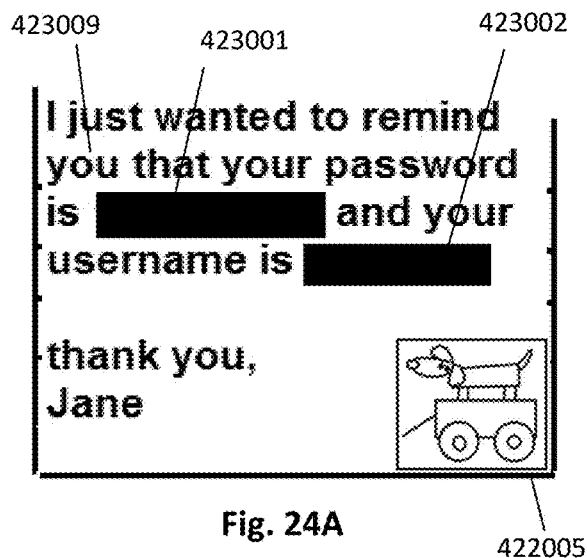
FIGS. 24A-24B describe a content control system and its corresponding exemplary interface in accordance with an exemplary embodiment of the invention.
Figure 24B:

FIG. 24A shows the screen of a device wherein a text message is written to be sent to/shared with a group of people. In this example two portions of the text message are masked by the sender. In this example, the sender may authorize one or more of the receiving parties to move/remove the mask (e.g. see FIG. 24B). The rest of receiving people may not be authorized people, therefore they will not be able to move/remove the mask The data entry system(s) of the invention can be used in any size of touch sensitive surface from the smallest (e.g. smartwatch) to the midst (e.g. smartphone) and the largest (e.g. tablet and larger devices) while keeping the user's typing experience at a very high level (fast, accurate, comfortable, etc.).

Figure 26A:
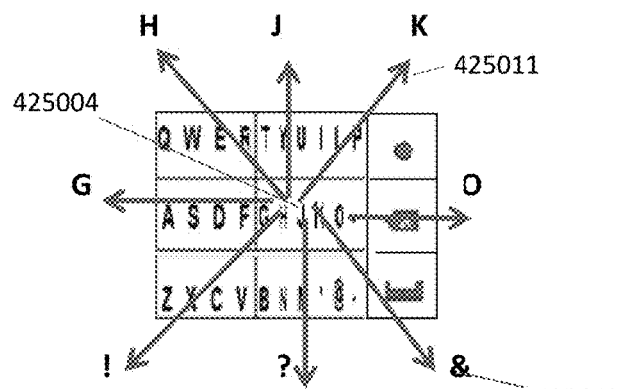
FIGS. 26A-26G describe a method of swiping over a keyboard for entering precise/identified characters in accordance with exemplary embodiments of the invention.
Figure 26B:
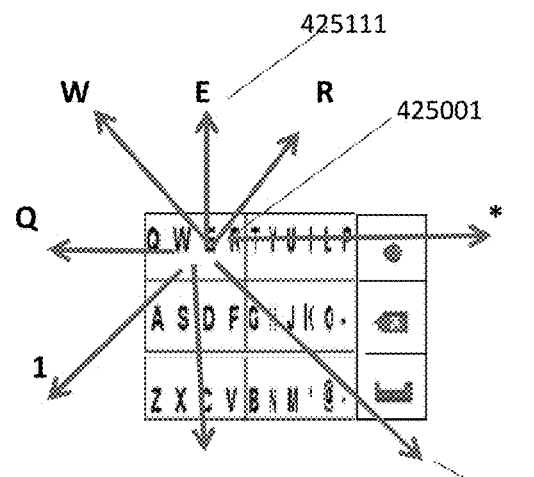
Figure 26C:
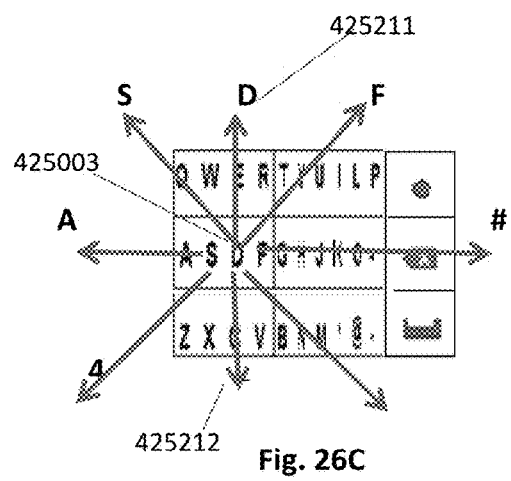
Figure 26D:
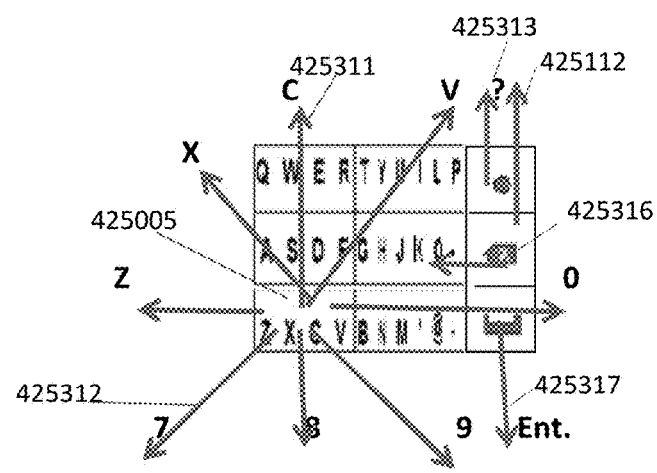
Figure 26F:
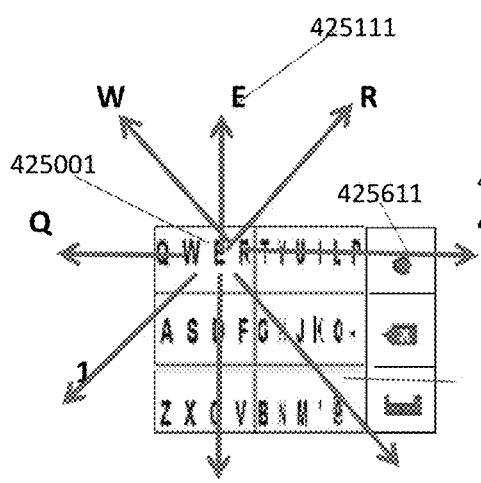
Figure 26E:
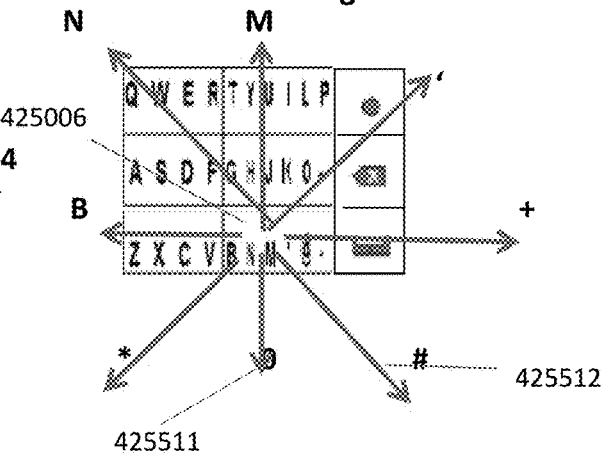

FIG. 26A shows as an example, a keyboard of the invention having six zones and a reduced size. When a keyboard has a reduced size typing precisely on character may be a cumbersome task. In order to solve such a problem a method of entry of precise characters using gestures may be created. According to a preferred method, a swiping action provided from anywhere on a key in a predefined direction may correspond to entering a predefined character assigned to said gesture. In the example of FIG. 26A each of the gliding actions provided in eight (e.g. or any other predefined number of) different directions from a (an ambiguous) zone (e.g. a zone to which a number of characters are ambiguously assigned) corresponds to a different identified character preferably assigned to said zone. For example, the gliding actions 425011 and 425012 provided from the zone 425004 respectively correspond to entering precisely the characters 'K' and '&'. Note by using this method, any of the letters assigned ambiguously to the zone 425001 may be entered precisely. In addition a number of special characters can also be entered precisely. In FIG. 26B, in addition to entering precisely a number of letters (e.g. 425111) assigned to the ambiguous zone 425001 a number of digits (e.g. 425315) can also be entered. By applying this method to different zones of the keyboard, substantially all of the letters of a language can be entered precisely and in addition a large number of special characters can also be entered. FIG. 26B to 425D show how to enter the digits 0 to 9, In these examples, the keys/zones and the digits assigned to the corresponding gliding actions from each zone are defined based on a standards number pad digit location. In these examples the digit 0 and the characters * and # are assigned to swiping towards right from their corresponding zones while in FIG. 26E the characters * 0# are assigned to gliding actions in different direction from the zone 425006. It must be noted that these are only examples. Any character, function, or content may be entered by assigning it to a gliding action in any predefined direction from any predefined zone based on the principles described here. In FIG. 26F, the digit 4 is entered through the gliding action 425611.

Figure 26G:
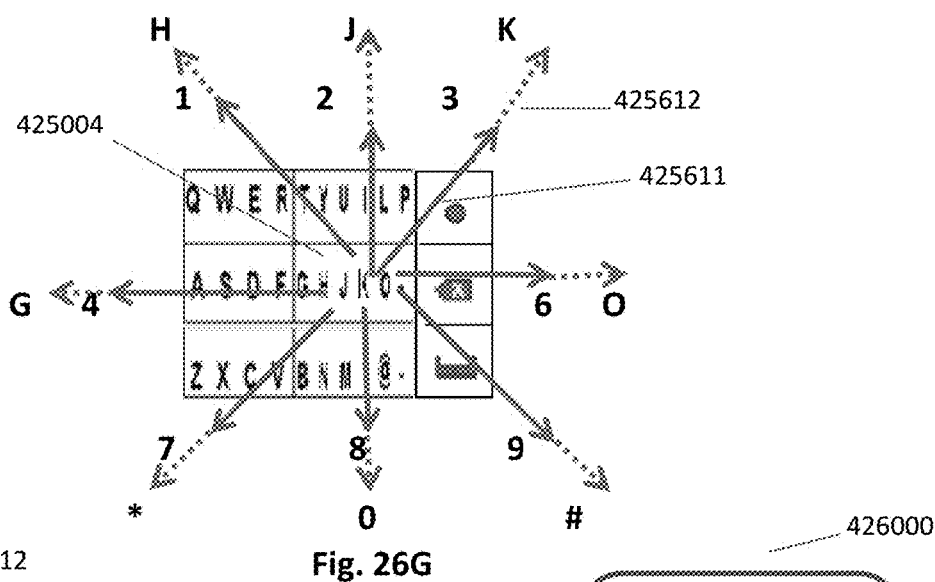

According to one embodiment, depending on different predefined lengths of a gliding provided in a predefined direction, different corresponding identified characters may be entered. In FIG. 26G as an example, gliding action 425611 and 425612 provided from the zone 425004 towards upper right direction are respectively related to entering the characters '3' and 'K'. Same principles may be applied to gliding actions towards other directions departing from said zone or from another zone.

Figure 27B:
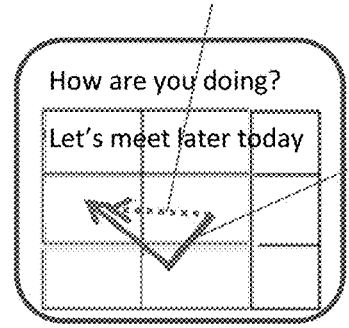
FIGS. 27A-27I show different types (e.g. virtual, physical) of keyboards used with a (e.g. wrist-mounted or not wrist mounted) device and describe methods of text entry therein in accordance with exemplary embodiments of the invention.

A keyboard of the invention in a small form factor (e.g. the keyboard of FIGS. 26A to 26G, etc.) may be used with a wearable device such as a Smartwatch. In FIG. 27A a such keyboard in an on-screen version is implemented in a wrist-mounted Smartwatch 426000. In this example, the on-screen keyboard is in its visible version. FIG. 27B shows the same keyboard in its invisible mode.

As mentioned before, the keyboard of the invention may also have hard keys version wherein each of the hard keys represent one of the zones on the on-screen keyboard of the invention. At least substantially all of the principles of the data entry system of the invention (e.g. (6) small zones, (2) large zones, correction of mistyping, etc.) may preferably be applied to the virtual/on-screen keyboards of the invention may be applied to the hard keys version.

Figure 27C:
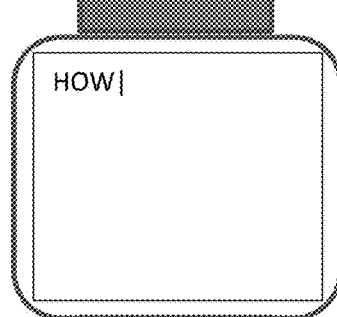
Figure 27A:
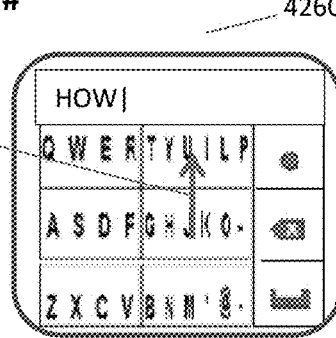

In FIG. 27C, the hard keys version 426201 of the keyboard of the invention is implemented on a bracelet of and wirelessly and/or by wires is connected to a wearable/small device (e.g. such as a Smartwatch) and/or to another device. The assignment of characters to the keys may be based on principles described herein such as that of FIG. 28A.

Note that the corresponding device may also include a soft/virtual version of the keyboard (e.g. for entering identified characters (e.g. letters and/or special characters).

Note that the hard keys version of the system can be implemented and/or used with any type of device such as a pendent electronic device, a wrist mounted device, etc.

It must be noted that the hard/physical keys may be of any kind. According to one aspect, said keys may have a touch sensitive surface so that gliding actions in different directions (e.g. to permit entering precise character and/or function as described for on-screen zone/keys).

According to one method, a gliding action(s) (e.g. simple, complex) provided may be considered both as a sliding action corresponding to interacting more than one time with the keyboard as described herein and/or to enter an identified character. Preferably, (e.g. both) corresponding characters (e.g. and preferably, their corresponding words) may be presented to the user by the system. As an example, in FIG.

27A, the a corresponding processor may relate the simple gliding action 426011 to, both, interacting with the keys 426004 and 426002 (e.g. providing the word 'hi') and to the identified character T. Both choices may be presented to the user. Accordingly, in FIG. 27B the complex gliding action 426111 may be related to, both, interacting with the keys 426004, 426006 and 426003 (e.g. providing the word "I'd") and to the identified character 'G'. Note that in this example, an imaginary straight line/trajectory 426112 departing from the beginning point of the complex gliding action 426111 and ending at the ending point of the complex gliding action 426111 defines the corresponding identified character 'G'. Optionally, (e.g. alternatively), an identified character may be related to the first (e.g. or other) (e.g. linear) portion of the gliding action 426111. These principles may be applied to any of a number of gliding actions corresponding to a word. By using this method, a user may enter ambiguously and/or precisely words using interaction(s) (e.g. such as gestures).

According to one embodiment, during the entry of a word, the word which is being shown/entered in a corresponding text (field) may be duplicated (e.g. along with surrounding text, e.g. in the same sentence/paragraph) and shown in another location on the screen of the corresponding device. As an example, said word may be shown in a none-interactable window use for presentation purpose. Preferably, said window is located on or near the corresponding keyboard and/or the corresponding word list on the screen. This may be beneficial for many reasons such as a) if the word being entered in a text is located under the keyboard or under any other window on the screen the user may see the duplicated word, b) the duplicated word is close to or on the keyboard close to the other predicted/proposed words in the word list, etc. As an example, a keyboard on the screen of a smartwatch may occupy a substantial portion of the screen. A user typing a word may not be able to see what he/she is typing because the word being typed may be covered the keyboard. In this case a/said duplicated word may preferably be displayed in an inactive window (e.g. to not disrupt interacting with the keyboard) on the screen. Said duplicated word may preferably be shown in a large font (e.g. distinguished/highlighted in some manner).

Figure 27D:
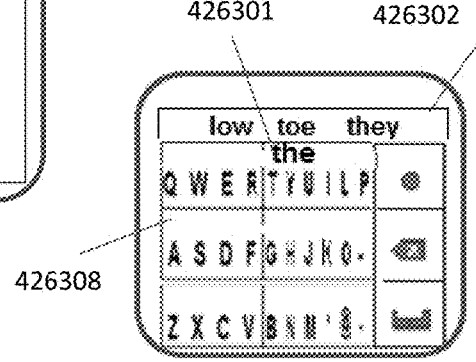

FIG. 27D shows as an example, a user entering text using a very small device such as a smartwatch. In this example, the word 'the' 426301 is predicted by the system as the best choice for the input information provided by the user. In this example, the keyboard 426308 is covering a substantial portion of the screen of the device and the word 'the' may be entered in the/a text field (e.g. that may be situated) under the keyboard or not being shown for a reason such as the presence of the keyboard on screen. A copy 426301 of said word is also shown on the keyboard and preferably is not (e.g. user or touch) interactive. In this example, said copied word is displayed near an interactive word list 426302.

Wearable computers are becoming popular. Many wearable computers such as a smartwatch may have small displays. A character-based text entry may be difficult on a small keyboard. According to one embodiment, the (e.g. word predictive) system may include a precise character (entry) mode to enter identified characters by interacting with a key/zone corresponding to a character on said keyboard.

According to a preferred embodiment, at one instance (e.g. only) a portion (e.g. left side, a half, the characters of a large ambiguous zone of the keyboard, etc.) of a (e.g. precise) keyboard may be presented on the screen so that to permit the display large keys/characters on the screen. A user may reach another portion of the keyboard by providing a predefined interaction such as a scrolling/gliding action in a corresponding/desired direction, for example, on the keyboard. According to one method, at one instance a first portion (e.g. first half) of a keyboard may be displayed on the screen. To access to a second portion (e.g. second half) of the keyboard the user may provide a predefined interaction such as providing a gliding action on the screen/keyboard in a/the desired direction.

The present concept/aspect/embodiment may be used to enter any character precisely or activate any function corresponding to a key interaction with the keys of the keyboard.

The character-based text entry may be combined with the/a word predictive data entry system (e.g. of the invention) for entering precise characters for example when entering words that are not included in a database of words used by the system, entering passwords, entering URLs, email address, etc. According to one method, upon providing a predefined interaction, (e.g. a gesture in a predefined direction from a key/window such as the space key) the system may be switched to precise character entry mode (e.g. herein may be referred to as precise mode). According to a first aspect, providing a gesture from a first predefined edge of the screen towards inside the screen may switch the system to the precise letter mode. According to a second aspect, providing a gesture from a second predefined edge of the screen towards inside the screen may switch the system to the precise special character mode. Alternatively, providing a gesture from a predefined edge of the screen towards each predefined different direction inside the screen may switch the system to a different precise mode. Etc.

Figure 27E:
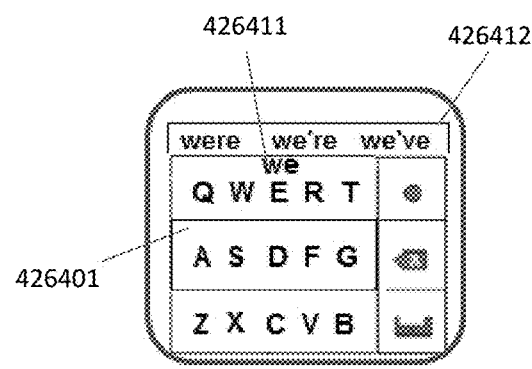
Figure 27F:
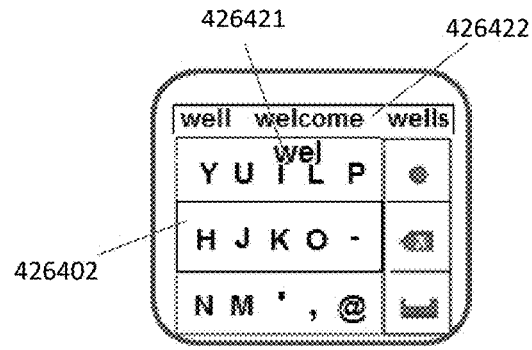

In the example of FIG. 27E the system is switched into the precise character mode. In this example, the/a left portion 426401 of a keyboard is shown on the screen. Showing a portion of a keyboard permits to have larger keys on the screen. Interacting with a (e.g. zone corresponding to a) character on the screen/keyboard may provide said character precisely. Preferably, the system may include a word completion system to propose longer words (e.g. 426412) beginning with the (e.g. precise) character/s (e.g. 426411) being entered. If a desired character is not presented in the portion of the keyboard being displayed on the screen, then:
a) the user may provide scrolling actions towards left or right to access other portions of the keyboard
b) preferably upon providing a predefined interaction such as gliding action leftwards on the screen/keyboard, the system may show another portion (e.g. the/a middle portion, a/the right portion, the rest of the keyboard, etc.) of the keyboard on the screen. In this example, after providing a gliding action leftwards on the keyboard, as shown in FIG. 27F, the system may present the right portion 426402 of the corresponding keyboard on the screen. The user may now type his desired character (e.g. '1') precisely. Preferably, upon providing a gliding action in another direction (e.g. rightwards) on the screen/keyboard at least another (e.g. a/the left) portion relating to the current portion of the keyboard may be accessed. Alternatively, providing each additional gesture in a same direction an additional portion of the keyboard in that direction may be presented to the user.

Figure 27G:
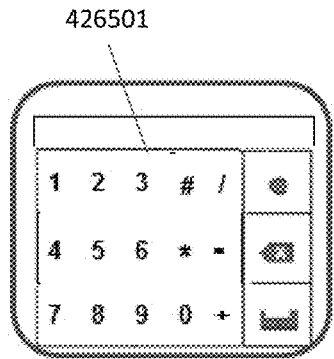
Figure 27H:
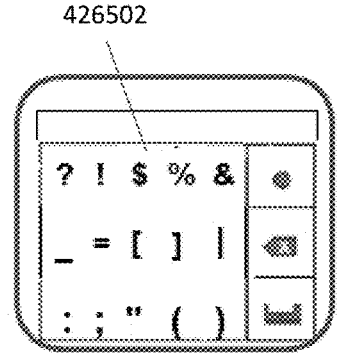

According to one method, the presentation of characters in a/the precise mode may not be limited to letters, any symbol (e.g. letter, special character, function, etc.) may be accessed/entered as such (e.g. see FIGS. 27G, 27H). Alternatively, a first predefined interaction (e.g. a gesture in a first predefined direction from the space key) may enter the system into mainly precise letter entry mode (e.g. FIGS. 27E and/or 27F), and a second predefined interaction (e.g. a gesture in a second predefined direction from the space key) may enter the system into mainly precise special character entry mode (e.g. FIGS. 27G and/or 27H), and so on.

Figure 27I:
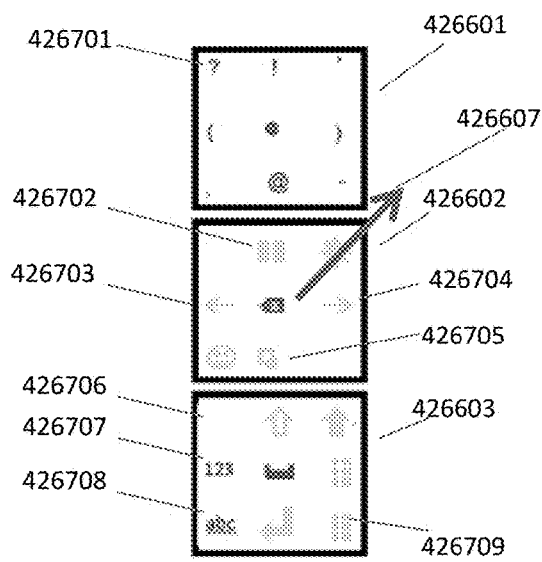

FIG. 27I shows, as an example, a close view of an exemplary function keys/bar of a keyboard (e.g. of the invention). In this example, an interaction such as a pressing action provided on each of the keys 426601, 426602 and 426603, may respectively correspond to entering a dot, pressing/providing the backspace key/function once and pressing/providing the space key/function once. Accordingly, providing a gliding action from anywhere on a key (e.g. 426602) in a different predefined direction (e.g. 426607) may correspond to a predefined character and/or function (e.g. keyboard settings). Note that according to an aspect of the invention, each time a user touches a key to provide a gliding action the system considers that said touching action is provided on the center of said key. The predefined direction (e.g. towards upper-left) of a gesture is calculated/defined from said touching point. In this example, providing a gliding action from anywhere on a key 426601 towards upper left may preferably correspond to entering a character or a function represented by the icon (e.g. "?") printed on the upper left of the key 426601. Note that in this example, preferably up to eight different directions for gliding actions provided from a key may be considered. Note that the assignments of characters/functions to the function keys may vary.

In this example, a gesture provided (e.g. from anywhere) on/from the key 426603 towards the icon '123' or the icon 'abc' may respectively correspond to switching the system to precise special character mode or to precise letter mode.

According to one embodiment a predefined interaction such as a gliding action provided from a window/key towards a predefined direction may switch back the system to the ambiguous mode. In the example of FIG. 27I, a gesture provided (e.g. from anywhere) on/from the key 426603 towards lower-right may correspond to switching the system to ambiguous mode.

Note that the keyboards described in this patent application may be used with and/or integrated within any type of device with any size of the screen such as a Smartwatch, a Smartphone, a tablet, a large screen of or related to a (e.g. wearable) computing device, etc. Also, any one or components of an input interface (e.g. a keyboard, etc.) described herein may be integrated with any type of keyboard (e.g. of the invention).

According to one embodiment, two neighboring words in the word list may preferably have different colors.

According to one aspect, when the system is in a precise mode (e.g. keyboard of FIG. 27E), a predefined interaction such as pressing the space key or the Enter/Return key may automatically switch back the system into the ambiguous (e.g. letter) mode (e.g. keyboard of FIG. 27D). According to another aspect, the system is switched back to the ambiguous mode upon a predefined interaction with a corresponding key.

As mentioned, the system may be switched to precise letter mode and precise special character mode respectively by providing a first type of interaction (e.g. gliding from a key in a first direction) and a second type of interaction (e.g. gliding from a key in a second direction). Providing any of said types of interaction two times consequently may switch back the system to the ambiguous (e.g. letter) mode.

According to one embodiment, in a specific circumstance such as during the entry of a word using the ambiguous keyboard of the invention, the system may consider which of the large ambiguous zones of the keyboard are being interacted and memorizes them. If a user switches the system into the precise character entry mode, the system may (e.g. erase said word and) show automatically a corresponding portion of the keyboard in precise mode for each large ambiguous zone that was interacted during the entry of said (e.g. erased) word.

Note that according to one method, a first portion of the precise keyboard may include the letters corresponding to the letters of a first large (e.g. left side) ambiguous zone of the keyboard in ambiguous mode, and a second portion of the precise keyboard may include the letters corresponding to the letters of a second large (e.g. right side) ambiguous zone of the keyboard in ambiguous mode.

According to one embodiment, a window preferably in form of a bar may be provided on an edge the screen of an electronic device within said screen. Said window may be related by a processor to a first (e.g. a predefined) application optionally/preferably regardless of another/any other application being displayed and/or used on the screen. A predefined interaction with said window may activate a process such as displaying an interface on the screen. According to one aspect, said predefined interaction may be providing a gliding action from said window (e.g. towards inside the screen) and wherein upon completion of a condition said process may be activated. As an example, said condition may be providing said gliding action and a) waiting for a predefined laps of time, b) reaching a predefined distance inside the screen, c) reaching another window in the screen wherein preferably said another window also belongs to said first application, etc. As an example, said first application may have at least two windows located on one or more edges on the screen and wherein a gliding action provided from a first window of such windows reaching a second window of such windows may be related by a processor to activating a/said predefined process. Said process may be a notification interface of the device, a menu related to an application being in use/opened.

Figure 28:
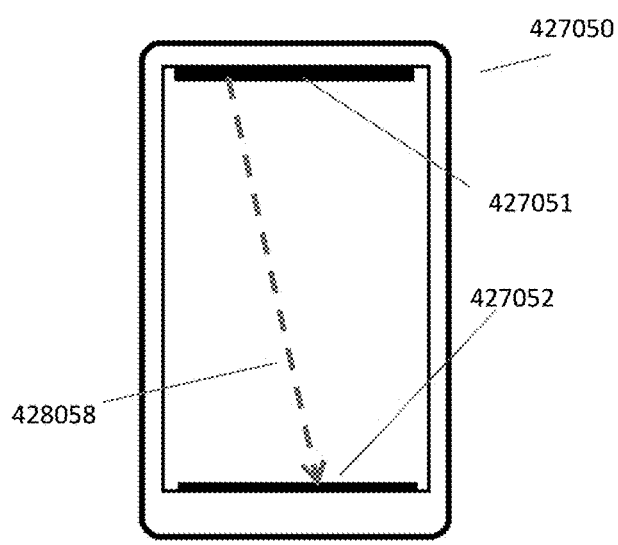
FIG. 28 describes a method of activating a function preferably from an edge of a screen in accordance with exemplary embodiments of the invention.

FIG. 28 shows as an example, an interface of an application (e.g. herein may be referred to as the main application) being displayed on the screen. In addition to said application an interface of another application (e.g. herein may be referred to as a secondary application) may also be displayed on the screen. Said second application may be or may not be related to the first application. According to one aspect, said second interface may be permanently displayed on the screen, whereas the first application may be changed or may be replaced by another application at any moment. In this example, by providing a predefined interaction such as a gliding action from a first window 427051 of the secondary application to a second window 427052 of the secondary application (e.g. preferably upon reaching said second window) the system may activate a function (e.g. or a function may be activated by some other means). According to one method, said function may be displaying an interactive interface (e.g. a menu corresponding to the main application, a notification menu, etc.).

According to one method, each interaction with the backspace key deletes a single character or a number of characters, respectively corresponding a tapping action or to a gliding action, that was provided before the cursor in a text.

Figure 28A:
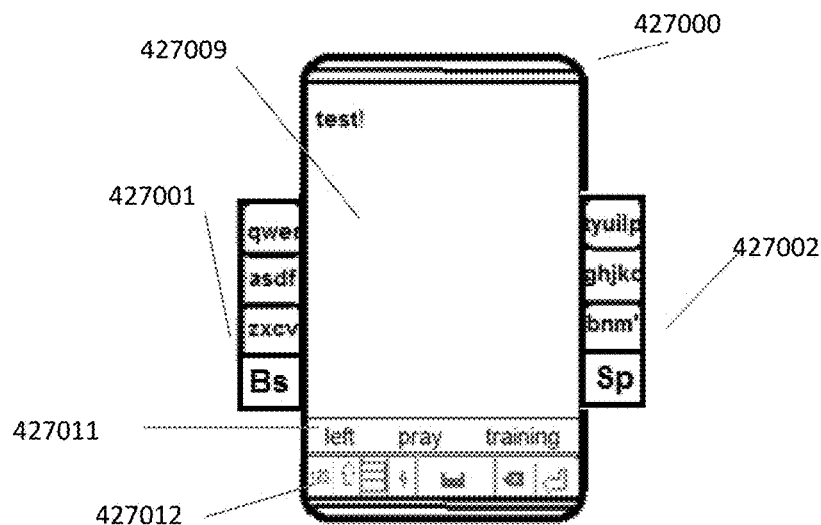

According to one method, the hard keys may be in form of a detachable and/or attachable unit (e.g. herein may be referred to as a data entry unit) and being attached to a corresponding device. They can also be used as an external data entry unit being connected wirelessly or through wires to a corresponding device. FIG. 28A shows an attachable/ detachable unit having the split hard keys 427001 and 427002 attached to a corresponding device 427000 and optionally/preferably working with the data entry system of the invention. In this example, the external data entry system has six (e.g letter) keys each ambiguously corresponding to a number of letters and/or characters similar to, for example, the six letter zones of the on-screen keyboard of FIG. 2C. The unit may also include a space (Sp) key and a backspace (Bs) key as shown in this FIG. 28A. Upon a user's interaction with the hard keys the system may predict/propose a corresponding word. The device may also include an on-screen keyboard such the keyboard of FIG. 2C. The user may use any of the hard or soft keys to enter text. The words that are not in the database and/or special characters and/or some functions used by the system may be entered by using the soft/on-screen keyboard.

Preferably, upon/during using the hard keys, at least the letter keys of the on-screen keyboard are not available on the screen. In this case, preferably, the function bar 427012 and/or the word list 427011 is/are available on the screen. At least some special characters and/or some functions may be available through the data entry unit (e.g. by using long press on the keys, pressing to keys simultaneously, etc.).

The attachable/detachable data entry unit may have attachment means. The unit may also have a size adjustment (e.g. mechanical) system to fit the split keys to the size of a device. Said size adjustment system may be a slidable support element 427110 to which the (split) keys are attached/integrated so that to expand or reduce the size of the support element of the data entry unit.

Figure 28B:
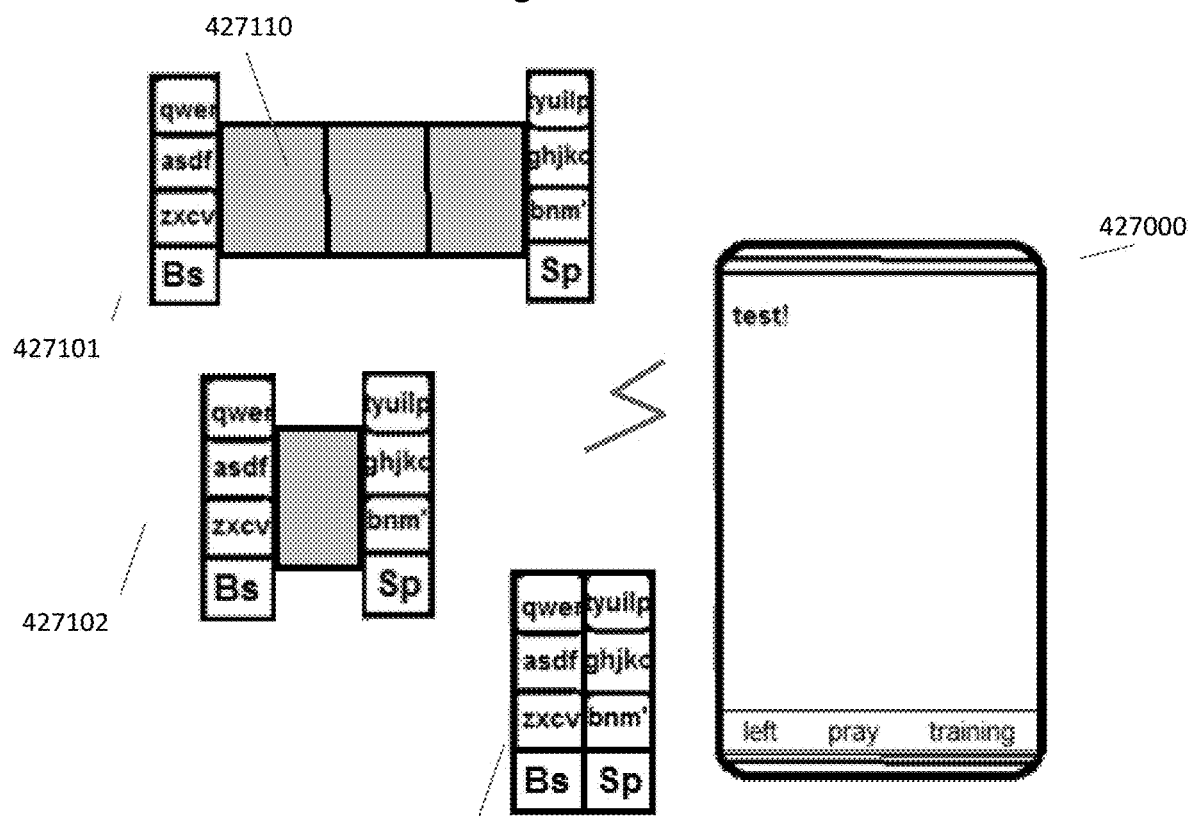

The components (e.g. a Bluetooth component, battery, or otherwise, etc.) of the data entry unit may be integrated with/under the keys or within the support element. In FIG. 28B, an adjustable external data entry unit is shown in three adjusted instances respectively, largely expanded 427101, slightly expanded 427102 and not expanded 427103.

The support element may be of any type such as being made of several slideable elements to expand and/or retract the distance between the split keys.

After being attached, the location of the hard keys may be adjustable by dragging them up or down on the sides of the device. A version of the data entry unit may be attached on one side, preferably the bottom side, of the corresponding device. The data entry unit may include its own display (e.g. to show the word list proposed by the system). According to one embodiment, the word list is displayed on the screen of the corresponding device.

When a user types a word through the on-screen keys and then interacts with a hard key, the system may enter the current predicted word (e.g. which may not include consideration of the interacted hard key) and optionally also enter a space character.

The on-screen keys may be displayed (e.g. or removed from) on the screen through/upon a predefined interaction with the external data entry unit.

Note that, optionally, the external unit is not an attachable unit.

Note that all of the principles of the (e.g. word predictive) data entry system of the invention may be used with any of the keyboards of the invention.

FIGS. 28C to 28E show another example of an attachable/detachable external keyboard of the invention. In example of FIG. 28C, a C-shaped external split keyboard 427211 having the two rows of keys 427201 and 427202. The assignment of characters/letters to said keys may be similar to that of FIG. 28A (e.g. in addition, a key from/of each of the split keys may respectively be used as space key and backspace key). The keyboard may have additional keys 427203 that will be described later. The keyboard may wirelessly or by wires be connected to an electronic device (e.g. a mobile phone). The keyboard may be detachably attached to a corresponding device and at the same time may protect the device. In the example of FIG. 28D the keyboard is attached to a device 427200 in a portrait mode (e.g. orientation of the device).

As shown in the example of FIG. 28E, a pair 327211 and 427212 of such keyboard may be detachably attached to a corresponding device 427200 to permit to use said device in in any orientation (e.g. in two portrait modes and/or in two landscape modes). In this example, to each of pair of split keys located symmetrically in opposite position on the device a/the same character/letter arrangement as described may be predefinitely or dynamically assigned.

As an example, when the device 427200 is used in a landscape mode, preferably, the functionality of keys may automatically be changed (e.g. according to orientation mode of device). As an example, the functionality in FIG. 28E split keys 427203 and 427206 may be for entering text and other keys may be used for entering other symbols and/or functions, while when the device is portrait mode the split keys 427201 and 427202 (e.g. and/or 427204 and 427205) may be for entering text and other keys may be used for entering other symbols and/or functions. Note that a C-shaped external keyboard may be designed to be attached to the longer edges/s of a corresponding device or to the shorter edges of a corresponding device.

Note that tapping actions and gliding actions described throughout this application may be provided in the air on/related-to a virtual/imaginary keyboard.

Note that slight changes to a standard letter arrangement of a traditional (e.g. on-screen) keyboard may be permitted and used by the data entry system of the invention. As an example, in a Chinese language, the letters I and L may be assigned (e.g. swapped) to different zones for better prediction.

Traditional mechanical watches are widely used by people. Some people may not want to replace such type of a watch with an electronic wrist-mounted device such as a smart watch. Combining said devices preferably in a same wrist-mounted device may be a good approach. According to one embodiment, a multi-sectioned (e.g. wrist) device wherein said sections may be expandably/retractably attached to each other is described herein accordingly.

FIG. 29A demonstrates an example based on an aspect of this invention. In this example, a wrist-mounted device 428000, for example, such as a smartwatch having at least two sections 428001, 428002 is shown. In this example, the first section 428001 preferably includes the main components of a computing and/or communication device such as a smartwatch. The first section 428001 preferably also includes the (e.g. virtual, mechanical) keypad component 428007 of said computing device. Said wrist mounted device also includes a second section 428002 which is foldably/unfoldably attached to the first section and/or to the wrist mounted device. The second section may include a display component 428008 that is related/connected to the computing device wirelessly or through wires. In unfolded status/state, the display unit and the keypad unit are facing towards the user's eyes so that when he/she types a text using the keyboard he can see the corresponding result on said display unit. On the backside of the second section a watch unit, preferably a mechanical watch but optionally an electronic watch, may be installed.

According to a one aspect, said display component and said watch unit form a single section. As shown in the example of FIG. 29B, in folded/retracted position said watch unit 428003 may cover the computing device so that the wrist-mounted device may resemble to/form a regular/traditional wristwatch.

Note that the position of the components on the sections may vary. As shown in FIG. 29C, according to one embodiment, the keypad 428017 may be located within the second section 428012 and the display unit 428018 may be located within the first section 428011.

According to one aspect, the wrist-mounted device may have more than two sections. In the exemplary FIG. 29D, the wrist-mounted device has three sections. In this example, the display component 428022 and the watch unit 428023 form/are integrated within separate sections each may foldably/unfordably being attached to a main section 428021 and/or to the (e.g. wristband 428029 of the) wrist-mounted device.

It must be noted that other expanding/retracting means such as a slideable means may be used with the multi-sectioned wrist-mounted device. According to a preferred embodiment, a wrist-mounted device having a wristband, a housing for an electronic/telecommunication device and a (e.g. traditional/mechanical) watch unit may be manufactured (e.g. preferably by a watch manufacturer). A electronic/telecommunication device in form of a module that can be removably implemented within said housing of the wrist-mounted device may be manufactured (e.g. preferably by a electronic/telecommunication manufacturer). Said housing and/or said electronic/telecommunication module may be manufactured such that the electronic/telecommunication module may be removably installed within said housing. By doing so, a watch manufacturer may produce wrist-mounted devices to adopt electronic/telecommunication modules of different versions and/or different manufacturers (or vise versa).

FIG. 29E shows a wrist-mounted device 428100 having a (e.g. detachable) wristband 428037, a housing 428038 attached to said wristband and a unfoldable/foldable/expandable/retractable watch unit 428100 attached (e.g. by hinges 428039) to said housing and/or to said wristband. An electronic/telecommunication device such as a smartwatch having one section or more sections (e.g. 428000 of FIG. 29A) may be (e.g. removably) installed within 428034 said and/or housing 428038 by a manufacturer or by a user. Note that a user may be able to purchase any of the wrist-mounted device and the electronic/telecommunication device/module separately and assemble them by, for example, pushing the electronic/telecommunication unit/module inside the housing. For this purpose, the housing and/or the electronic/telecommunication unit may have attaching/detaching means.

Note that according to another method, the wrist-mounted device may include an electronic/telecommunication unit and wherein said wrist-mounted device may have a means such as a housing to (e.g. removably) adopt/adapt a/any watch unit. Also note that the sections of the multi-sectioned device of the invention may be expanded or refracted relating to each other in any manner such as by a foldable/unfoldable mechanism, sliding mechanism, etc.

Note that the extendable sections of the multi-sectioned device may be extended in any direction such as upwards, downwards, leftwards, rightwards. Note that the display unit may be flexible and/or rollable/foldable to permit to have a large display.

Note that according to one embodiment, the battery power source of the electronic/telecommunication and/or of the watch may be integrated within the wristband. The battery power source may occupy a substantial portion of a wristband.

Note the multi-sectioned device described herein may be used is independently from a wristband (e.g. or watch). For example it may be used as an independent device or it may be used as a pendent, etc.

With continuous description of the current aspects, according to one embodiment, at least two sections of a multi-sectioned (e.g. wrist) device may have touch sensitive surface such as a touchscreen. The multi-sectioned device may be designed such that in an expanded mode, each of its sections may have a touch sensitive (e.g. display) component face to a user using said device. According to one embodiment, (during text entry) each of the sections of the device may present/print one of the portions of a split keyboard (e.g. herein may be referred to as multi-sectioned keyboard). This may permit to have a keyboard with large zones when typing on a small device.

Figure 29F:
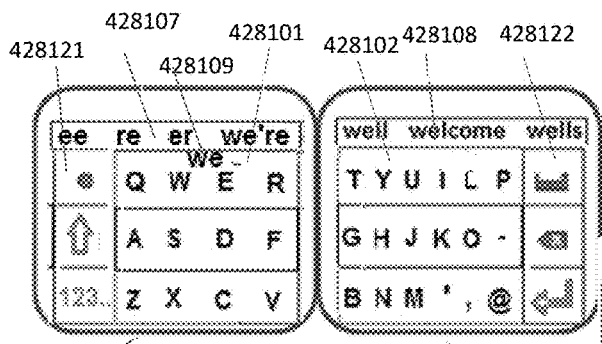
FIGS. 29F-29K show different types of input interface for a multi-sectioned device (e.g. Multi-sectioned Smartwatch) in accordance with different exemplary embodiments of the invention.
Figure 29G:
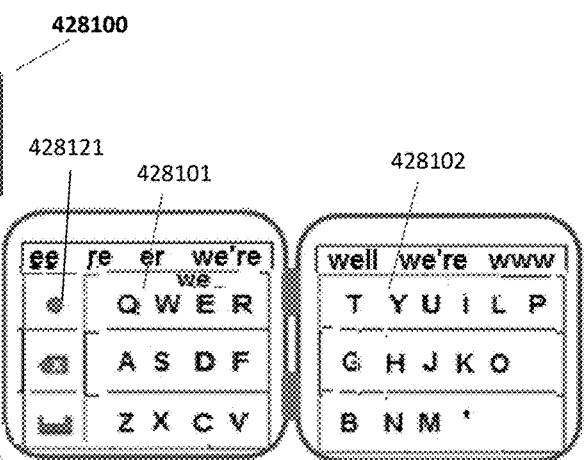
Figure 29H:
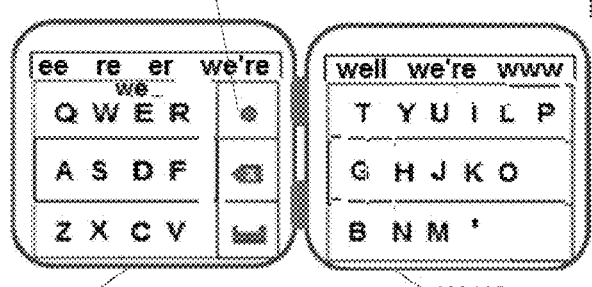
Figure 29I:
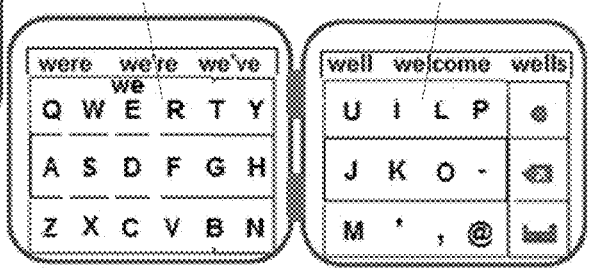

FIG. 29F shows as an example, a multi-sectioned device 428100 having two sections 428111 and 428112. A keyboard (e.g. of the invention) having two large zones is displayed on the screen. A first large zone 428101 is displayed on the first section 428111 and a second large zone 428102 is displayed on the second section 428112. By distributing a keyboard in one or more sections of a multi-sectioned device, keys/zones of the keyboard may become more spacious (e.g. and larger, allowing for) reducing typing errors. In this example also the word list has two portions 428107 and 428108 permitting to display more characters/words. In this example, the keyboard has also two function bars 428121 or 428122. In an alternative aspect, the keyboard may have one function bar or no function bar. For example one/any of the function bars may be eliminated (e.g. see FIG. 29G). According to one aspect, (the) one or more function bars may be located (e.g. partially or in its entirety) anywhere within one or more sections of the device (e.g. see FIG. 29H). Note that a keyboard may be split (e.g. among various section of a device) in any manner (e.g. see FIG. 29I) to permit easy access to zones/characters.

Figure 29J:
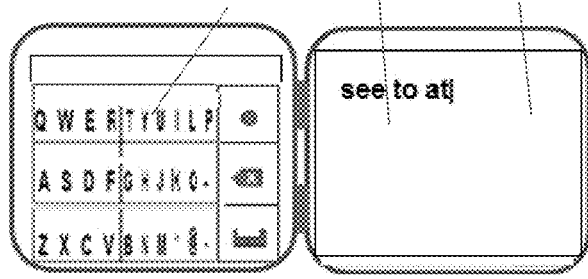
Figure 29K:
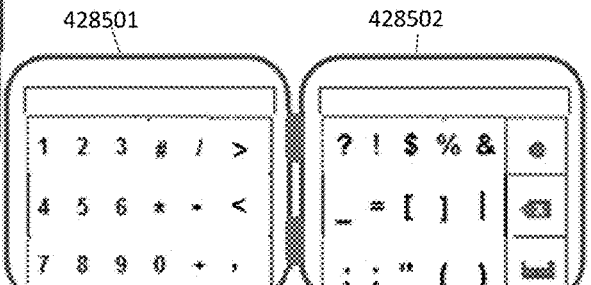

According to one aspect, while a keyboard is in ambiguous mode it may be presented on one section of the device (e.g. see FIG. 29J). Accordingly, while a keyboard is in precise mode it may be presented on two or more sections of the device (e.g. see FIG. 29I). Note that in any mode the keyboard may occupy more than one section(s) of a device. As an example, in FIG. 29K the keyboard is in precise special character mode occupying two sections 428501 and 428502.

Battery consumption is a key issue in small devices such as smartwatches. According to one embodiment, a device such as, for example, a smartwatch may have a sensing means to recognize/measure the orientation and/or position of at least a component, such as the screen, of the device. According to one aspect, preferably when the device is not in use (e.g. active use by a user) when the component, such as the screen, of the device is in a predefined (e.g. approximate) position such as facing a user's face, the component, such as the screen, of the device activates (e.g. turns on and/or carries out some function). Preferably, in such condition/situation, according to one aspect, the watch may show the time. According to another aspect, the watch may show a content regarding the latest notification alert. According to one method, the component, such as the screen, turns on after a predefined lapse of time wherein the component, such as the screen, is in said predefined (e.g. approximate) position. Accordingly, when the component, such as the screen, changes position and/or after another predefined lapse of time, the component, such as the screen, turns off.

According to one method, said predefined lapse of time may vary and may be defined by a user, manufacturer, or upon completion of a condition (e.g. by the system).

According to one embodiment, a predefined interaction such as a tapping on a (e.g. turned off) screen, may show a content such as a content relating to the latest notification alert on the screen or such as some other information relating to the state of device and/or component.

A keyboard interface on a (e.g. small) touch screen may hide/cover a substantial portion of the screen. (e.g. For easy and fast interaction with the content under the keyboard) a method of replacing the keyboard by a small window/icon placed/located in/at a predefined or arbitrary location on the screen may be provided.

According to one embodiment, when a keyboard is displayed on the screen a predefined interaction, such as gliding/tapping action provided in a direction from a key/window presented on the screen, may remove the keyboard and replace it by a small window as just described. Said small window is preferably displayed on a location on the screen that is not used or is not often used. A predefined interaction such as a tapping action on said small window may preferably bring back the keyboard on the screen. In this case, the small window may be removed from the screen. According to one method, the small window may always be present on the screen. In this case, according to one aspect, interactions with the small window may switch back and forth the keyboard in two states: displaying the keyboard on the screen and removing it from the screen, or vise versa.

Figure 30A:
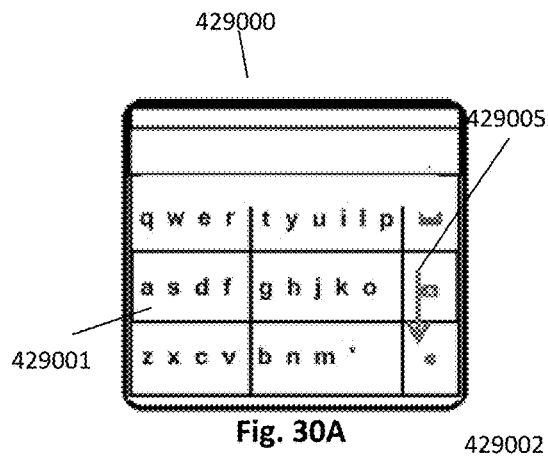
FIGS. 30A-30F show a method of removing/displaying a user interface (e.g. a keyboard) on the screen of a device (e.g. Smartwatch, smartphone, tablet, etc.) and a method of duplicating and displaying a portion of a text in accordance with different exemplary embodiments of the invention.
Figure 30B:
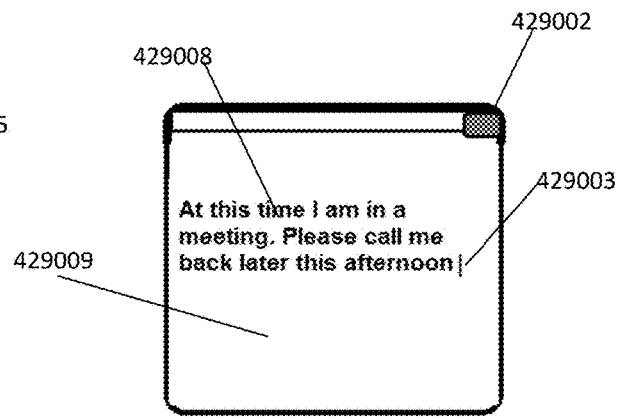
Figure 30C:
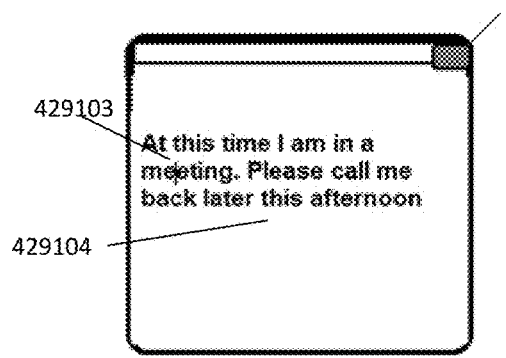
Figure 30D:
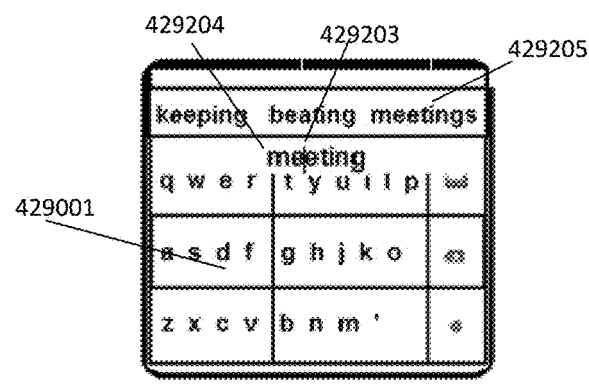

As an example, FIG. 30A shows a keyboard 429001 of the invention displayed on the screen of a (e.g. small) device 429000. As shown in this example, the keyboard is occupying a large portion of the screen and/or a large portion of the content on the screen is hidden/not shown. As shown in the example of FIG. 30B, a predefined interaction such as a gliding action 429005 (e.g. of FIG. 30A) downwards from a key may remove the keyboard from the screen 429009 and preferably a small window 429002 may be displayed on a corner of the screen. Now, the user has access to the content which is displayed on the screen. In this example the content is a text field 429008 wherein a cursor 429003 is located at the end of the last word of the text. As show in FIG. 30C, the user may select a word by interacting with a word of the text. The system may place the cursor 429103 at the interaction point. Then the user may interact with the small window 429002. In this case, as shown in FIG. 30D, the system may provide several choices/elements such as one or more of the following choices/elements: a) bring back the keyboard 429001 on the screen b) remove the small window from the screen 3) show the selected word 429204 in a predefined window on the screen on the device d) include a cursor 429203 in the corresponding position in the selected word e) display alternative word choices in a word list 429205, etc.

Note that the small window may have any size, any shape, etc. According to one method, the small window may be in form of a thin (e.g. visible/invisible) bar preferably located on an edge of the screen of a corresponding device. In this case interaction with said thin window may be providing a predefined interaction such as a gliding action provided from said edge of the screen. Note that in some embodiment of this patent application the word cursor may refer to a caret (e.g. and vice versa).

Figure 30E:
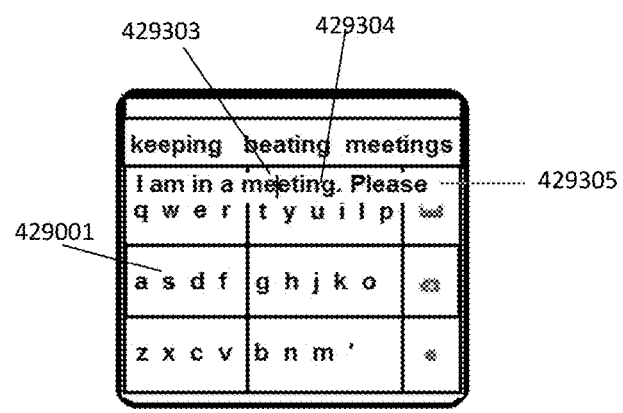

According to one embodiment, when a keyboard is displayed on a screen, at least a (e.g. a duplication of a) portion of the text near/around the/a cursor (e.g. caret) within a text field (e.g. herein may be referred to as main text field) on the screen (e.g. wherein said portion of text is not visible by the user for example because the keyboards covers it) may be presented within a window (e.g. herein may be referred to as history window) visible to the use. Note that at any instance the main text field may preferably belong/related to the application/text field currently running/focused. The main text field may change if the system changes the focus from a first application to a second application. This may permit to view a hidden portion of a text or to provide a close view of a text on the screen. As an example, after selecting a word (e.g. as shown in FIG. 30C) from the main text field 429104 and bringing back the keyboard on the screen, as shown in FIG. 30E, in addition to displaying the selected word 429304 the system may (e.g. duplicate and) show a (e.g. (predefined) one or more) number of characters/words before and/or after the word being selected from the main text field in a predefined window 429305 visible to the user on the screen. The system may preferably also show a cursor 429303 in the corresponding position within the selected word 429304 in the history window 429305. Preferably, said additional presented characters/word in the history window are the characters/words located on the left and/or right side of the selected word/cursor (e.g. and/or above and/or below the selected word/cursor) in the main text field.

Note that when a cursor is moved (e.g. by typing or by interacting with a corresponding text) within the text in the main text field, the corresponding cursor is preferably also moved accordingly within the text in the history window, or vise versa.

Note that if the location of a cursor within the text in the main text field is changed, then preferably, the text within the history window may be updated/changed to reflect/show the text near/around the cursor in the main text field, or vise versa.

Note that during typing a word there may be no text after and/or before said word in the main text field. In this case, accordingly, there may be no text, respectively, after and/or before the said word in the history window.

Note that when a word is selected by any means (e.g. using backspace key, touching it, etc.) in the main text field, the corresponding word in the history window may also be selected, or vise versa.

Note that when a word is selected, a number of corresponding alternative words (e.g. said word and said alternative words may preferably correspond to a same input information) is preferably presented in the word list.

Note that according to a first aspect the history window may not be interactive while according to a second aspect the history window may be interactive. In this case, as an example, selecting a word from the text within the history window may correspond to selecting the corresponding word within the main text field.

Note that a selected word is preferably highlighted within the history window. Note that preferably a/the current word is considered by the system as a selected word. Therefore, at least some, preferably all, of the principles, aspects, etc., related to a selected word is preferably applied to a current word (e.g. and vice versa).

Figure 30F:
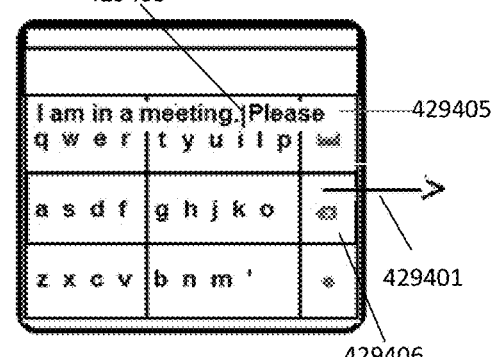

According to one embodiment, a number of predefined interactions, such as gliding actions provided in different predefined directions, may move the cursor in corresponding directions within the text in the main text field and/or in the text within the a/the corresponding history window, or vise versa. Preferably, different types of gliding actions provided in a same direction may correspond to differently moving the cursor in a same direction. As an example, a slow gliding action in a predefined direction may correspond to moving the cursor over several characters, and a fast gliding action in the same predefined direction may correspond to moving the cursor one character, or vice versa. In the example of FIG. 30F providing gliding actions in different predefined directions from the key 429406 may be related by the system to moving a cursor in corresponding directions within a corresponding main text field and the corresponding history window. In this example, the cursor 429403 is moved towards right within the text in the history window 429405 (e.g. and within the corresponding text in the main text field (not shown)) by providing a gliding action 429401 rightwards from the key 429006.

According to one aspect of the invention, upon providing a predefined interaction (e.g. a gliding action in a predefined direction such as left, right, up, down, or other direction from a key (e.g. to move the cursor inside the history field)), the system may enlarge the history window to show more content such as more (e.g. lines and/or columns of) text. Said enlarged history window may cover at least a portion of the keyboard and/or at least a portion of the screen. According to another aspect of the invention, upon said interaction, the system may remove the keyboard or make it invisible so that the user can see the content (e.g. text) and thereby can further interact with the main text field. According to another aspect of the invention, upon enlarging the history window, the system may present the corresponding text in a different (e.g. larger) font size and/or different color.

Note that, according to one aspect of the invention, the content of history window may contain text and/or other content near or around the cursor which is located in the main (e.g. text) field.

According to one aspect, when the keyboard is in precise mode the function bar (e.g. space key, backspace keys, etc.) may become smaller (e.g. narrower) (e.g. to permit/provide larger/more space to the letters portion of the keyboard).

Thus, while there have been shown and described and pointed out fundamental novel features of the invention as applied to alternative embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto. It is to be understood that the drawings are not necessarily drawn to scale, but that they are merely conceptual in nature.

For example, any other kind of keyboard having any number of keys, any kind of key configuration, any type of keys (e.g. physical/hard keys, touch sensitive keys such as on-screen keys, combination of hard and touch sensitive keys, physical keys with touch sensitive surface, keys/zones dynamically (e.g. during interacting with a touch screen) defined, virtual keys interacted (from far) in the air, any size of keyboard, with any kind of configurations of symbols assigned to its keys, etc., may be used with the inventions, principles, aspects, embodiments, methods, etc., described herein.

Note that according to a general aspect, interacting with different keys/zone of any keyboard or any other input means of an input interface may provide corresponding different input signals. To each of at least some of said input signals a number of letters/characters of a language may ambiguously be assigned. By receiving a sequence of one or more such input signals the word predictive system of the invention may predict a word as described throughout this patent application.

For not frequently repeating the principles of the data entry system of the invention, in many paragraphs of this application there is mentioned that one or more symbol such as character/word/portion-of-a-word/function, etc., may be assigned to a key (e.g. or an object other than a key). It is understood that unless otherwise mentioned, said symbols, generally, are intended to be assigned to a predefined simplest interaction with said key which may be a single-pressing action on said key.

Note that although in some embodiments a sensitive surface such as a touch-sensitive pad or a touch screen have been used as examples, it is understood that any other technology detecting and analyzing a user's interaction with an object (e.g. from near or remotely) may be used to define interaction with a keyboard. For example, said technology may be an optically detecting technology, or an (e.g. infrared) IR technology, etc. detecting the user's finger/s touching a virtual keyboard or interacting with it from far (e.g. in the air).

It must be noted that at least one/some of principle, features, aspects, concepts, etc., described throughout this application may be combined together and used in any portion of the description of the invention herein to enhance the invention.

Note that any electronic device such as a mobile phone, tablet, smartwatch, etc. may be used by any of the inventions, concepts, aspects, principles etc. described within this patent application or with any other application and/or product.

Note that at least one or more of the inventions, concepts, aspects, principles etc. described within this patent application can be used separately or in combination within this patent application or with any other application and/or product.

Note that the keys/zones may be of any kind such as mechanical/hard, virtual/on-screen, pad, touch sensitive surface, etc., or combinations of them.

Note that any of the keyboards described herein are used to demonstrate the principles of the inventions described herein. Any other type of keyboard (e.g. soft, hard, etc.) having any number of keys/zones, any size, any key and/or characters configuration, etc. may be used with the inventions. As an example, the space key (e.g. 428006) and the 'dot' key (e.g. 428010) may be swapped in the keyboard of FIG. 29C or in any other keyboard. According to another example, the row of special symbols/functions keys (e.g. 428006, 428020, 428010) may have any number of keys and may be placed in any side of the keyboard or of the screen.

Thus, while there have been shown and described and pointed out fundamental novel features of the invention as applied to alternative embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto. It is to be understood that the drawings are not necessarily drawn to scale, but that they are merely conceptual in nature. It must be noted, that any of the systems, features, means, methods, etc., described in this patent application may be used separately or being combined with systems, features, means, methods, etc., of other different embodiments of the invention.

For example, the keys/zone of the keyboard may be defined dynamically when a user touches a location on the keyboard. In this case at least some of the characters near the user's finger impact on the keyboard define a (e.g. an ambiguous) key/zone. Said zone may preferably be horizontal zones (e.g. the characters in the corresponding horizontal direction are selected).

Note that although the term(s) keys/zones are used to describe providing input information for entering text, any other input means may be used for the same. In general, the system may receive a sequence of at least one input signal ambiguously corresponding to a group of characters and/or precisely corresponding to an identified character from any input means to predict a word.

Note that any of the data entry systems and/or input means described in this application may be applied to and/or integrated with devices with screens of any size such as a smartwatch, a smartphone, a tablet, and devices with larger screens.

Note that all principles, methods, systems, embodiments, features, functions, etc. described in this application are not limited to the examples described herein. They may be used for a broader purpose. For example, if in an embodiment, a small window is used to remove and/or display a keyboard on the screen, said small window and the corresponding principles may be used for any other purpose such as displaying and/or removing any other interface/content, executing and stopping the execution of a function, etc.

Note that according to one aspect the keyboard may include any number of large zones each including any number of small zones.

According to one method, a (e.g. incoming) message may be presented in an (e.g. automatically, linear) scrolling manner.

Note that the history window, at any moment, may present a portion of any (e.g. main) text field that is interactable and/or interacted by a user.

Note that preferably the keyboard and/or its corresponding features (e.g. the history window) may operate with different/any contents.

It must be noted that in some portions of this application an invention may be described by referring to a specific content and/or function, it is understood that any other content and/or function may be used with any invention described herein.

The invention claimed is:

1. A method of sharing virtual contents within the network of a social messaging application, comprising:
   receiving, from a sending user, a selection of a first image;
   displaying the first image in a window of the messaging application;
   receiving, from the sending user, a selection of a mask object that is dimensionally smaller than the first image;
   receiving, from the sending user, a drag and drop input dragging the mask object and dropping the mask object at a designated location within the first image, such that the mask object only partially covers the first image, and covers the first image at the designated location within the first image;
   receiving, from the sending user, a selection of two or more recipients to receive the first image partially covered by the mask object;
   prior to sharing the first image partially covered by the mask object with the two or more recipients, receiving, from the sending user, an input authorizing a first recipient of the two or more recipients to move or remove the mask object;
   designating at least a second recipient of the two or more recipients as unauthorized to move or remove the mask object;
   sending the first image with the mask object to each of the selected recipients' respective devices;
   receiving, at the first recipient's device, a predefined interaction input on the mask object;
   in response to receiving the predefined interaction input at the first recipient's device, displaying, by the first recipient's device, the mask object moving on or removing from the first recipient's device while the mask object remains stationary on the second recipient's device.

2. The method of claim 1, further comprising:
   receiving from the second recipient a similar predefined interaction input on the mask object; and
   in response to the similar interaction input, refrain from moving the mask object on or removing the mask object from said second recipient's device.

3. The method of claim 1, wherein said predefined interaction input is a sliding input, the method further comprising:
   in response to receiving the sliding input at the first recipient's device, displaying, by the first recipient's device, the mask object moving in the direction of the sliding input on the first recipient's device while the mask object remains stationary on the second recipient's device.

4. The method of claim 3, further comprising:
   after termination of the sliding input, at the first recipient's device, automatically dropping the mask object back at said designated location within the first image.

5. The method of claim 1, further comprising:
   in response to receiving said predefined interaction input at the first recipient's device, displaying an advertisement content at the first recipient's device.

6. The method of claim 5, wherein said advertisement content is dynamically provided to the first recipient's device by an advertiser.

7. The method of claim 5, wherein said advertisement content is related to said mask object by an advertiser and is transmitted to the sending user's device before said mask object is shared by the sending user with said two or more recipients.

8. The method of claim 1, comprising automatically designating at least the second recipient of the two or more recipients as unauthorized to move or remove the mask object, based on the sending user's failure to authorize at least the second recipient.

9. A method of sharing virtual contents within the network of a social messaging application, comprising:
   receiving, from a sending user, a selection of a first image;
   displaying the first image in a window of the messaging application;
   receiving, from the sending user, a selection of a mask object that is dimensionally smaller than the first image;
   receiving, from the sending user, a drag and drop input dragging the mask object and dropping the mask object at a designated location within the first image, such that the mask object only partially covers the first image, and covers the first image at the designated location within the first image;

receiving, from the sending user, a selection of two or more recipients to receive the first image partially covered by the mask object;

prior to sharing the first image partially covered by the mask object with the two or more recipients, receiving, from the sending user, an input unauthorizing a first recipient of the two or more recipients to move or remove the mask object;

designating at least a second recipient of the two or more recipients as authorized to move or remove the mask object;

sending the first image with the mask object to each of the selected recipients' respective devices;

receiving, at the first recipient's device, a predefined interaction input on the mask object;

in response to receiving the predefined interaction input at the second recipient's device, displaying, by the second recipient's device, the mask object moving on or removing from the second recipient's device while the mask object remains stationary on the first recipient's device.

10. The method of claim 9, comprising automatically designating at least the second recipient of the two or more recipients as authorized to move or remove the mask object, based on the sending user's failure to unauthorize at least the second recipient.

11. A method of sharing virtual contents within the network of a social messaging application, comprising:

receiving, from a sending user, a selection of a first image;

displaying the first image in a window of the messaging application;

receiving, from the sending user, a selection of a mask object that is dimensionally smaller than the first image;

receiving, from the sending user, a drag and drop input dragging the mask object and dropping the mask object at a designated location within the first image, such that the mask object only partially covers the first image, and covers the first image at the designated location within the first image;

receiving, from the sending user, a selection of at least one recipient to receive the first image partially covered by the mask object;

sending the first image with the mask object to said selection of at least one recipient;

receiving, at the first recipient's device a predefined interaction input as the result of a predefined interaction by the first recipient with the mask object, wherein the predefined interaction is a sliding interaction;

in response to receiving the interaction input at the first recipient's device, displaying the mask object moving in the direction of the sliding input and an advertisement content related to said mask object at the first recipient's device.

12. The method of claim 11, wherein said advertisement content is related to said mask object by an advertiser and is transmitted to the sending user's device before said mask object is shared by the sending user with said selection of at least one recipient.

13. The method of claim 11, wherein said advertisement content is related to the geolocation of the sending user's device and/or the geolocation of the device of any recipient of said selection of at least one recipient.

* * * * *